United States Patent [19]

Will

[11] Patent Number: 5,479,408
[45] Date of Patent: Dec. 26, 1995

[54] WIRELESS PERSONAL PAGING, COMMUNICATIONS, AND LOCATING SYSTEM

[76] Inventor: Craig A. Will, 2110 Paul Edwin Ter. #101, Falls Church, Va. 22043

[21] Appl. No.: 200,065

[22] Filed: Feb. 22, 1994

[51] Int. Cl.$^6$ ........................................ H04J 3/26
[52] U.S. Cl. ................. 370/94.1; 379/56; 340/825.44
[58] Field of Search .................. 370/95.1, 95.3, 370/60, 60.1, 85.6, 94.1, 92, 110.1; 371/32, 33; 375/211, 214; 455/11.1; 340/825.44, 825.36, 825.34; 359/174; 379/56

[56] References Cited

U.S. PATENT DOCUMENTS

| | | | |
|---|---|---|---|
| 3,439,320 | 4/1969 | Ward | 367/191 |
| 3,696,384 | 10/1972 | Lester | 367/199 |
| 3,805,227 | 4/1974 | Lester | 367/6 |
| 3,805,265 | 4/1974 | Lester | 342/44 |
| 4,172,969 | 10/1979 | Levine et al. | 379/70 |
| 4,356,484 | 10/1982 | Eckhardt | 340/825.03 |
| 4,456,793 | 6/1984 | Baker et al. | 379/56 |
| 4,539,706 | 9/1985 | Mears et al. | 455/11.1 |
| 4,601,064 | 7/1986 | Shipley | 359/172 |
| 4,696,054 | 9/1987 | Tsugei et al. | 455/89 |
| 4,775,996 | 10/1988 | Emerson et al. | 379/56 |
| 4,823,123 | 4/1989 | Siwiak | 340/825.44 |
| 4,868,560 | 9/1990 | Oliwa et al. | 379/56 |
| 4,891,637 | 1/1990 | Siwiak | 340/825.44 |
| 4,970,714 | 11/1990 | Chen et al. | 371/32 |
| 5,062,151 | 10/1991 | Shipley | 359/154 |
| 5,150,954 | 9/1992 | Hoff | 340/825.44 |
| 5,151,930 | 9/1992 | Hagl | 379/57 |
| 5,153,582 | 10/1992 | Davis | 340/825.44 |
| 5,349,463 | 9/1994 | Hirohashi et al. | 375/3 |

OTHER PUBLICATIONS

Stallings, Data and Computer Communications, pp. 107–112 and 141–144, 1988.
Weiser, Mark, The Computer for the 21st Century, pp. 94–104 Scientific American, Sep. 1991.

Primary Examiner—Douglas W. Olms
Assistant Examiner—Chau T. Nguyen

[57] ABSTRACT

A method and apparatus for sending paging signals and messages to individuals within a building and accepting responses to the messages. Messages may be initiated by electronic mail, incoming telephone calls, incoming Fax messages, or other sources. Data is sent via radio to a communications unit carried by the individual and displayed visually together with possible responses. Each unit transmits its identity and responses or original messages when desired via coded infrared light (or, in an alternative embodiment, ultrasound) to one or more remote stations located in rooms or along corridors of the building. A remote station relays data to a central station also via radio, which tracks the location of units and delivers messages. Communication units are clipped to the clothing of users and can be incorporated into a corporate employee identification badge. The hybrid radio-infrared light approach combines the broad, reliable characteristics of radio communication with the ability of infrared light to allow each unit to be located. This allows highly reliable delivery of messages via an acknowledgement and retransmission protocol, two-way communication with the individual, and capabilities (such as those for transferring incoming telephone calls) that require the location of the individual to be known. The use of radio for communication from the remote station to the central station allows the system to be completely wireless, thus simplifying and reducing the cost of installation.

35 Claims, 31 Drawing Sheets

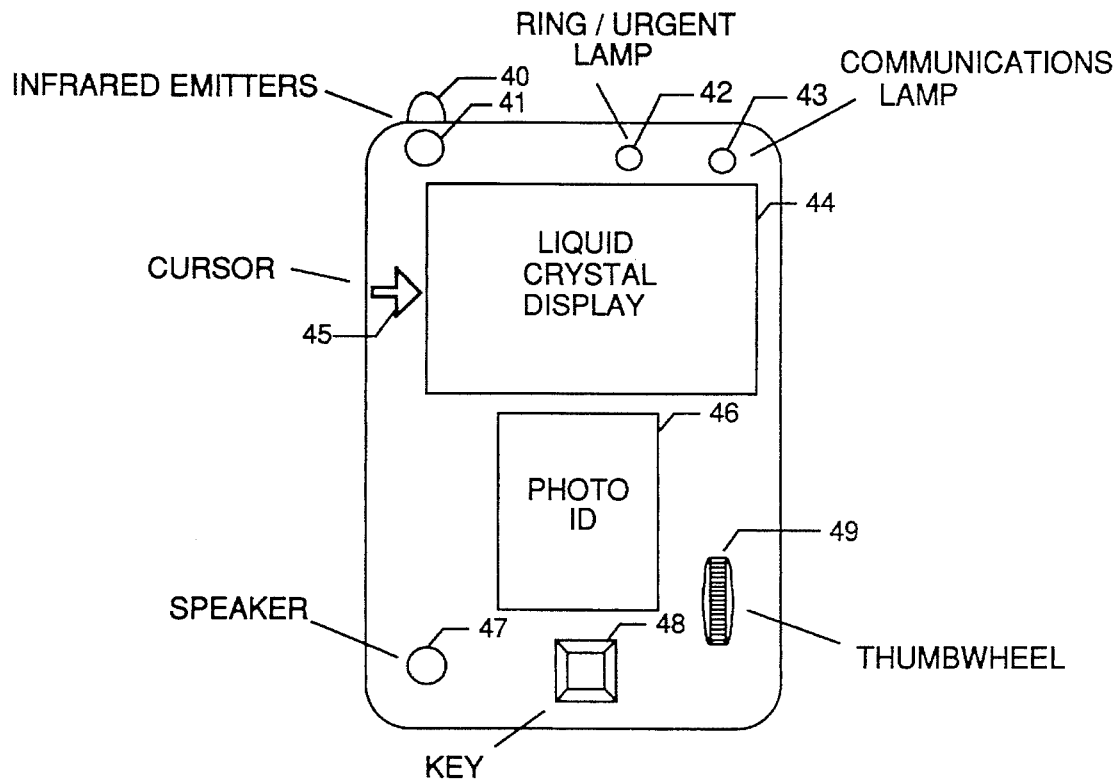
FIG. 4A
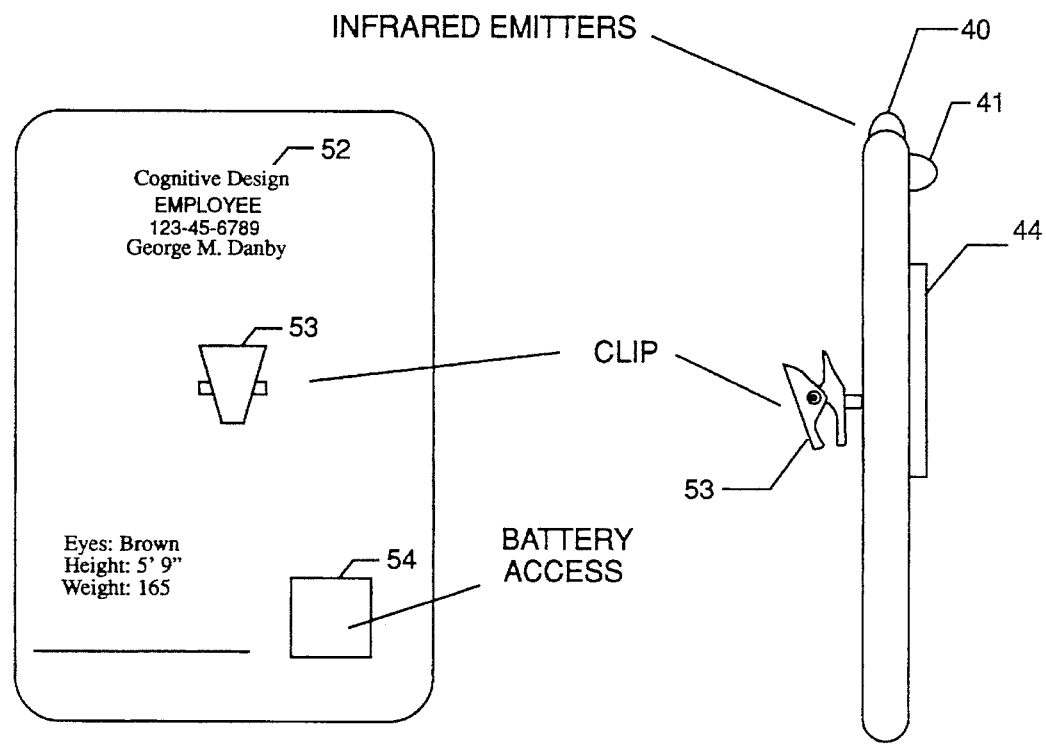
FIG. 4B
FIG. 4C

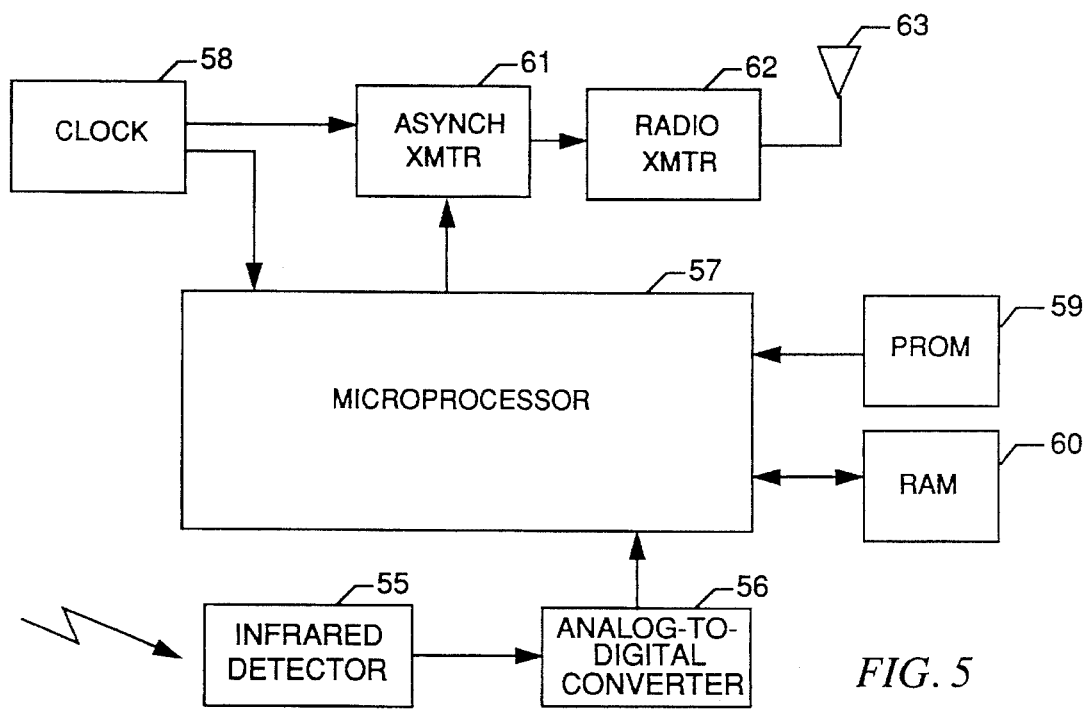
*FIG. 5*
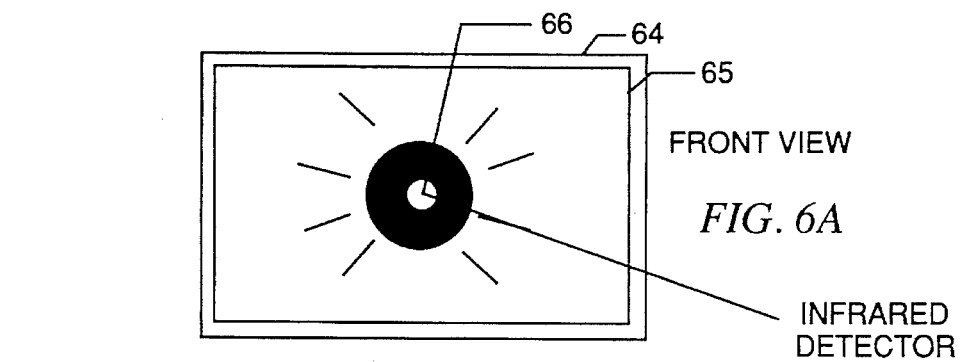
FRONT VIEW
*FIG. 6A*
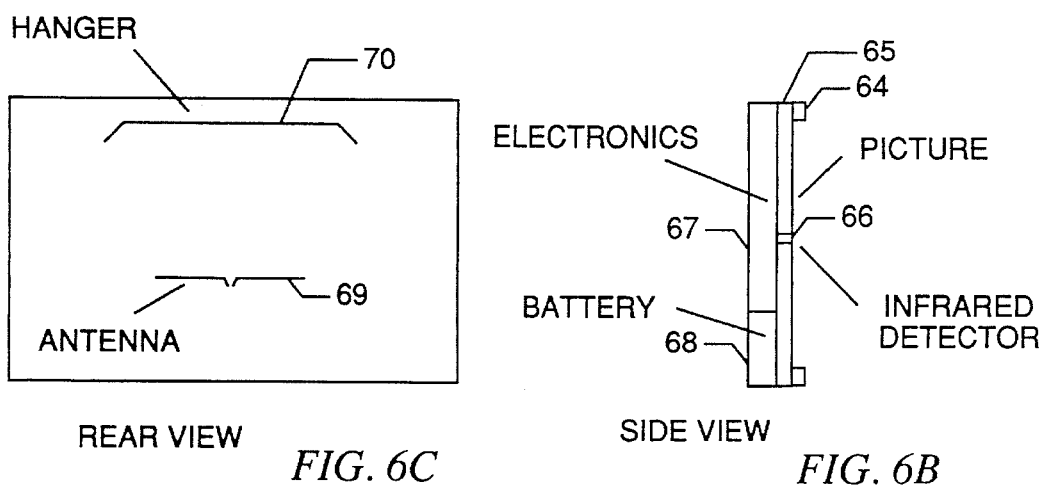
REAR VIEW
*FIG. 6C*
SIDE VIEW
*FIG. 6B*

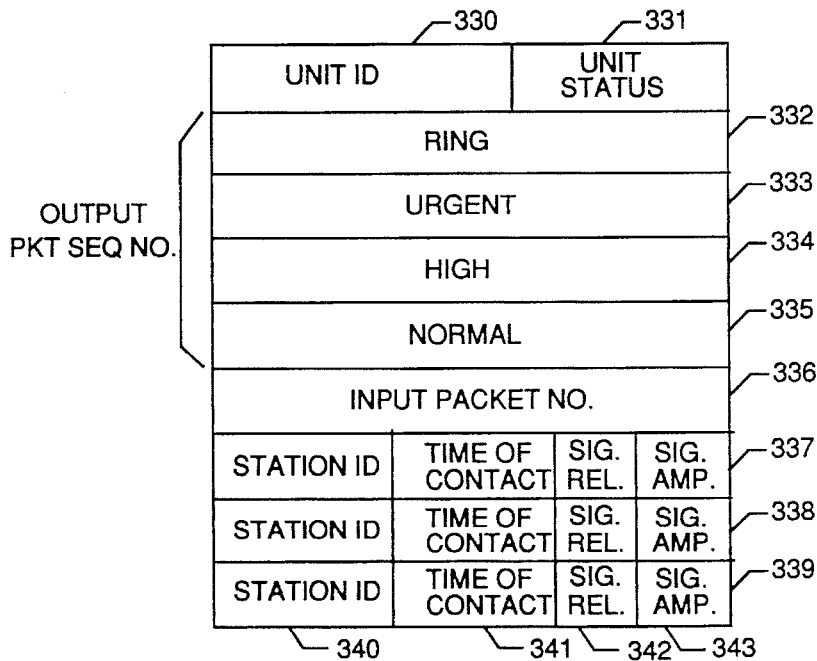

*FIG. 23*

*FIG. 24*

| | 361 | 362 | 363 | 364 | 365 | 366 |
|---|---|---|---|---|---|---|
| QUEUE A | UNIT ID | HOLD BIT | WAIT FOR ACK BIT | NO. OF TR ATTMPTD | POINTER TO TEXT | SEQ NO. IF SENT |
| QUEUE B | UNIT ID | HOLD BIT | WAIT FOR ACK BIT | NO. OF TR ATTMPTD | POINTER TO TEXT | SEQ NO. IF SENT |
| QUEUE C | UNIT ID | HOLD BIT | WAIT FOR ACK BIT | NO. OF TR ATTMPTD | POINTER TO TEXT | SEQ NO. IF SENT |
| QUEUE D | UNIT ID | HOLD BIT | WAIT FOR ACK BIT | NO. OF TR ATTMPTD | POINTER TO TEXT | SEQ NO. IF SENT |
| QUEUE E | UNIT ID | HOLD BIT | WAIT FOR ACK BIT | NO. OF TR ATTMPTD | POINTER TO TEXT | SEQ NO. IF SENT |
| QUEUE F | UNIT ID | HOLD BIT | WAIT FOR ACK BIT | NO. OF TR ATTMPTD | POINTER TO TEXT | SEQ NO. IF SENT |
| QUEUE G | UNIT ID | HOLD BIT | WAIT FOR ACK BIT | NO. OF TR ATTMPTD | POINTER TO TEXT | SEQ NO. IF SENT |

*FIG. 25*

| 401 | 402 |
|---|---|
| EMAIL ADDRESS | UNIT ID |
|  |  |

| 403 | 404 |
|---|---|
| UNIT ID | EMAIL ADDRESS |
|  |  |

| 405 | 406 | 407 | 408 |
|---|---|---|---|
| CHANNEL | ASSIGNED BIT | EMAIL ADDRESS | PTR TO INCOMING EMAIL MESSAGE ARCHIVE |
|  |  |  |  |

*FIG. 28*

| 409 | 410 | 411 | 412 |
|---|---|---|---|
| UNIT ID | CHAN. NO. | INPUT PKT NO. | TEXT |
|  |  |  |  |

*FIG. 29*

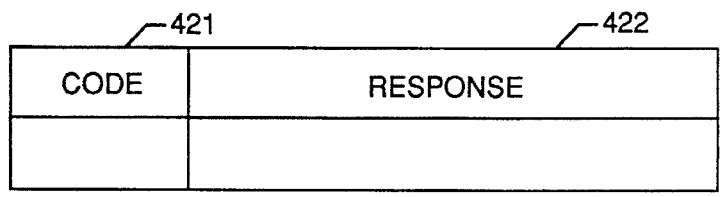
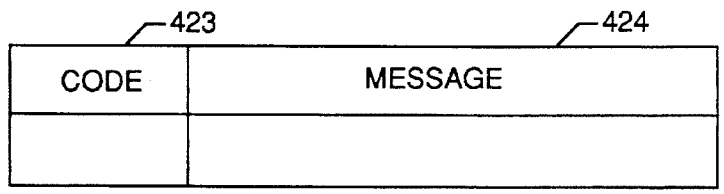
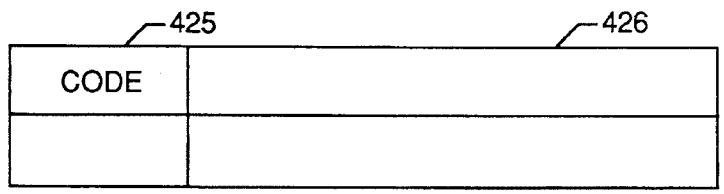
*FIG. 30*
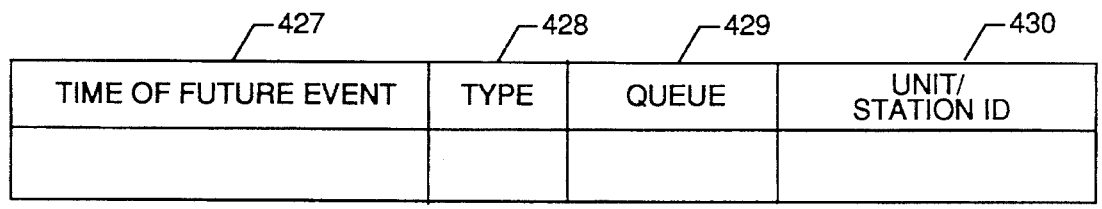
*FIG. 31*

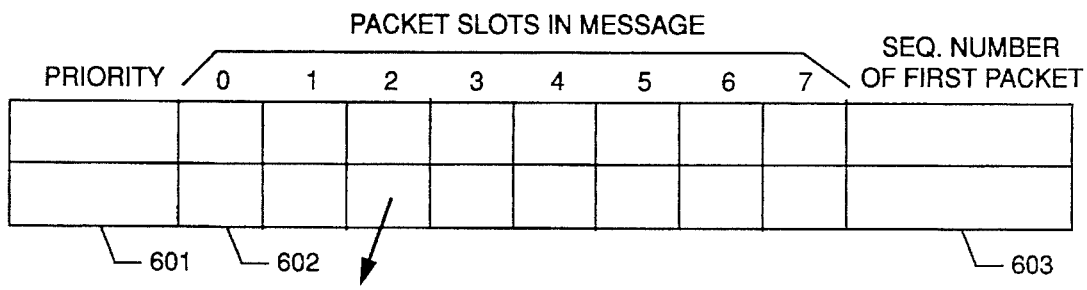
*FIG. 39*
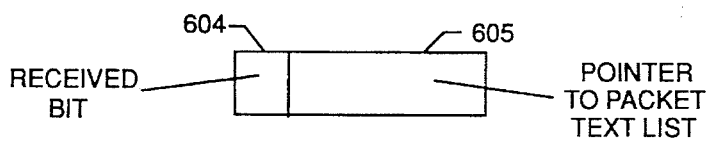
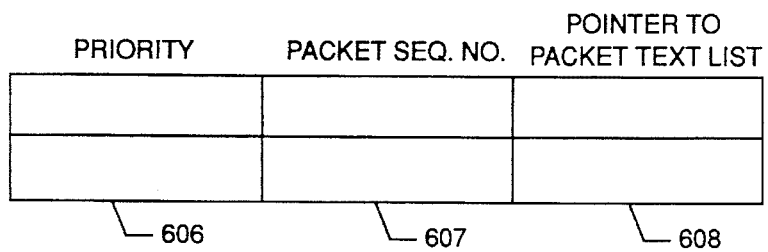
*FIG. 40*
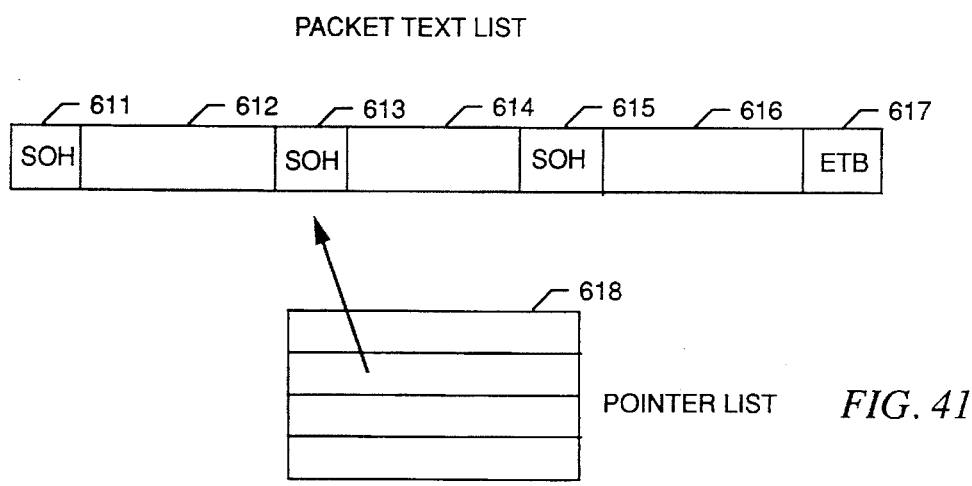
*FIG. 41*

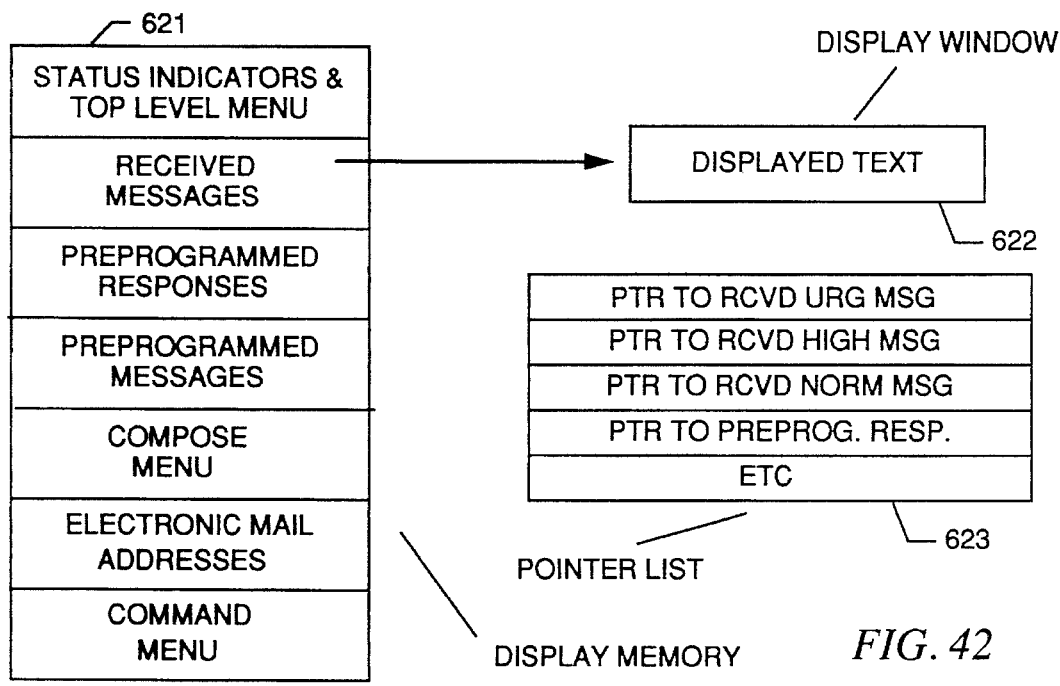
*FIG. 42*
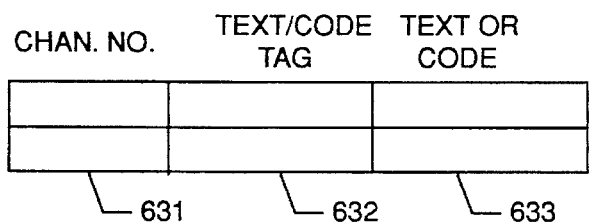
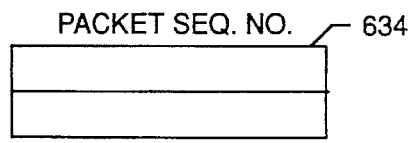
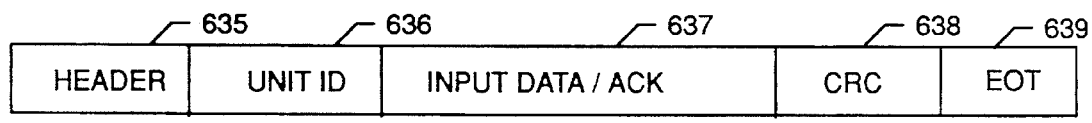
*FIG. 43*

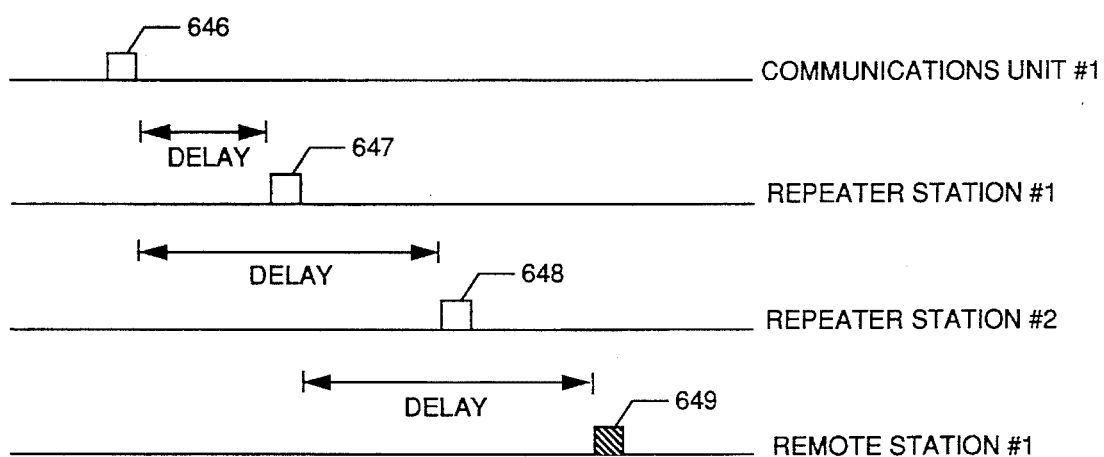
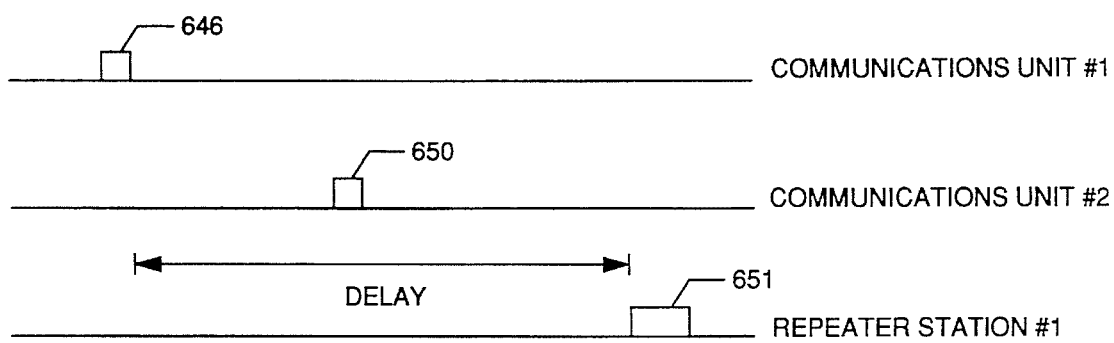
FIG. 45

WIRELESS PERSONAL PAGING, COMMUNICATIONS, AND LOCATING SYSTEM

CROSS-REFERENCE TO RELATED APPLICATIONS

This application relates to a copending application submitted by Craig A. Will entitled "Control of Miniature Personal Digital Assistant Using Menu and Thumbwheel," Ser. No. 08/423,690, filed Apr. 18, 1995. The application also relates to a copending application submitted by Craig A. Will entitled "Personal Paging, Communications, and Locating System," Ser. No. 08/191,111, filed Feb. 3, 1994.

FIELD OF THE INVENTION

This invention relates generally to electronic communication systems for sending signals selectively to portable receivers that provide an indication or alarm to specific individuals that is humanly perceptible, and further to systems that indicate the location of individuals. It relates to the transmission of message dam encoded as digital pulses modulating a radio wave to portable receivers, and also relates to the transmission of message data, identification, and location information using digital pulses optically, particularly by infrared light, and acoustically, particularly by ultrasound. The invention further relates to the indication of incoming calls from a telephone PBX system and the forwarding and transfer of such calls.

More specifically, the invention relates to a system for communicating with individuals in a building using digitally encoded radio in one direction and a combination of either infrared light or ultrasound and radio in the other, with users receiving paging indications and messages and being able to acknowledge and respond to messages and to originate messages, with the system also tracking the location of individuals and providing communications to allow users to transfer incoming telephone calls remotely.

BACKGROUND OF THE INVENTION

A frequent difficulty in an office or similar environment is communicating with a particular individual when they are not in their office but still in the building. This results not only in "telephone tag" where people continue back-and-forth attempts to return telephone calls, but also in its physical analog where one person visits the office of another, only to find that person to be gone. The increasing use of electronic mail systems, both local within an office and long-distance systems such as the Internet, can help in many cases but also typically require the user to be near his or her computer. Similar problems occur for fax machines, where the primary communications bottleneck is often not transmission of the fax to a particular office, but notifying the recipient that a fax has arrived and getting it into their hands.

One solution to this problem has been the increasingly widespread use of paging receivers, and such devices have become increasingly miniaturized. Devices have been constructed, for example, that are the size of a credit card or that are included as part of a watch. Such systems, however, are typically one-way, transmitting only a telephone number, perhaps an additional short numeric code, or possibly a brief alphanumeric message, and are designed for use outside a building. (Typically, the reliability of receipt of a paging message is considerably higher outside a building than inside it.)

Within a building, there have been two general directions that system designs have taken. One is the use of radio paging systems within a building, which may be configured to allow receipt of electronic mail messages or to allow users to be notified that they have a call that they can then ask to be transferred to a nearby extension. For example, the Hagl invention (U.S. Pat. No. 5,151,930) transmits the fact of the incoming call and the telephone extension of the calling party by radio to a paging receiver, which indicates to the user that the call has come in and displays the number. The user then locates a telephone instrument and dials a code identifying the user, resulting in the incoming call being transferred to that instrument.

The other direction is the use of automatic personal locating systems that determine where in a building an individual is, and that can automatically route a telephone call to the nearest extension. For example, the Ward invention (U.S. Pat. No. 3,439,320) describes a system that uses ultrasonic sound (using a different frequency for each person) to track the location of individuals in a building so that telephone calls may be routed to them. A number of variations exist using different media. Thus, the Shipley inventions (U.S. Pat. Nos. 4,601,064 and 5,062,151) track the location of individuals that carry devices that repeatedly transmit a digital identifying code via infrared light that is then received by remote sensors installed in individual rooms of a building, with a central computer that polls the remote sensors and determines the location of an individual. Telephone calls can then, if desired, be automatically forwarded to the individual by the PABX system. The individual can, using a switch on the identification device, turn off the forwarding action at a given time if it would be inconvenient.

These approaches have a number of drawbacks. One-way radio paging signals can fail to deliver a message if the user is in an especially noisy environment, is in a "dead spot" resulting from metal shielding or other interference, or goes outside the range of the transmitter. While these difficulties can be prevented by repeating all transmissions multiple times, this approach does not make efficient use of bandwidth and can also result in considerable delay in receipt of a paging signal or message. One-way communication also does not allow an originator to know whether a message has in fact been received by a user and read, or allow the user to respond. In addition, the amount of message text that a user has access to is typically very limited because of the limited memory capacity of the unit carried by the individual. One-way systems that indicate to a user only that a call has come in require the user to find a telephone and dial sufficient digits to cause the call to be transferred, and typically require the caller to be placed on hold during this process, which may be annoying to the caller if the person being paged does not respond or hikes a long time to do so.

Systems that automatically track the location of individuals and automatically transfer incoming telephone calls to that location tend to be intrusive, because they necessarily cause a transfer even in circumstances that might be inappropriate (such as transferring a call to an individual who is in an office of someone he or she does not know well or who is in a group meeting that might be disturbed). While the Shipley invention allows a user to turn this automatic action on and off, it must be done in advance of a call, which is a nusiance and which is not reliable should the user forget to do so after changing his or her location.

The above difficulties are solved by the invention disclosed here (and related inventions) by its provision of both (1) two-way communication and (2) automatic tracking of the location of the individual. This combination allows responses to be sent which are chosen from a set provided with the original message, from a preprogrammed set, or composed by the user. Selection or composition of responses is made easy by use of a thumbwheel that allows display of messages and responses and their choice by pressing a single key (as is described in a copending application). Users have access to long messages, beyond the memory capacity of a paging unit, because they can be sent only part of a message and, if desired, request more. The communication and tracking system also makes possible the transfer of incoming telephone calls remotely by means of selection from a menu, as is described in another copending application.

The present invention provides both two-way communication and tracking by making use of a hybrid communication system with radio used for transmitting data to the user, and infrared light (or, in an alternative embodiment, ultrasonic sound) used for receiving data from the user. This hybrid system makes effective use of the strengths of each form of communication. Radio is used in one direction for broad coverage, ease of implementation, and relative reliability, while infrared light (or ultrasound) is used in the other direction (for acknowledgements, responses, original messages, and location tracking) because of its low power requirements, simplicity of design, small size of the necessary electronics, low cost, and its ability to determine the location of individuals (since infrared light and ultrasonic sound do not pass through walls). Radio is also desirable because its use could allow the design of a paging receiver that works both with conventional paging systems when outside the building and, in addition, with the system described here when inside the building, using the same components.

The use of this hybrid mix of communication media required the design of a communication protocol to fit the characteristics of the two media. The radio medium is characterized by good but not perfect reliability, and moderate to substantial capacity, depending upon availability of particular bands and whether the station is licensed or unlicensed. The infrared medium has somewhat limited capacity in this context because of the need for data to be transmitted repeatedly and because of the need to minimize drain on the battery and to minimize conflict with other nearby communication units. Ultrasound has a naturally low capacity resulting from its susceptibility to interference from echoes as the signal bounces off walls, floor, and ceiling. Both infrared, and, to a lesser extent, ultrasound, have somewhat variable reliability as the user moves from one room to another and as the unit changes position and orientation in that environment. Infrared and ultrasound, are, of course, desirable because they do not easily penetrate walls and ceilings and thus allow reliable identification of the location of the unit.

One example of the requirements for the protocol is illustrated by the fact that unlike more conventional protocols where data is transmitted and an acknowledgement signal is expected immediately if the data has been correctly received, with this protocol data must be sent without waiting for immediate acknowledgement of previous packets, with data broken down into packets with assigned sequence numbers and both data and acknowledgement packets containing the appropriate numbers. This is necessary because with a hybrid system, one direction can be reliable at a time when the other is not, and vice-versa. Other characteristics of the protocol include modifying the rate of repeated transmissions from units and transmissions from remote stations depending on the probability of expected responses and the user of indicators to signal to the user the status of the communication links, particularly when communication is being impeded. The use of a hybrid system utilizing radio and infrared light (or radio and ultrasonic sound) as media for communication between the communications unit carried by the user and the rest of the system is also disclosed in a copending application entitled "Personal Paging, Communications, and Locating System" (Ser. No. 08/191,111). The present invention extends that system by adding a second radio channel (rather than using wire or optical fiber) for transmitting data from the remote stations to the central station. The invention also includes optional repeater stations, describes a different mechanism for timing the transmissions from the communications units, and includes a mechanism for responding to remote agent software that is seeking to contact a particular individual.

The approach of utilizing radio extensively is particularly applicable for use with the 1,900 Mhz band that has recently been allocated by the Federal Communications Commission for personal communications services for unlicensed use in a building. It allows the paging, communications, and locating system to be completely wireless, eliminating the need for wiring a building to install the system, reducing costs, speeding up installation, and making installation practical in older buildings that cannot easily allow additional wiring.

SUMMARY OF THE INVENTION

The goal of the method and apparatus disclosed here is to provide a communications system that can send paging signals and brief messages to individuals within a building or complex of buildings, accept and deliver responses to these messages, and identify the location of individuals within the building.

Individuals communicate with a central communications station by means of a miniature communications unit carried by the individual that is typically about the size of a credit card and can be integrated into a wearable plastic corporate identification badge. The communications unit displays messages visually and can provide a visual and/or auditory alarm indicating the receipt of a message. Users can view messages and select or compose responses by means of a thumbwheel rotating cylinder and associated key. The unit consists of a microprocessor, a memory, a radio antenna and receiver, a speaker, a visual display, an infrared diode emitter (or ultrasonic sound generator), a thumbwheel and key, and visual and auditory indicators.

Communication from the central communications station to each individual unit is carried out by frequency-shift-keyed digital radio, with a single radio transmitter and antenna typically used for a given building or building complex. Communication from each unit to the central communications station is carried out by a combination of infrared light and radio. Remote communication stations that include an infrared light sensor are installed in individual rooms of the building and along corridors, and data is sent from the unit first to a remote station by infrared and then forwarded to the central station by radio.

The communications system is integrated into the telephone and electronic mail systems typically found in an office environment. A message may be generated as a result of a telephone ringing signal, the leaving of a voicemail message, or the receipt of an electronic mail message (either messages specifically intended to be sent to the remote unit or messages directed to the user's normal electronic mail address, the latter particularly if the sender or topic of the message matches a description provided by the user).

The system allows others (if desired by a user) to determine the current physical location of the user by sending an appropriate "location query" electronic mail message, with the originator automatically receiving a return message indicating the last known location of the user. The system also allows information from the personal locating system to control the forwarding of an incoming telephone call to an appropriate extension, its described in the copending application entitled "Wireless System for Indicating an Incoming Telephone Call and Controlling its Transfer."

While users can compose any response to a message or an original message, the miniaturization of the communications unit tends to make character entry laborious, and the system is designed on the assumption that responses usually involve the selection of preprogrammed responses included in the message, preprogrammed responses that can be selected from the memory of the unit, or very brief responses composed letter by letter. Examples of possible responses include "Message read and understood", "Will do", "Will call you back in 5 minutes", "Will call you tomorrow", etc. Responses are preferably selected or composed by means of a thumbwheel and single key, which takes up little space. The thumbwheel and key interface is described in detail in the copending application entitled "Control of Miniature Personal Digital Assistant Using Thumbwheel." Messages can also be originated from the unit, either selected from a set of preprogrammed messages (e.g., "Got your Fax"), or composed at the unit.

Only part of especially long messages are sent to the unit, with the user able to obtain additional data by selecting a response requesting "More".

The system uses a communication protocol designed for the special characteristics of a hybrid radio-infrared light system. It is assumed that the radio link is usually highly reliable, but that occasional errors and outages may occur due to electromagnetic interference, metal shielding, or movement of the user outside of the range of reception.

Messages are transmitted or held at any given moment depending upon the status of the communication unit and the priority of the message. Units are in one of five status states: (1) Receiving and Responding; (2) Not Receiving but Responding; (3) Not Receiving or Responding; (4) Receiving but Not Responding; or (5) Not Responding, depending upon the conditions of the last response received from a unit. Thus, for example, Ring messages (resulting from incoming telephone calls) are not transmitted to a unit that is Not Receiving or Responding (and thus likely out of the building), but if caller identification information is available for the call, the message is stored so that the user is informed of the call upon returning to the building.

Data transmitted both to and from the communications unit is error checked, with correct receipt ensured by retransmission. However, because the communications medium is different (radio versus infrared light) in different directions, it is frequently the case that at any particular time, the communications circuit is reliable in only one direction. Instead of the usual transmission-acknowledge-or-timeout-retransmission protocol, data is sent in the form of short packets, with each packet given a sequence number. Packets continue to be sent even without acknowledgement if there is reason to believe that a unit may be receiving. Acknowledgements are sent with the corresponding packet sequence number when each packet has been received. If an acknowledgement has not been received from a unit under conditions that suggest that such an acknowledgement would have been received if the original packet had been received correctly, that packet is retransmitted. Acknowledgements are themselves acknowledged by a packet sent to the unit via radio to terminate the repeated transmission of an acknowledgement. Units autonomously and repeatedly transmit an identification signal via infrared together with any acknowledgements or input data that may be queued, with intervals between transmissions varying to reduce conflict between units.

Remote stations receive data from communication units and retransmit it after a delay, with the delay randomly determined within limits that depend on the type and amount of information in the packet, so as to reduce the probability of overlapping transmissions from two or more stations. If necessary, repeater stations can be added to improve coverage and reliability, with repeaters both receiving and transmitting via infrared and also adding a delay. Both remote and repeater stations may be packaged as picture frames so as to easily blend into the environment.

If a user has initiated a response or original message but it has not been successfully transmitted from the unit, the unit indicates this by turning on a "Communications Trouble" indicator to indicate that the infrared signal is not being received, so that the user can change the position or orientation of the unit to reestablish contact. The indicator is similarly turned on if packet sequence numbers indicate that a message should have been received but has not so that the central station can more quickly become aware of this and retransmit it.

As an additional verification of transmission reliability, a special "Confirm Data" packet is repeatedly transmitted from the central station to each communications unit, containing the sequence number of the last packet in each priority level that has been transmitted to that unit. If the unit receives such a packet and determines that a packet has been transmitted to the unit but not received, an indicator is turned on to notify the user, depending upon the particular priority of the message.

An alternative embodiment of the system uses ultrasound rather than infrared light as the communications medium for sending data from the communications unit to the remote station.

BRIEF DESCRIPTION OF THE DRAWINGS

FIGS. 4A, 4B, and 4C show front, rear, and side views, respectively, of the physical layout of the communications unit.

FIG. 5 is a block diagram showing the architecture of the hardware for a remote station.

FIG. 6A, 6B, and 6C show front, side, and rear views of a physical implementation of a remote station packaged with a picture frame.

FIG. 23 shows the format of the Unit Status List.

FIG. 24 shows the Message to Unit Queue, which holds messages to be sent to units.

FIG. 25 shows the data structure of the Packet to Unit Queues, including Queues A, B, C, D, E, F, and G.

FIG. 28 shows the data structures for the maps between email addresses and unit IDs and channels.

FIG. 29 shows the data structure for the Input Data from Unit Queue, which holds packets received from a communications unit.

FIG. 30 shows the data structures that hold the preprogrammed responses, messages, and email addresses.

FIG. 31 shows the data structures for the Time Event Queue.

FIG. 39 shows the data structure for the Incomplete Message Packet Map.

FIG. 40 shows the data structure for the Packets Unassigned to Messages List, used in the software in the communications unit.

FIG. 41 shows the data structures for the Packet Text List.

FIG. 42 shows the data structure for the Display Memory and the associated Display Window.

FIG. 43 shows the data structures for the Input Data Queue, Packet Acknowledge Queue, and Unit Transmission Buffer.

FIG. 45 shows the timing relationships between transmissions by communications units, repeater stations, and remote stations.

DESCRIPTION OF THE PREFERRED EMBODIMENT

Figure 1:
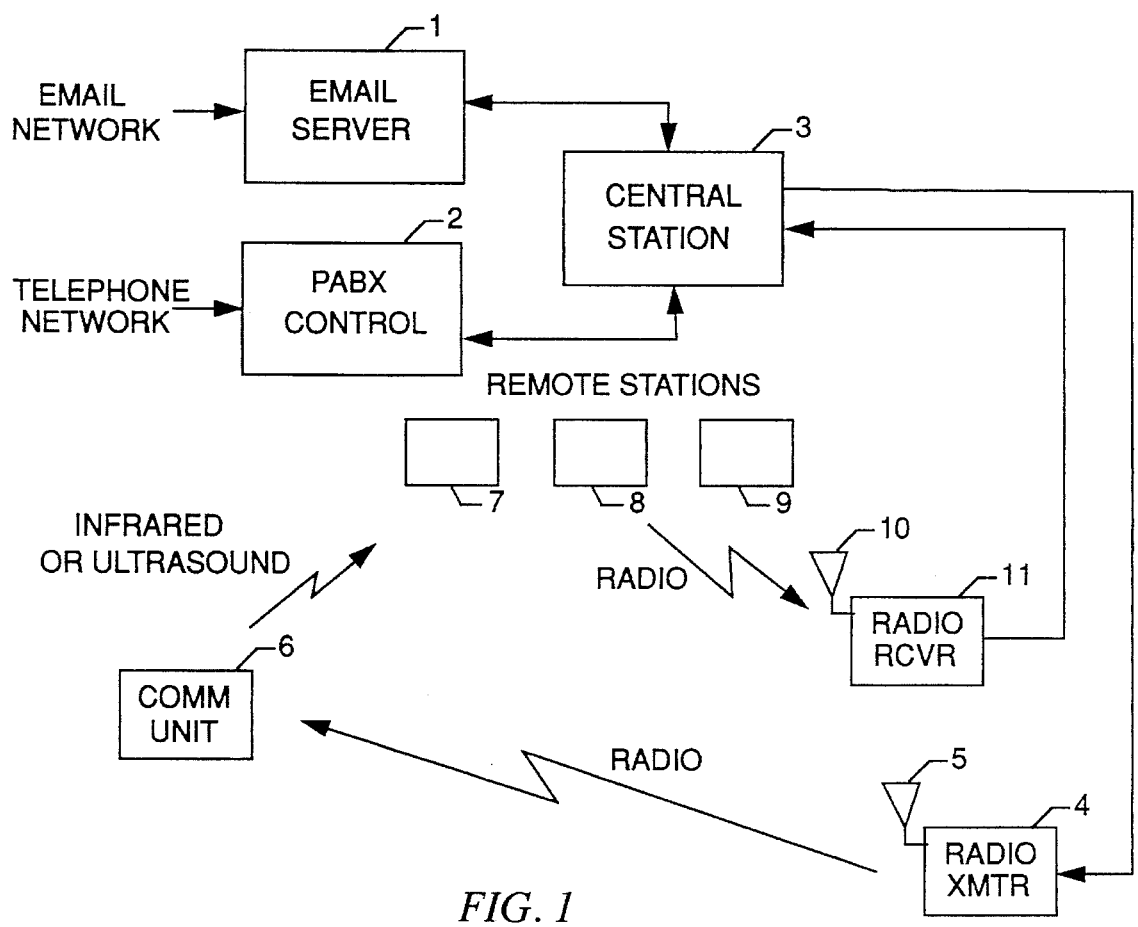
FIG. 1 shows a block diagram of the hardware for the communications system, showing the central communications station, PABX system, electronic mail server, radio transmitter, some of the remote receiving stations, and, one of the communication units carried by users.

FIG. 1 shows a block diagram of the hardware for the communications system, showing the central communications station, PABX system, electronic mail server, radio transmitter, some of the remote receiving stations, and one of the communication units carried by users.

The central communications station 3, which consists of a 16-bit microprocessor, memory, a 1 khz real-time clock, and appropriate communication interfaces, transmits messages in the form of digital bitstreams by means of the frequency-shift-keyed radio transmitter 4 and antenna 5. A typical frequency for transmitting data to the communications units is 1,900 Mhz. A message is received by communications unit 6, which decodes it, enters the message into its internal memory, and displays the message visually and turns on visual indicators and/or auditory alarms, as appropriate. The unit will also generate an acknowledgement for each message, that is sent to the central station.

Each communications unit 6 transmits an identification code in the form of digitally encoded infrared light, which is received and stored by one or more remote stations 7, 8, and 9 receiving it. Other data, such as acknowledgements of received messages, responses, or original messages are also included with the identification signal when available. The remote station then forwards the response from the unit to the central station via radio on a different channel than that used for data from the central station to the communications units. The response includes the unit identification code, any additional data that the station has received from the communication unit, and an identification code for the remote station. Each remote station consists of one or more photodiode infrared detectors, an analog-to-digital converter, a microprocessor, memory, a real-time clock, serial communications interfaces, a radio transmitter and modulator, and antenna. A typical frequency for transmitting data from the remote station and receiving it at the central station is 1,920 Mhz. These frequencies are in the band recently allocated for unlicensed personal communications services in buildings. (Until this band becomes fully operational more conventional bands can be used).

The two primary sources of messages are the electronic mail network and incoming telephone calls. An incoming electronic mail message is transmitted by a remote workstation through an electronic mail server 1 and to the central communications station 3, which transmits the message via radio 4 to the appropriate communications unit 6. The user can, if desired, choose a response that will be transmitted back to the originator of the message.

An incoming call to the user's extension enters the PABX system control 2, with the call indication, extension number called, calling number and any further identification of caller, if available, passed to the central communications station 3 and then transmitted by radio 4 as a message to the communications unit 6. (A "message", in the present application, means either text or a paging signal such as that indicating an incoming telephone call.)

The user may select a response, which is passed by infrared light to a remote station 7 (with a code added to identify the remote station), with the response sent to the central communications station 3 and then to the PABX control 2, which can, if desired, initiate a call transfer, either to a receptionist, to a voicemail system, to the extension where the user is located, or to another extension.

(In an alternative embodiment, ultrasonic sound is used instead of infrared light for communication from the communications unit 6 to the remote stations 7, 8, and 9. In this case each remote station has an ultrasonic microphone and appropriate signal processing hardware instead of a photodiode infrared detector. In this application, references to "infrared light" can usually be interpreted as meaning "infrared light or, in an alternative embodiment, ultrasonic sound." The two media of infrared light and ultrasonic sound form a class of radiated energy that has as its primary common characteristics the inability to penetrate walls, ceilings, floors, and doors, the ability to be reflected by walls, ceilings, floors, and doors, and relatively short-range transmission capabilities when used at the power levels practical with miniature, battery operated devices.)

Figure 2:
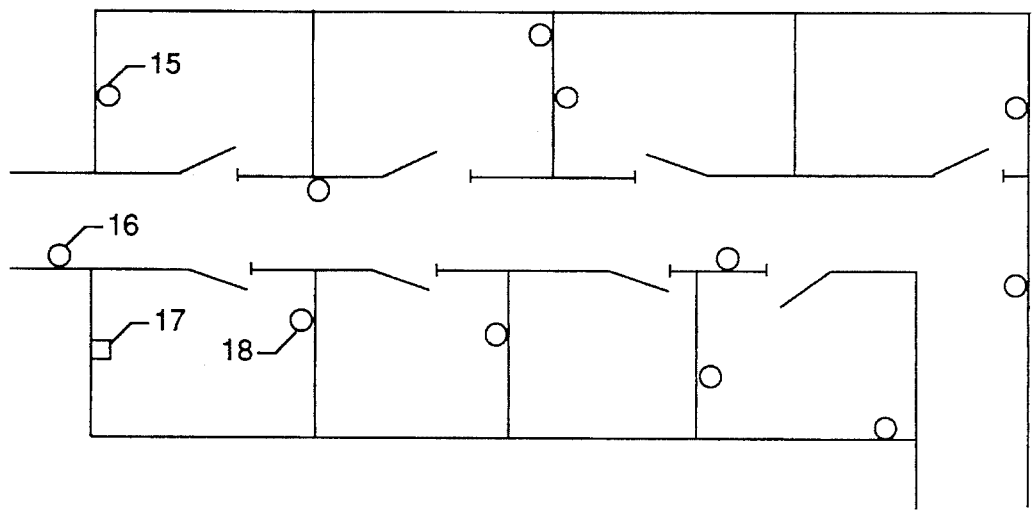
FIG. 2 shows the configuration of infrared detectors and associated remote communications stations in different rooms of a building and along a corridor, with each detector and station shown as a circle.

FIG. 2 shows the configuration of infrared detectors and associated remote communications stations in different rooms of a building and along a corridor, with each detector and station shown as a circle. Station 15, for example, is installed in an office, while station 16 is installed in a corridor. Infrared detectors may be mounted on walls or on the ceiling, and more than one detector may be used in a given room to provide more reliable coverage. Repeater stations may be used, in addition, as shown by repeater 17. A repeater 17 receives an infrared signal and then retransmits it via infrared to a remote station 18.

Figure 3:
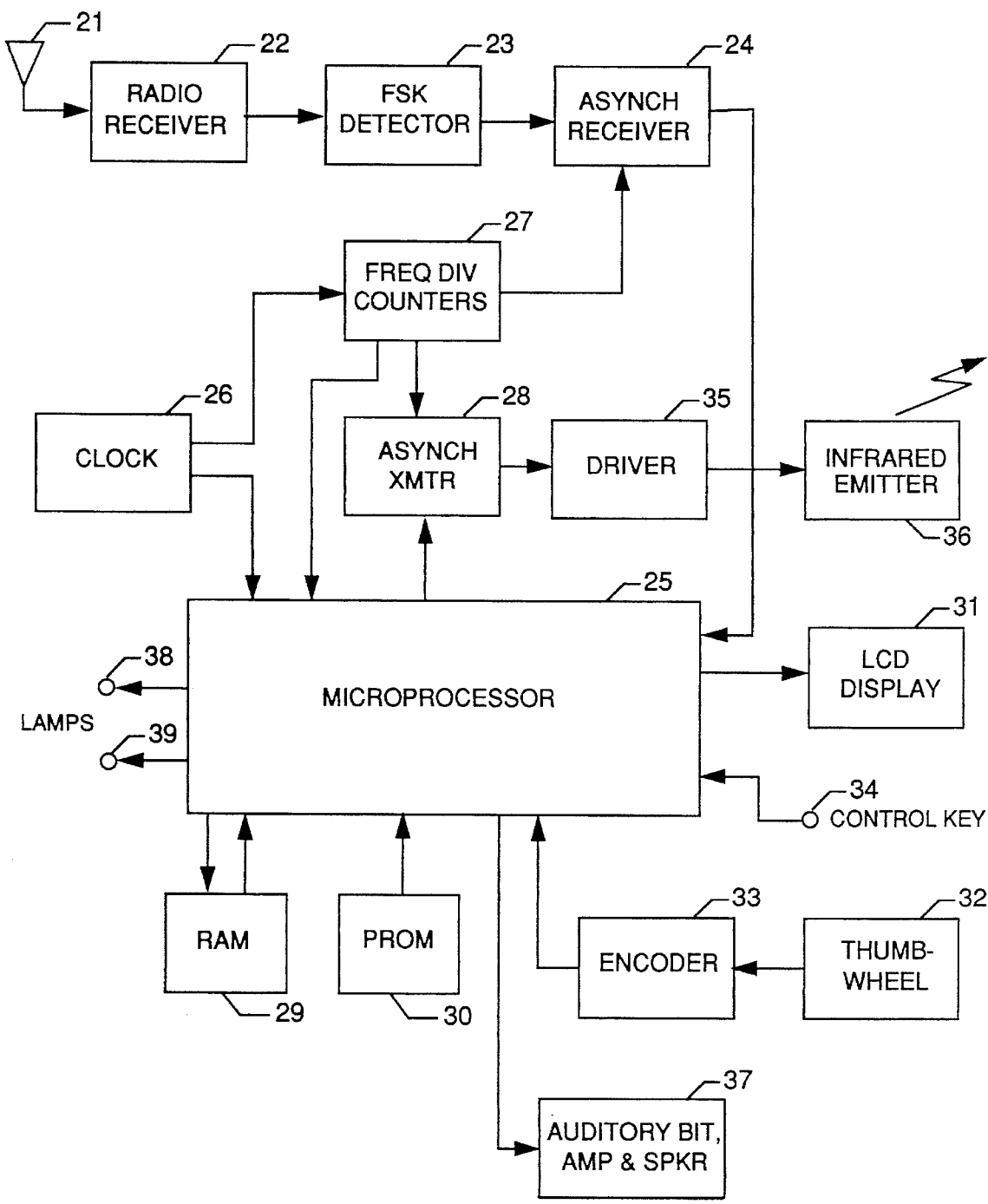
FIG. 3 is a block diagram that shows the hardware architecture of the communications unit.

FIG. 3 is a block diagram that shows the hardware architecture of the communications unit.

All of the integrated circuits in the communications unit are especially miniature, lightweight, and have low power consumption. The radio signal broadcast from the central communications station is picked up by the antenna 21 and passed to the radio receiver 22 and to the frequency-shift-keyed detector 23. The output of the FSK detector is applied to a shift register and associated logic 24 which converts the 19,200 bit/second bit serial data to 8-bit parallel form before providing it to the microprocessor 25, generating an interrupt when each character is received.

The microprocessor itself 25 is a 8-bit processor. A Colpitts crystal oscillator 26 operating at 3.932 Mhz provides a real-time clock signal directly to the microprocessor at this frequency and also to frequency dividing counters 27 that provide a 307.2 khz (16 times the 19,200 bit/second bit rate) clock signal to the asynchronous character receiver (shift register) 24, a 38.4 khz clock signal to an asynchronous character transmitter 28, and a 1.2 khz clock signal to the microprocessor for use as a clock generating an interrupt for use with timing of the thumbwheel position encoder and auditory and visual indicators. The thumbwheel position is sampled 18.75 times per second. (A different clock frequency is provided for the transmitter 28 in the case of ultrasonic transmission).

Associated with the microprocessor is a programmable read only memory (PROM) 30 with 4K bytes of storage, and a random access memory (RAM) 29 with 8K bytes of storage. The PROM contains the program for the microprocessor while the RAM contains messages after conversion to digital codes, information extracted from the messages for display to the user, and other information.

Software in the microprocessor extracts information to be displayed, which is placed into a memory and causes characters to be displayed on the liquid crystal display 31. The display also includes indicators indicating that a message is available and its priority. Lamps 38 and 39 also indicate when there is a Ring or Urgent message or indicate the status of the communications circuit. In addition, an auditory bit, audio amplifier, and speaker 37 can provide an auditory alarm. A thumbwheel 32 allows the user to display messages and responses that are stored in memory. The thumbwheel is sampled by an encoder 33 that sends a 10-bit representation of its position to the microprocessor. A user may also press the control key 34 to send a response to a message, to transmit a message, to select a command, or to delete a message.

Data from the communications unit is sent at a rate of 38,400 bits per second, with the microprocessor sending each 8-bit character to the asynchronous transmitter 28, which sends each bit to a driver 35 and to an infrared emitter diode 36. (More than one emitter may be used to provide coverage in different directions). (In the alternative embodiment using ultrasound, the driver and infrared light emitter is replaced by an ultrasonic frequency synthesizer, pulse encoder, amplifier, and ultrasonic transducer, and the transmission rate is much reduced.)

When an auditory signal is desired to alert the user, the microprocessor produces it by toggling an Auditory Output Bit at an auditory signal rate that is amplified by an operational amplifier and speaker 37.

FIG. 4A shows a front view of the physical layout of the communications unit. At the very top left are infrared diode emitters 40 and 41 (replaced by one or two ultrasonic transducers in the alternative embodiment using ultrasound). Lamp 42 at the top indicates when a Ring or Urgent message has been received, with the lamp flashing at a rate of two flashes per second indicating a Ring and the lamp flashing at a rate of one flash every two seconds for 20 seconds, then turning solid, indicating an Urgent message. At the far right is the Communications lamp 43, which indicates the status of the communications circuits. If the lamp is turned on for any significant period of time, it indicates trouble. If a user has sent input data (i.e., responded to a message) but has not received an acknowledgement of it, the lamp is solidly on. If the unit has failed to receive data and no response from the unit has been received recently, the lamp is also turned on. In contrast, a momentary flicker (150 mS) of the lamp indicates a successful transmission from the unit. Just below is the liquid crystal display 44, with a mark at the center left of the display that serves as a cursor 45 indicating the response being selected or the message being deleted. Below the display is an optional identification photo 46, included when the communications unit is incorporated into a corporate identification badge. At the bottom left is a speaker 47 capable of emitting sounds in the sonic range to server as an auditory alarm. At the bottom center is a key 48 used for deleting messages, for sending a response that has been selected, for executing proprogrammed commands, and for making other selections depending upon the context. At the bottom right is a thumbwheel—a small cylinder 49 that can be rotated either up or down by the user's thumb that is used to control the display of messages, responses, and other information.

FIG. 4B is a rear view of the unit, showing optional corporate and employee identification information 52 and a clip 53 for attaching the unit to the user's clothing. An access plate 54 for replacing the battery is also shown.

FIG. 4C is a side view of the unit, showing the infrared emitters (or ultrasonic transducers) 40 and 41, liquid crystal display 44, and clip 53.

FIG. 5 is a block diagram showing the architecture of the hardware for a remote station. An infrared signal arrives at the infrared detector 55 and is converted to an analog electrical signal and provided to the analog-to-digital converter 56, which, in turn, provides its output to a microprocessor 57. (The analog-to-digital converter 56 is not essential for the use of infrared, but it allows adjustment of the mark/space signal threshold depending upon the strength of the received signal at a given time, improving the ability of the station to successfully decode signals with a low signal-to-noise ratio. The converter is necessary if ultrasonic transmission is used.) The microprocessor 57 executes a program contained in the programmable read only memory (PROM) 59. The ID for the remote station could be contained in the PROM or, alternately, in switches (such as those packaged similar to dual inline plastic chips) that are set at the time of installation. The random-access-memory (RAM) 60 temporarily stores received data and other information. A real-time clock 58 provides timing pulses to the microprocessor 57 and to the asynchronous transmitter 61, which takes 8-bit parallel data characters from the microprocessor 57 and converts them to serial data at 38,400 bits per second, adding a start and stop bit. The serial data is provided to a radio transmitter 62, which modulates a radio signal at 1,920 Mhz by frequency-shift-keying. The transmitter provides its output to an antenna 63.

FIGS. 6A, 6B, and 6C show front, side, and rear views, respectively, of a physical implementation of a remote station packaged with a picture frame. This is one approach to a remote station that is quickly and easily installed and that blends in with the existing environment.

FIG. 6A shows a front view of the station, indicating a picture frame 64, with a picture 65 mounted in it. In this version, the center of the picture has an infrared detector 66 in it. (Pictures selected for picture frames with remote stations installed are preferably recognizable as similar in some way—a particular form of abstract art, seascapes, etc., so that users can easily tell which pictures contain a remote station and which do not. Alternatively, the picture frame itself could have a distinctive color or style.)

FIG. 6B shows a side view, with a picture frame 64, picture 65, and infrared detector 66. In addition, the electronics 67 for the station microprocessor, clock, radio transmitter, memory, etc.) are contained in a compartment in back of the picture, as is a battery or other power source 68.

FIG. 6C shows a rear view, with a dipole antenna 69 and a hanger 70. (A vertical dipole or whip antenna could also be used.)

Figure 7:
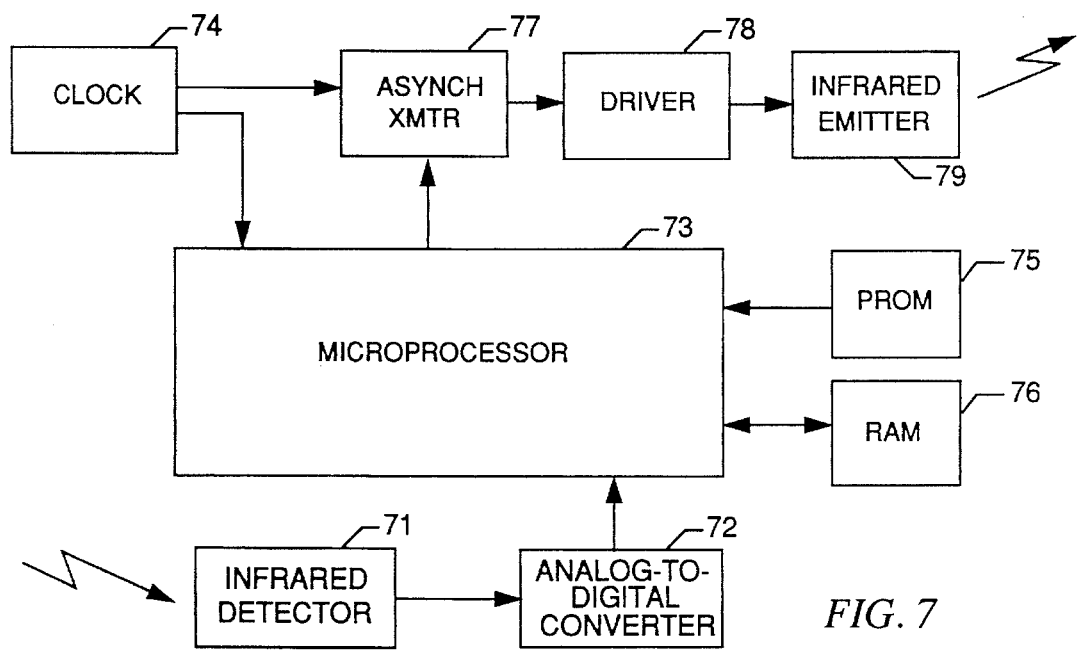
FIG. 7 shows a block diagram of the architecture of the hardware for a repeater station.

FIG. 7 shows a block diagram of the architecture of the hardware for a repeater station. An infrared signal arrives at the infrared detector 71, and is converted to an analog electrical signal and provided to an analog-to-digital converter 72, which in turn provides its digital output to a microprocessor 73. The microprocessor 73 executes a program contained in a PROM 75, with a RAM 76 storing received data and other information. The repeater may also be assigned an optional identification code, which can be contained in the PROM or set by switches at the time of installation. A real-time clock 74 provides timing pulses to the microprocessor 73 and to the asynchronous serial character transmitter 77, which takes 8-bit parallel data, converts it to serial at the same bit rate as that received at the infrared detector 71, and provides it to an amplifier and driver 78 and then to an infrared emitter 79.

Figure 8A:
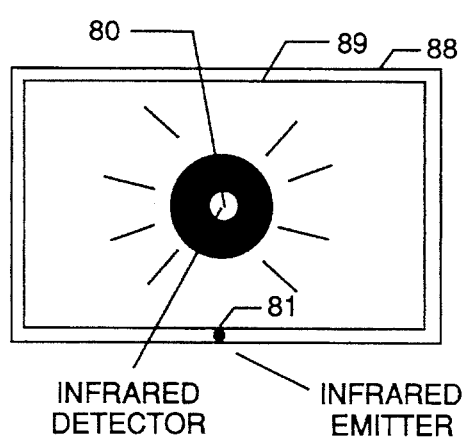
FIGS. 8A and 8B show a physical implementation of a repeater station and how a repeater and remote station might be installed in a room.
Figure 8B:
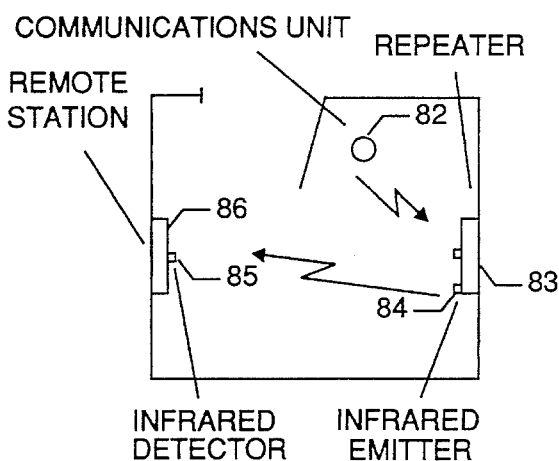

FIGS. 8A and 8B show a physical implementation of a repeater station and how a repeater and remote station might be installed together in a room.

FIG. 8A shows a front view (analogous to FIG. 6A) of a repeater packaged with a picture frame. The repeater is packaged similarly to the remote station shown in FIGS. 6B and 6C. Picture frame 88 contains a picture 89, which in turn contains an infrared detector 80. The picture frame also contains an infrared emitter 81. The infrared emitter might usefully be mounted on a swivel base so that it can be aimed at the infrared detector in a remote station.

FIG. 8B shows the layout of a repeater and remote station in a room and how it is used. A communications unit 82 transmits a packet of data via infrared, which is received and stored at repeater station 83. Alter a delay, the repeater station transmits the data again, in the same format as was transmitted by the communications unit, by means of the infrared emitter 84, which is then received by the infrared detector 85 at remote station 86 so that it can be retransmitted. Whether a repeater or repeaters are necessary or desirable in any given situation depends upon many factors, including the layout, size of, and obstructions in particular rooms, the reflectance of walls, the power (and resulting battery drain) of the infrared emitter (or ultrasonic transducer) in the communications unit, and whether infrared or ultrasound is used (with infrared generally more likely to require repeaters).

Figure 9:
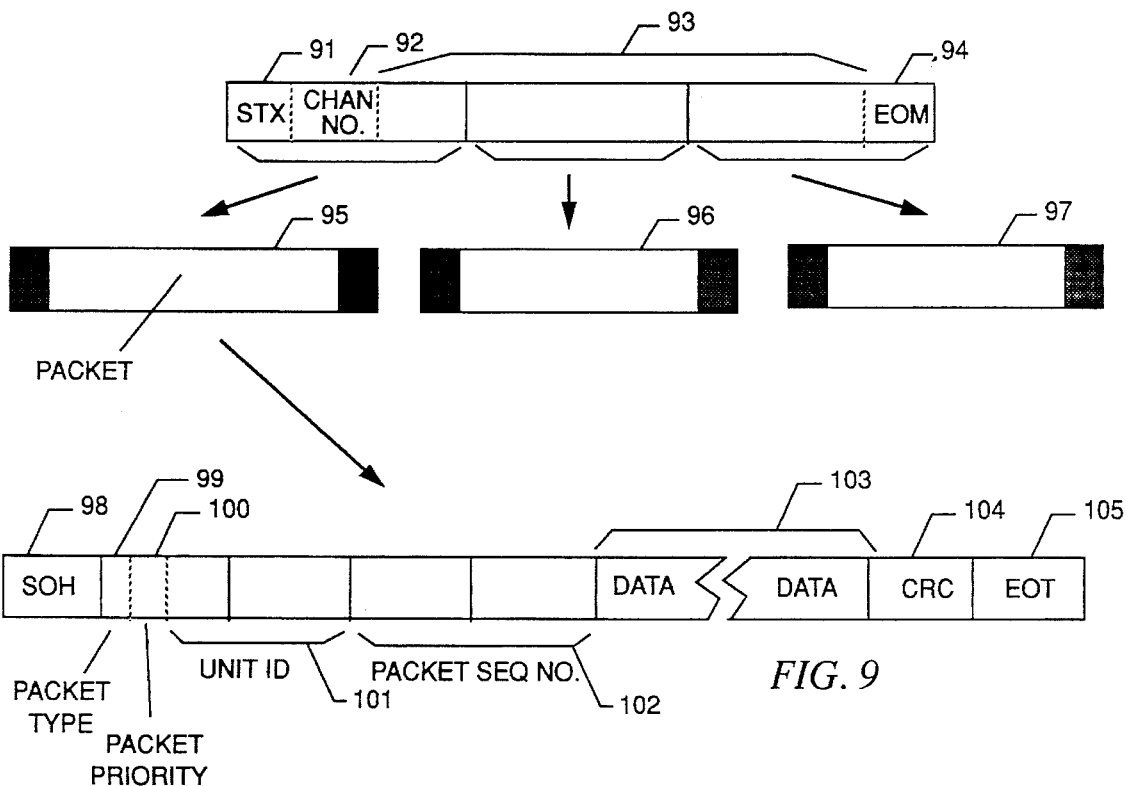
FIG. 9 shows the format of a message sent to the communications unit, how it is broken down into packets for transmission, and the format of a Data packet.

FIG. 9 shows the format of a message sent to the communications unit, how it is broken down into packets for transmission, and the format of a Data packet. The upper part of the figure shows the message text, which begins with an STX 91, followed by a 7-bit channel number 92 (assigned when the first packet in the message is placed in the queue for transmission), the actual text of the message 93, ending with an EOM 94.

The message text may include special characters designating specific situations, such as the receipt of a Fax, voicemail message, or Print job, that causes indicators in the communications unit to be displayed. If the entire message stored in the Email Incoming Message Archive is not contained in the message, an ASCII ETB character just before the EOM indicates this.

The message text is broken up into from 1 to 8 packets, depending upon the length of the message, with the example shown a message with 3 packets. Each packet can hold a maximum of 42 data characters. The middle part of the figure shows how the message text 93 is divided up and placed into packets 95, 96, and 97, with header and error check information added to the beginning and end of each packet.

The lower part of FIG. 9 shows the format of a Data packet. The packet begins with an ASCII start-of-header (SOH) character 98, with the higher order bit (which is sent last) set to 0. All data in the figures showing packet formats show 7-bit characters for simplicity; however, each character transmitted is actually 8 bits in length (plus start bit and stop bit for a total of 10 bits). The 8th (higher order) bit is set to 1 except in two cases: An SOH character and an ASCII end-of-transmission (EOT) character. The character following the SOH character in the Data packet contains 2 bits designating the packet type 99 (00 if Data, 01 if Input Data Acknowledgement, 10 if AckAck, and 11 if Not Responding). Two following bits in the character are used to indicate the priority of the packet 100 (Ring, Urgent, High, or Normal). The remaining 3 bits of this character and the 7 bits of the following character contain a 10-bit identification field 101 designating the communications unit. The two characters following that 102 contain a 14-bit Packet Sequence Number (7 bits in each character), followed by from 1 to 42 data characters 103, a 7-bit cyclic redundancy check (CRC) 104, and an EOT 105. The first 2 bits of the Packet Sequence Number are the same as the packet priority. A data packet thus has a total of from 8 to 49 characters.

Figure 10:
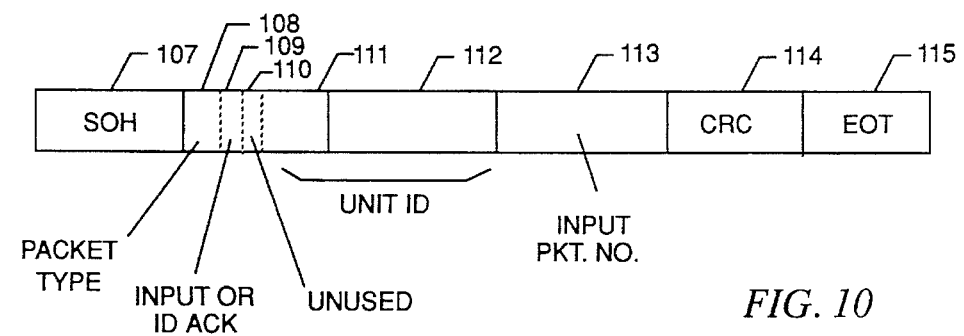
FIG. 10 shows the format of an Input Acknowledgement Packet.
Figure 11:
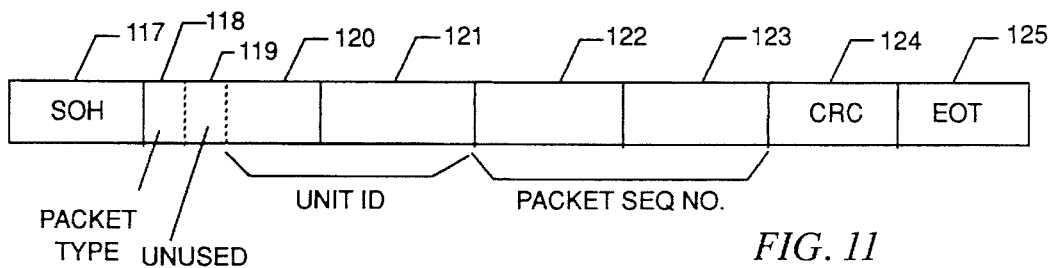
FIG. 11 shows the format of an "AckAck" or "acknowledgement of an acknowledgement" packet.
Figure 12:
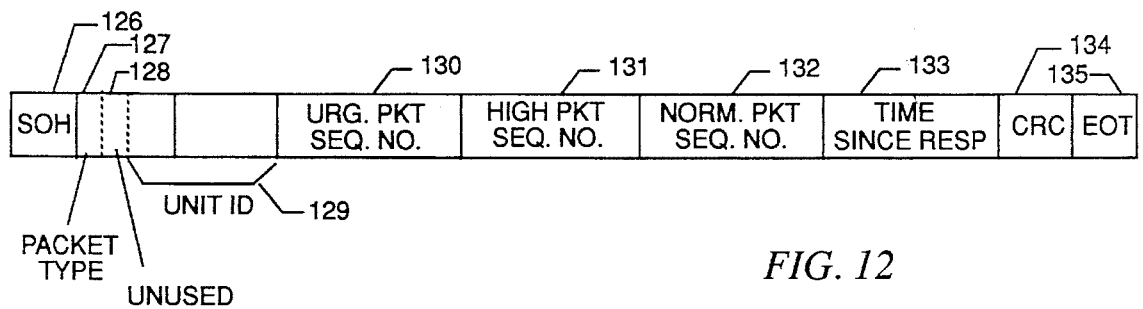
FIG. 12 shows the format of a Confirm Data packet.

FIGS. 10–12 (and part of 9) show the data formats associated with the transmission of data in packets from the central communications station to the communication units and in the return direction.

FIG. 10 shows the format of an Input Acknowledgement Packet. This packet is received by the unit via radio. There are two forms of this packet: InputAck and UnitAck. An InputAck acknowledges an Input Data packet sent by the unit. A UnitAck acknowledges the ID sent by the unit if input data is not sent. The packet begins with an SOH character 107, with the following character consisting of the following fields: A 2-bit field indicating the packet type 108 (Data, Input Data Acknowledge, AckAck, or Not Responding), a bit 109 indicating whether this is an InputAck or UnitAck, an unused bit 110, and 3 bits 111 for the upper 3 bits of a 10-bit identification field designating the communications unit. The following character contains the remaining 7 bits 112 of the unit ID, and the character following that 113 a 7-bit Input Packet Number, a packet sequence number for the input data packet that is being acknowledged. The character after that 114 is a CRC and the character following that is an EOT 115.

FIG. 11 shows the format of an "AckAck" or "acknowledgement of an acknowledgement" packet. This packet is received by the unit via radio, and its purpose is to cause the termination of repeated transmissions of acknowledgements from the communications unit. The packet begins with an SOH character 117, with the following character consisting of the following fields: A 2-bit field indicating the packet type 118 (Data, Input Data Acknowledge, or AckAck), 2 unused bits 119, and 3 bits 120 for the upper 3 bits of a 10-bit identification field designating the communications unit. The following character contains the remaining 7 bits 121 of the unit ID, and the two characters following that 122 and 123 a 14-bit Packet Sequence Number for the data packet for which an acknowledgement has been received. The character after that is a CRC 124 and the character following that 125 is an EOT.

FIG. 12 shows the format of a Confirm Data packet. This packet is sent via radio to the communications unit at frequent intervals to confirm that all Data packets sent (except Ring packets) have been received by the unit. The packet begins with an SOH character 126, with the following character consisting of the following fields: A 2-bit field indicating the packet type 127 (11 if Confirm Data), 2 unused bits 128, and 3 bits for the upper 3 bits of a 10-bit ID field 129 designating the communications unit. The following character contains the remaining 7 bits of the unit ID. The following two characters contain the last packet sequence number transmitted for the Urgent priority 130, the next two the same for the High priority 131, and the next two the same for the Normal priority 132. The following character 133 contains the time since a response has been received by the unit, in tenths of a second. The character following that 134 contains a CRC, and the final character 135 an EOT.

Figure 13:
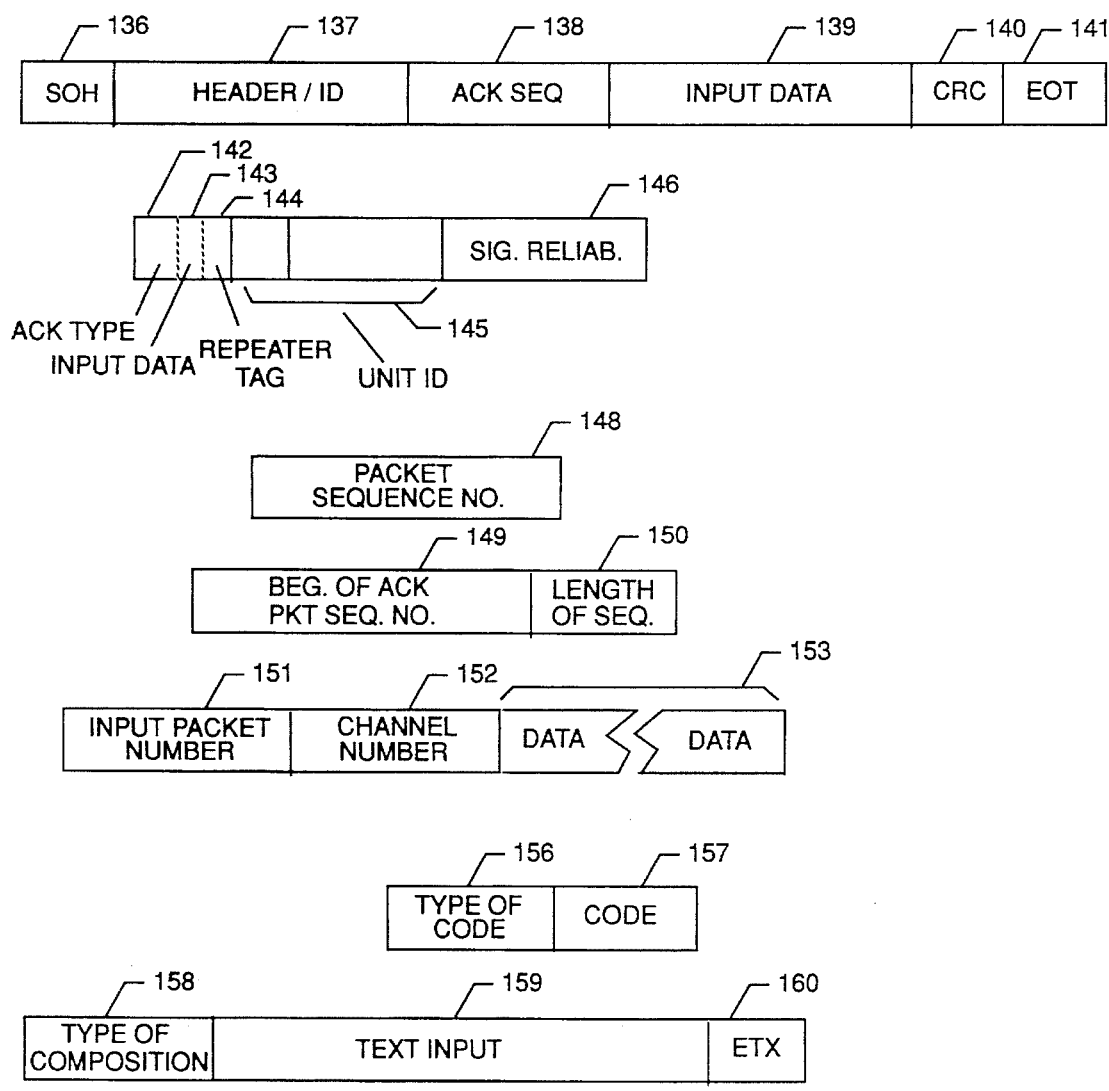
FIG. 13 shows the format of packets sent from the communications unit to one or more remote stations via infrared light.

FIG. 13 shows the format of packets sent from the communications unit to one or more remote stations via infrared light.

The top diagram in the figure shows the general structure of the packet, including an SOH character 136, a 3-character header/ID sequence 137, an acknowledge sequence 138 of 1 or 2 characters, input data 139 of 3 to 32 characters, a CRC 140 and an EOT character 141. The acknowledge sequence and input data sequence are optional, as indicated by the bits set in the header/ID sequence.

The diagram just below shows details of the header/ID sequence. The first character consists of the following fields: A 2-bit field 142 indicating the acknowledgement type (00 indicates that no acknowledgement is being transmitted, 10 indicates that a single packet is being acknowledged, while 11 indicates that more than one packet, in a continuous sequence, is being acknowledged), a 1-bit field 143 indicating whether or not input data is being transmitted. 1 bit for a Repeater Tag Bit 144, and 3 bits of the 10-bit unit ID code 145. The Repeater Tag Bit is 0 when the packet is sent by a unit, but set to 1 if the packet is retransmitted by a repeater station. (In an alternative embodiment a 10-bit repeater ID code is substituted for the Repeater Tag Bit). The second character consists of a single 7-bit field with the remaining 7 bits of the ID code. The third character contains a 7-bit field 146 containing a number representing the calculated reliability of the radio transmissions being received by the unit.

The two diagrams below the header/ID sequence show the two alternative formats for sending an acknowledgement of a data packet received by the unit. In one format 148 a single data packet is acknowledged (with a two-character sequence containing the 14-bit packet sequence number of the data packet). In the other format a continuous sequence of packets is acknowledged, with the first two characters containing the 14-bit packet sequence numbers 149 of the beginning packet being acknowledged and a 7-bit field in the third character 150 containing the length of the sequence being acknowledged.

The next diagram shows the format of an input data sequence, including a 7-bit Input Packet Number 151 in the first character of the input data packet, a 7-bit channel number 152 referring to the original packet that this is a response to (with the number set to 0 if this is an original message and 1 if a response to a message from the PABX control) and 1–20 characters of data 153.

A specific form of the Input Data Sequence 151, 152, and 153 includes as data only a single ASCII DEL character, indicating that the user has deleted the message referred to by the channel number and that the channel number should be deassigned and the message deleted from the Email Incoming Message Archive. Another form has two DEL characters in succession, indicating an Undelete—that is the previous Delete command is to be reversed.

The next two sequences show the input data formats. There are two formats, a two-character compressed fixed length sequence, and a variable length sequence. The two-character sequence consists of an ASCII character 156 indicating the type of code, followed by a 7-bit character 157 indicating the particular code. The ASCII characters used for indicating code type are ENQ, BEL, BS, HT, and VT.

If the type character 156 is an ENQ, this is a Response Code. If the 7-bit code that follows 157 is from 0 to 19, the response indicates one of the responses (with 0 referring to the first response, 1 to the second, etc.) included with the message sent to the unit. If the code 157 is from 21 to 127, the response indicates one of the preprogrammed responses in the Preprogrammed Response List. If the code is 20, it indicates that the user has selected the *MORE* response to obtain more of the email message. (The Preprogrammed Response List, Preprogrammed Message List, and Preprogrammed Email Address List are contained in data structures in both the Central Station and Communications Unit.) If the type character 156 is a BEL, this is a response but using one of the preprogammed messages in the Preprogrammed Message List, its indicated by the code 0–127. If the type character is an HT, this is a command code, with the code as indicated by the code character 0–127 and retrieved from a hard-coded Command List. If the type character is a VT, this is an Email Address code, with the code as indicated by the code character 0–127 and retrieved from the Preprogrammed Email Address List. Multiple addresses can be used by providing additional character sequences. If the type character is a BS, this is an original message, with the message as indicated by the code 0–127 and retrieved from the Preprogrammed Message List. The message will be sent to the email address sent in the same or previous transmission of input data.

If the type character is a FF, SO, or SI, this is a variable-length (uncompressed) sequence, which consists of a type character 158, 1 to 30 characters of text 159, followed by an ETX character 160. An FF indicates a composed response, SO a composed message, and SI a composed Email Address. Multiple email addresses can be used by using additional character sequences.

Figure 14:
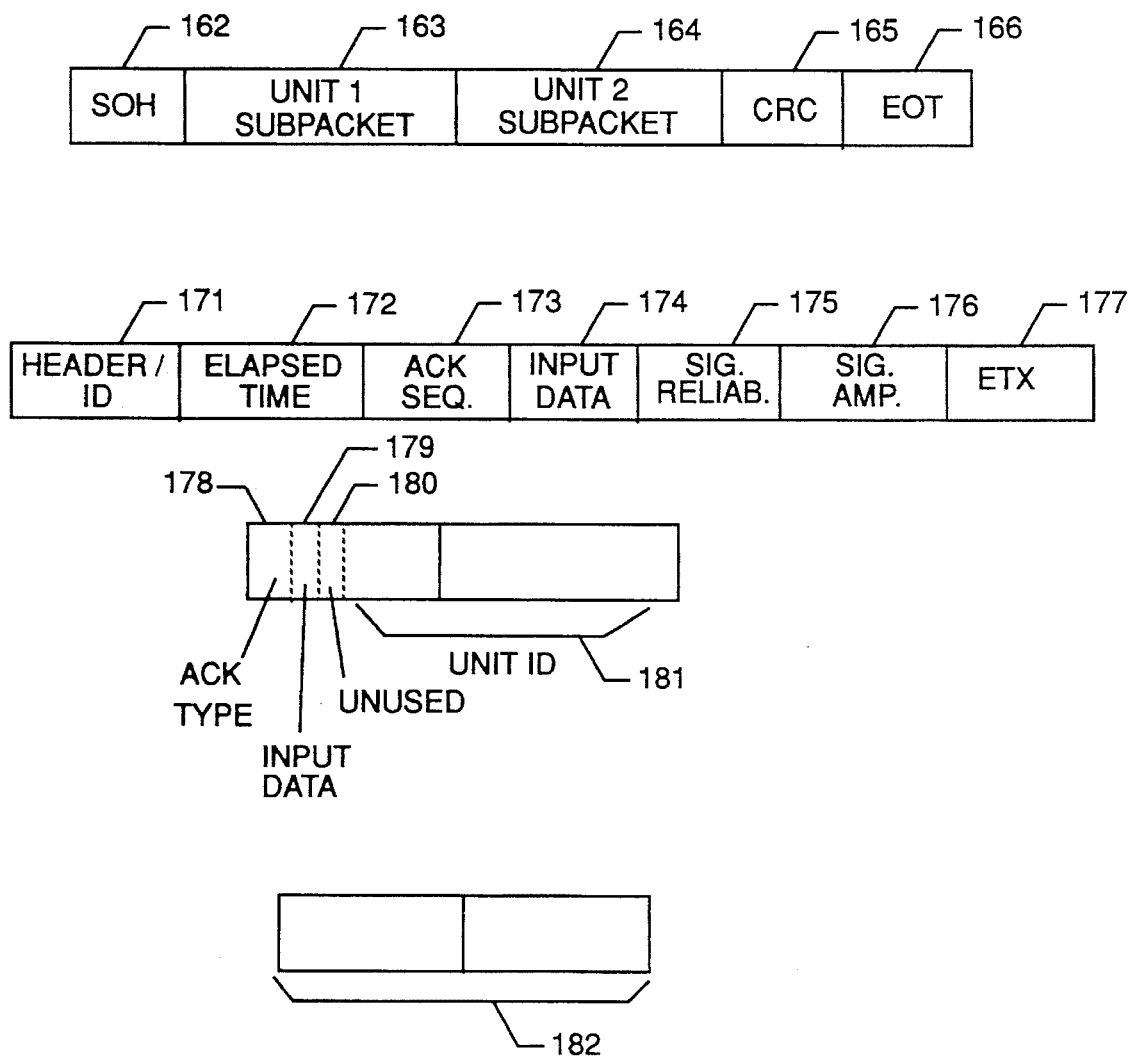
FIG. 14 shows the format of a packet sent from a remote station via radio.

FIG. 14 shows the format of a packet sent from a remote station to the central station via radio. The packet begins with an SOH character 162 and has a subpacket for each unit that it has received a signal for within the timeout period (two are shown in the figure, 163 and 164), a two-character (14-bit) CRC 165, and an EOT 166.

Each subpacket consists of the fields shown: A 2-character Header/ID sequence 171, a 2-character elapsed time sequence 172, an ACK sequence of 1 or 2 characters 173, Input Data of 3 to 22 characters 174, a Signal Reliability field 175 7 bits in length (from the same field in the Header ID sequence from the unit), a Signal Amplitude field 176 (indicating the amplitude of the infrared signal as received from the unit at the remote station), and an ETX character 177.

The Header/ID sequence consists of a 2-bit Ack Type field 178 (00 if no acknowledgement transmitted, 01 if a single packet is being acknowledged, 10 if a sequence of packets is being acknowledged), a 1-bit field indicating whether input data is being transmitted 179. 1 bit that is unused 180, and 3 bits of the 10-bit Unit ID code 181. The second character consists of a single 7-bit field with the remaining 7 bits of the ID code.

The Elapsed Time sequence 182 consists of 2 characters, with each character holding 7 bits of a 14-bit code representing the elapsed time in seconds (0–4095) since the remote station has received a packet from a given communications unit.

The ACK and Input Data sequences are formatted as shown in FIG. 13.

Figure 15:
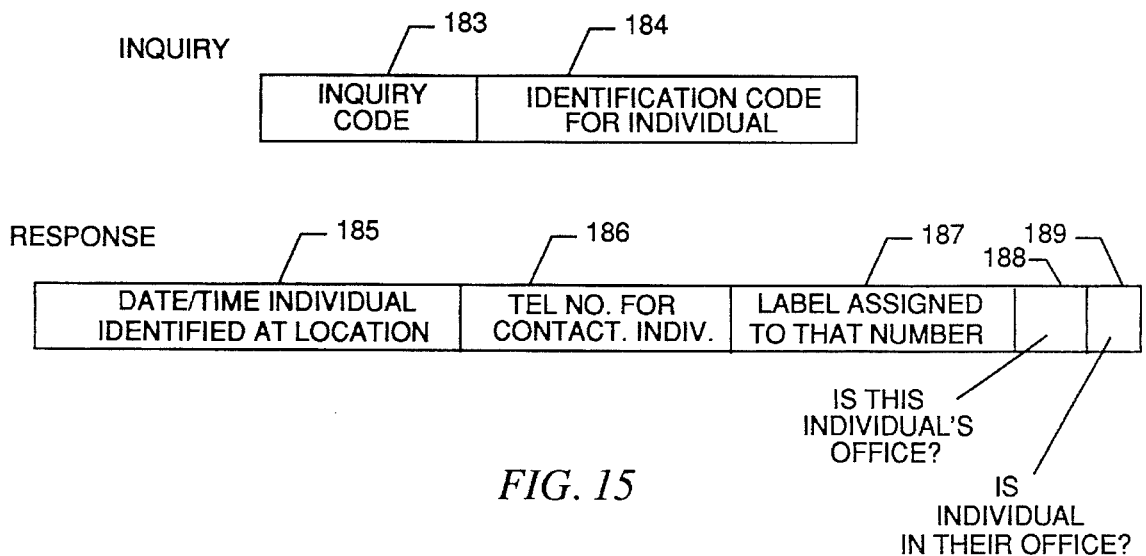
FIG. 15 shows the format of an inquiry from remote agent software and a corresponding response indicating the location and related information about an individual.

FIG. 15 shows the format of an inquiry from remote agent software concerning the location of an individual and a corresponding response containing relevant information. The inquiry message from the agent software contains an inquiry code 183, indicating that a location inquiry is being made, followed by an identification code 184 for an individual, which is either an email address or a telephone number. The response message consists of the date and time 185 the individual was identified at the general location the system is installed in, followed by a telephone number 186 that is the best number to use to contact the individual, the label 187 assigned to that number, a field 188 indicating whether or not that number is a private office for that individual, and another field 189 indicating whether the individual is presently in that office.

Figure 16A:
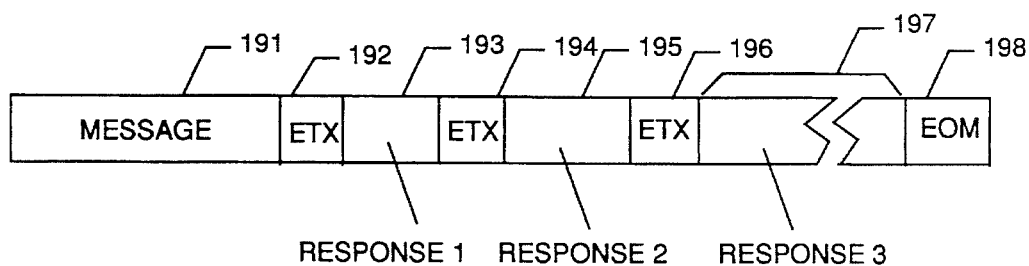
FIG. 16A shows the format of message text sent from the Central Station to a Communications Unit, including particularly the responses that can be selected to that message.

FIG. 16A shows the format of message text sent from the Central Station to a Communications Unit, including particularly the responses that can be selected to that message. The message text 191 is followed by an ETX character 192, then the first response 193, with successive responses 195 and 197 separated by ETX characters 194 and 196, and with the final response followed by an EOM character 198. Note that there is a maximum of 20 responses for any message. The message text and, particularly, responses are formatted with newline characters terminating each physical line, should the text or response exceed the capacity of a single line. An ETX character terminates a response or message text and also terminates the physical line. If there are no responses, the message is terminated by an EOM. (A newline character is an ASCII carriage return.)

Figure 16B:
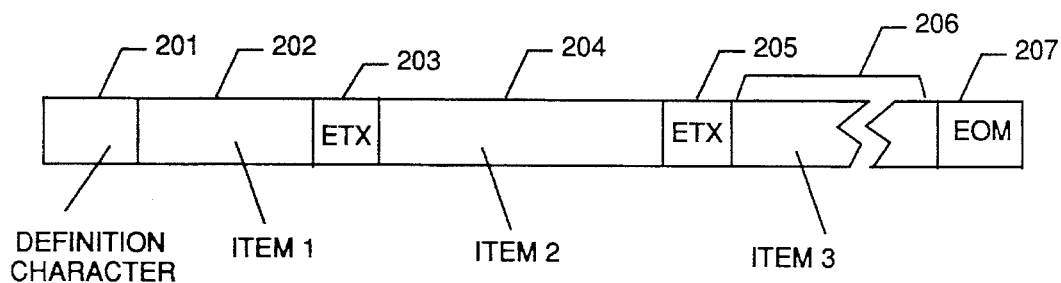
FIG. 16B shows the format of a message defining pre-programmed responses, messages, and email addresses.

FIG. 16B shows the format of a message defining preprogrammed responses, messages, and email adresses. This data is sent from the central station to the communications unit to define the preprogrammed responses, messages, and email addresses that can be selected by the user. The definition character 201 is an ASCII ENQ, BS, or VT, depending upon whether a set of responses, messages, or email addresses are being defined, respectively. Following that are the separate responses 202, 204, and 206, separated by an ETX character 203 and 205, and terminated by an EOM character 207. As above, responses are formatted with newline characters terminating each physical line, should the response or message exceed the capacity of a single line. An ETX or EOM character terminates a response or message and also terminates the physical line.

Figure 17:
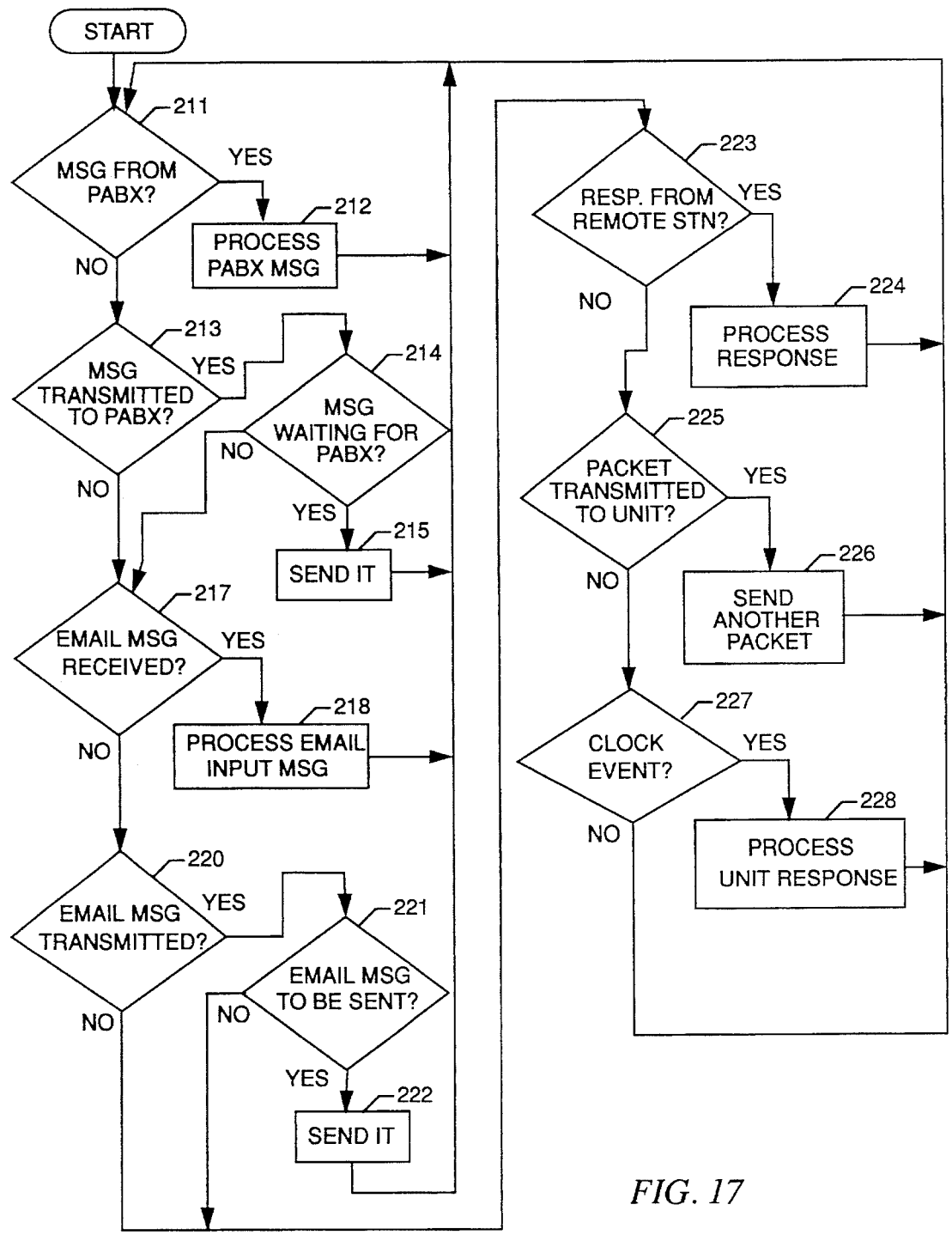
FIG. 17 shows a flowchart of the software architecture for the central communications station.

FIG. 17 shows a flowchart of the software architecture for the central communications station. Software is divided into a number of different modules, of four different types: (1) PABX modules for processing messages to and from the PABX related to telephone calls; (2) Email modules for processing messages received via the electronic mail system or sent through that system; (3) Communications modules for handling the transmission of data to the communication units via radio and for handling communication with remote stations, including the receipt of acknowledgements and input data and other necessary functions; and (4) A clock module that initiates certain events at appropriate times. In all cases a module is entered as the result of a particular test being passed; if the test is not passed control is passed to the next test. When a module has completed processing program control passes to the first test 211.

A test is first made 211 of whether an incoming message has been received from the PABX Control. An interrupt service routine receives characters that constitute messages from the PABX, which can be either a message reporting an incoming call or a message reporting that a particular extension has gone on-hook or off-hook. When the last such character in a message has been received a flag is set indicating to the main program that a message has ken received, and the PABX module is then called 212 to process it. An incoming call message will result in any additional caller ID information that may be available at the central station being added and result in the creation of a list of extensions that the user could transfer a call to. The message created for transmission to the unit is then placed in the Message to Unit Queue, and the first: packet of that message placed in one of the Packet to Unit Queues. An on-hook or off-hook message is not sent to the communications unit, but changes the Extension On-Hook List, which records the on/off-hook status of each extension, which is used in evaluating whether a given extension might be available for transferring a call.

A test is then made 213 of whether a message has completed transmission to the PABX. If so, a test is made 214 of whether another message is available to be sent to the PABX. If yes, that transmission is initiated 215.

A test is then made 217 to see if an electronic mail message has been received over the local area network connecting the central station with computer workstations. If so, a module is called to process 218 the received email message. An interrupt service routine receives each character from the network, with the end of a message resulting in a flag being set indicating that a message is available to the main program in a buffer memory. Electronic mail intended for a communications unit is sent to a pseudoaddress similar to the normal address of a user. For example, if a user's address is "peterson@cogdes.com", the user's communication unit address might be "peterson%pager@cogdes.com", with all such messages forwarded by the email system to the central station. If such a message has arrived, the central station looks up the address to see if it is a legitimate user; if not an error message is returned to the originator of the message. If the user exists, the entire message is placed in the Email Incoming Message Archive. The message is then processed to extract only the most significant information (stripping off most of the header data) and also to extract only the first pan of long messages. In addition, if the sender has indicated a set of responses for the communications unit user to choose from, these are extracted, formatted, and added to the message. The resulting message, together with the unit ID, is placed in the Message to Unit Queue and the first packet of the message extracted and placed in the appropriate Packet to Unit Queue depending upon its priority. Details of this can be found in FIG. 18 and the associated text.

A test is then made 220 to see if an outgoing electronic mail message has completed transmission (and another can be sent). If yes, a test is made 221 to see if another message is available (in the Email Outgoing Message Queue) to be sent. If yes, the message is initiated 222. An electronic mail message transmission is initiated by the central station in the following way: The message is placed in a buffer memory and the first character in the message transmitted to the electronic mail interface hardware. The completion of transmission of each character causes an interrupt handler to obtain the next character and transmit it, with the handler setting a flag when the message has been completely sent. When a new message is to be sent, the message that has been in the queue the longest is selected.

A test is then made 223 of whether a response has been received from a remote station. If so, a module is called 224 to process the response. If the response is a successfully error checked packet, a subpacket for each communications unit that sent a response is extracted. For each acknowledgement included in the subpacket, the original packet is deleted from the appropriate Packet to Unit Queue, an AckAck (acknowledgement of an acknowledgement) packet is placed in the appropriate Packet to Unit Queue, and, if there is another packet in the original message, that packet is also placed in a Packet to Unit Queue. If input data is included in the subpacket, that data is routed to the appropriate destination (email server, PABX, or other communications unit), and an Input Acknowledge packet placed in the appropriate Packet Unlit Queue. If a message has been deleted from the unit memory, that message is also deleted from the Email Incoming Message Archive, and the channel is deassigned. (The information is saved in a temporary store in case the user performs an Undelete operation). If a unit was previously not receiving or responding (i.e., likely out of the building), Data packets that were on hold because of this are tagged to be selected and sent. Details can be found in FIGS. 19 and 20.

A test is then made 225 of whether a packet has completed transmission to the unit via radio. A packet to be sent is then selected from those in the Packet to Unit Queues, or, if the queues are all empty, a short dummy packet is sent to a dummy unit address. The packet selected depends on a calculation of the relevant urgency of transmitting different packages in queues with different priorities (which are related to the priority of the packet, Ring, Urgent, High, or Normal). The status of the communications unit— whether it is receiving data and responding, whether it is not responding and not likely to be receiving (because of being out of the building)—is also a factor, as is the priority of the packet, with Ring packets, for example, not transmitted if the unit is out of the building. A selected packet is then formatted and sent 226. For more details, see FIG. 21.

Finally, a test is made 227 of whether a clock event has occurred. The Time Event Flag is first tested to see if another second has elapsed. If so, that flag is cleared and the Clock Event Queue is tested to see if one or more events are to be executed at the current time.

The event is a Unit ID Response Timeout, and the Unit Status field in the Unit Status List is updated (to indicate that the unit is not responding), and Packet to Unit Queues are checked for packets addressed to that unit that have the Waiting for Ack bit set. For each such packet, the Waiting for Ack bit is set to 0. If the status of the unit is Not Receiving or Not Responding, the Hold bit is set to 1. If there are one or more Data packets with Hold bits set, a Confirm Data packet is moved from Packet to Unit Queue G to Packet to Unit Queue F, if it is not already in Queue F.

After processing the clock event 228, program control returns to the start of the program.

Figure 18:
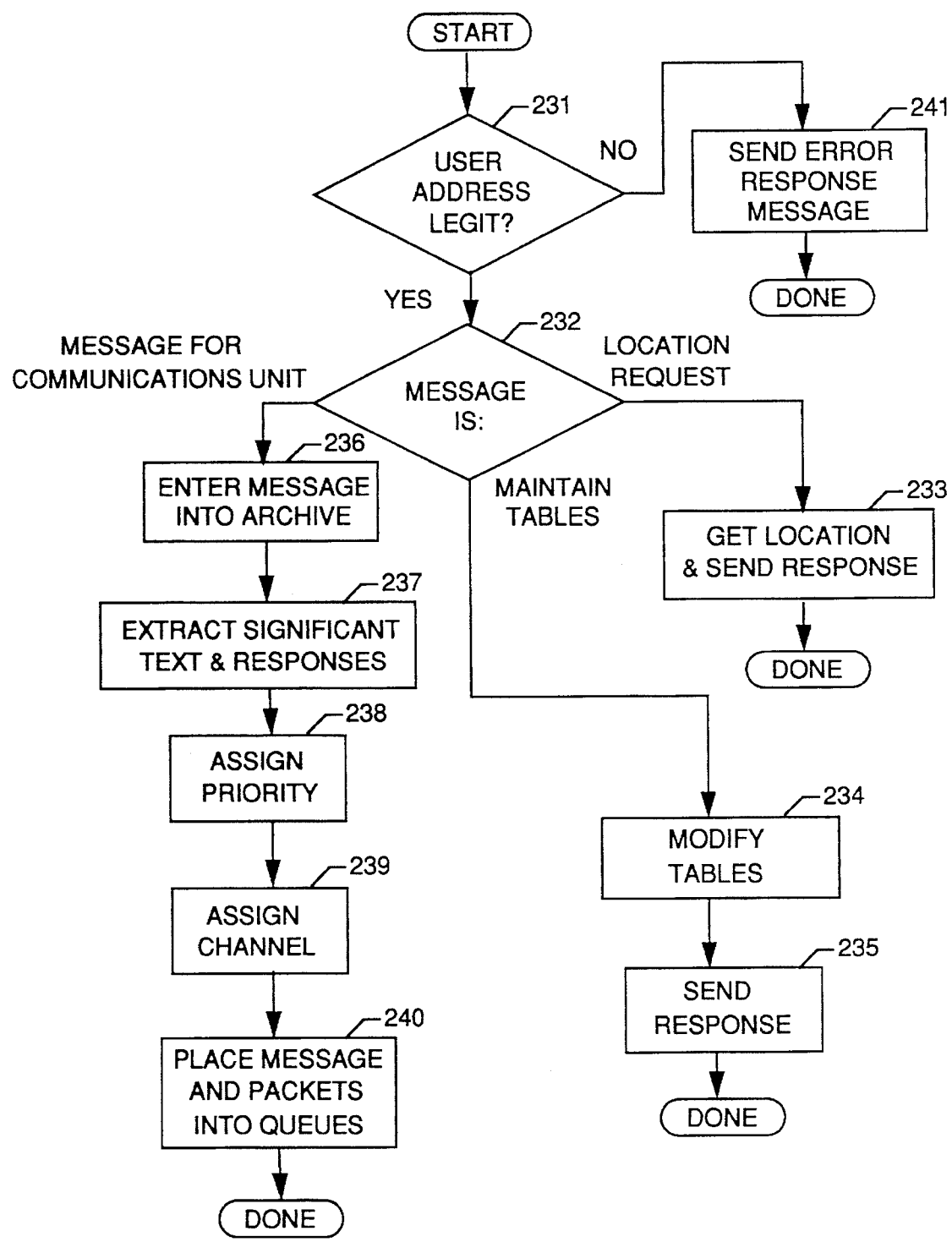
FIG. 18 shows a flowchart of the software module in the central communications station that processes incoming electronic mail messages.

FIG. 18 shows a flowchart of the software module in the central communications station that processes incoming electronic mail messages. Incoming email arrives through the Email Server as a result of it being addressed to a pseudoaddress (e.g., "peterson%pager") associated with the user's normal email address (e.g., "peterson"). This may be a result of the originator of the message sending the message specifically to the communications unit (using the pseudoaddress) or the originator sending a message to the normal message address with a copy to the communications unit. It may also result from the user's workstation having email software set up to forward certain messages automatically. This may be all messages from a certain sender, all with certain keywords in the subject line and/or text, messages with a certain (e.g., urgent) priority, or a combination of the above.

A test is first made 231 of whether the email address is legitimate by looking it up in the Email Address to Unit ID Map. If the address is not found, a response message is generated 241 to the sender indicating that a communications unit is not active for that address, the response message placed in the Email Outgoing Message Queue, and the module is done.

If the email address is legitimate, a test is made 232 of whether the message is a request for the user's present location, a maintenance message froth the user or system administrator, or a message intended for a user. (A location request message has "%!" as the first 2 characters in the message text, and no other characters, while a maintenance message has "%$" as the first 2 characters in the message text, and no other characters on that line.)

If the message is a location request, the present location of the communications unit and the time the unit last responded is looked up in the Unit Status List 233, a response email message containing this information is sent to the originator, and the module is done. (If the user has set privacy mode, the response says only "Privacy Mode Set").

If the message is a maintenance message, the user's or system administrator's password (contained in encrypted form in the message) is checked and, if the originator has the appropriate privileges, the appropriate changes are made 234, a response message sent 235 verifying the changes, and the module is done. Changes to and queries of tables that define users, user IDs, telephone extensions, and locations and telephone extensions near remote stations are made using a simple set of commands contained in email messages that can be originated at any workstation connected via the email server to the system. Users can also define preprogrammed responses, messages, and email addresses, and set parameters, in this way.

If the message is intended for a user's communications unit, the first 2048 byes of the message are entered 236 into the Email Incoming Message Archive, which allows users access to substantial parts of most messages. While most traffic is likely to involve very short messages, there are situations (such as a user stuck in a meeting) where a user may want to read a longer message via the communications unit.

The most significant information in the incoming message is then extracted 237 and packed into the first message to the unit (up to 128 bytes if it is the first part of an incoming message; up to 336 bytes if a user has requested more data from a message stored in the Email Incoming Message Archive). This is done by identifying separate lines in the header message and taking only the text in the subject line, the email address of the sender, message text, and the signature at the end of the message. In addition, canned responses that have been added to the message by the sender (either by the person originating the message or by a software message-sending tool that automatically appends appropriate responses) are extracted, tagged appropriately, and added to the end of the extracted text. The first such response is identified by a "!" character in the first column of the line. When this character is found, the remaining characters on the same line are considered the first response, and each following line (with a newline character, defined as an ASCII carriage return, indicating a new line) containing an additional response. A priority is then assigned 238 to the message, either Urgent, High, or Normal. An Urgent priority is given when it is specified by the originator of the message (with %Urgent as the first text of the message indicating this). The user can also cause messages from certain email addresses to be sent as Urgent. Messages sent to the communications unit directly are given a High priority, while messages forwarded from the user's workstation are given a Normal priority. Other criteria for assigning priority levels are also possible, and such criteria could be modified by the user. Examples include the length of the message, priority codes that are part of the email header, specific words indicating topics of particular interest, etc.

A channel number is then assigned 239 for this particular message. This is done by scanning the Channel to Email Address Map until an unassigned channel is found, and assigning that channel to the incoming message. The Assigned Bit is set to indicate that the channel is being assigned, the email address of the message originator is entered, and a pointer to the Incoming Email Message Archive that designates the beginning of the message is entered, all in the Channel to Email Address Map.

The compressed form of the message (with the channel number the first byte after the STX) is then placed 240 in the Message to Unit Queue, and the first part of the message (up to 42 characters) defined as the first packet and placed in the appropriate Packet to Unit Queue, depending upon the priority of the message.

Figure 19:
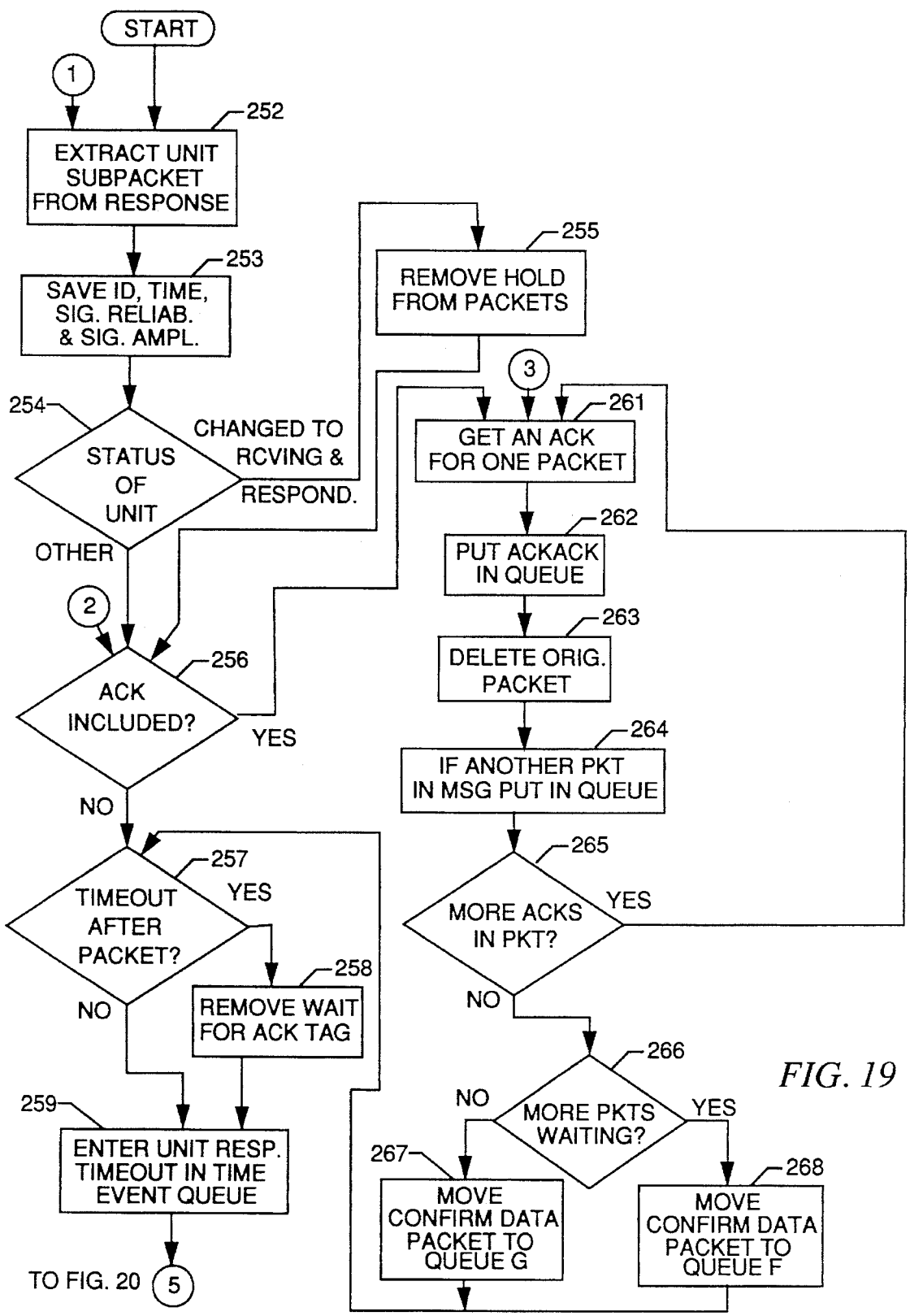
FIG. 19 shows a flowchart of the first part of the communications software for the central station that processes packets received from the remote station.

FIG. 19 shows a flowchart of the first part of the communications software for the central station that processes packets received from the remote station.

The response is assumed to be a packet with a correct error check, and the module begins at point 1.

At point 1, the next unit subpacket is extracted 152 from the packet, and the unit ID for that subpacket is also extracted.

The station ID, current time, signal reliability, and signal amplitude is then saved 253 in the Unit Status List for the unit involved and the station the response was received from.

A test is then made 254 of the Unit Status, obtained from the Unit Status List. If the status has changed from that stored, and the new status is Receiving and Responding, the Packet to Unit Queues are scanned for packets for the unit that are on hold, the Hold tag is removed 255 from any such packets, and control passes to point 2. Otherwise, control passes immediately to point 2.

At point 2, a test is made 256 of whether an acknowledgement sequence is included in the unit subpacket. If yes, control passes to point 3. If an acknowledgement sequence is not included, a test is made 257 of whether sufficient time has elapsed (i.e., a timeout) since the transmission of the packet for an acknowledgement to be expected. If yes, the "Wait for Ack" tag bit is removed 258 from any such packets (to allow them to be retransmitted if the Hold bit is not on). If the new unit status is Not Receiving but Responding, the Hold bit is also set for those packets with High or Normal (but not Urgent) priority, so that an attempt to transmit will not be made until the unit status has changed. Control then passes to step 259.

If a unit response timeout is not presently in the Time Event Queue, a unit response timeout request is then entered 259 in the Time Event Queue, with the time set to the current time plus 90 seconds. If a request is already in the queue, its time is reset to the current time plus 90 seconds. Program control then passes to point 5 in FIG. 20.

At point 3, the packet number of a packet needing acknowledgement is extracted 261 from the subpacket (including intervening packet numbers if a sequence of numbers is specified). An AckAck packet for each acknowledgement data packet is then placed 262 in Packet to Unit Queue C. In addition, each original packet is deleted 263 from its original Packet to Unit Queue. If another packet is contained in the message, that packet is extracted and entered 264 in the appropriate Packet to Unit Queue.

A test is then made 265 of whether there are more acknowledgements in the subpacket. If yes, control passes to point 3. If there are no more acknowledgements in the subpacket, a test is made 266 of whether there are other packets still waiting (in Hold mode) that have not been acknowledged. If yes, the Data Confirm packet for the unit is moved 268 to Packet to Unit Queue F if it is not in that queue already. Control then passes to step 257. If no, the Data Confirm packet is moved 267 to Packet to Unit Queue G if it is not in that queue already. Control then passes to step 257.

Figure 20:
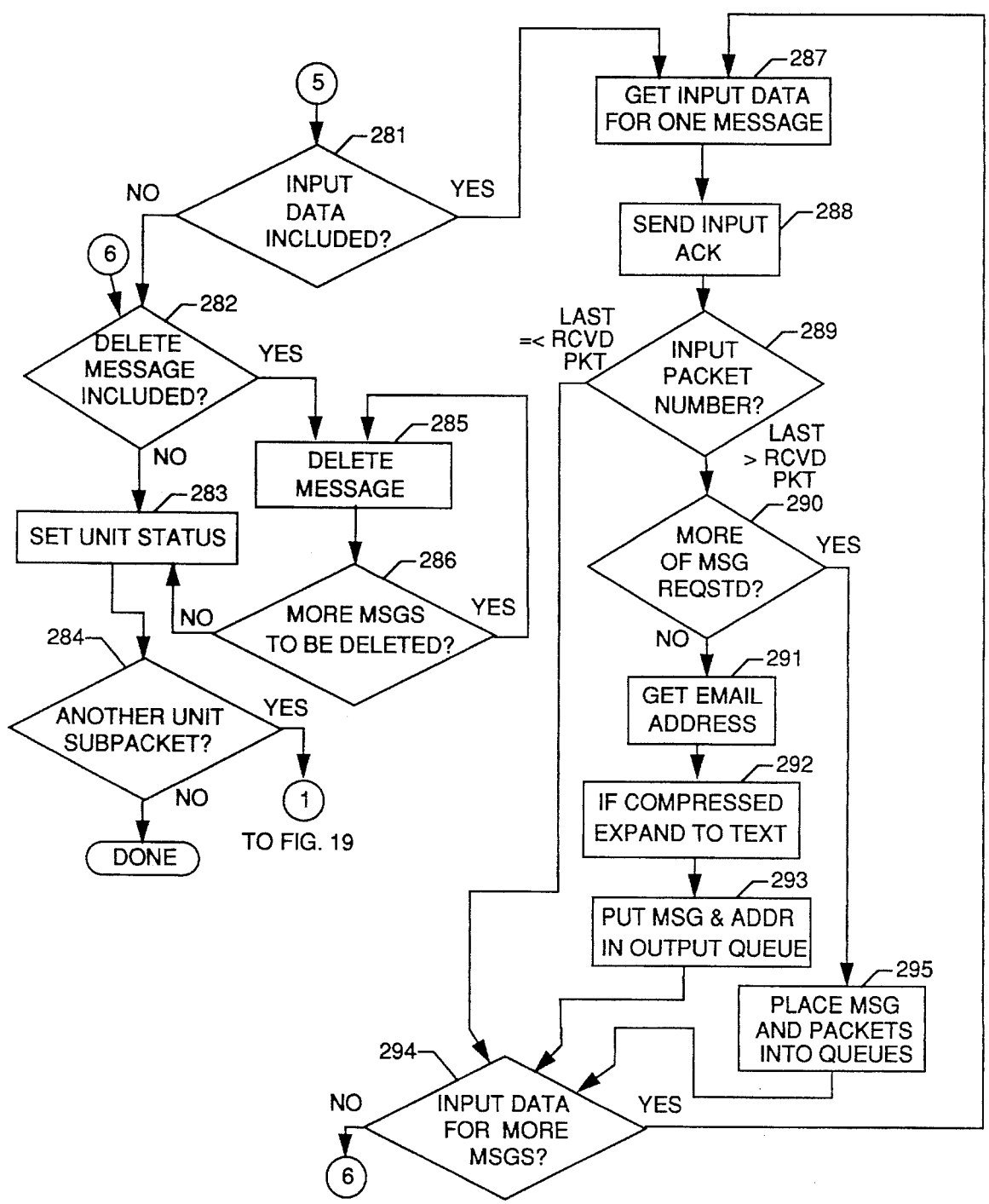
FIG. 20 shows a flowchart of part of the communications software for the central station that processes the part of packets from the remote station that contain input data.

FIG. 20 shows a flowchart of part of the communications software for the central station that processes the part of packets from the remote station that contain input data.

At point 5, a test is made 281 of whether input data is included in the unit subpacket. If not, control passes to point 6. If input data is included in the unit subpacket, control passes to step 287.

At point 6, a test is made 282 of whether a delete message sequence is included in the unit subpacket. If not, control passes directly to step 283. If yes, control passes to step 285.

At step 283, the status of the unit is set 283 to Receiving and Responding or Not Receiving but Responding, as appropriate.

A test is then made 284 of whether another unit subpacket is in the response. If yes, control passes to point 1 in FIG. 19. If not, the module is done and control passes to the start of FIG. 17.

At step 285, a channel number is extracted from the unit subpacket, and that channel number used to delete the corresponding original message from the Message to Unit Queue and the Email Incoming Message Archive. The channel number is then deassigned from use by clearing the Assigned Bit in the Channel to Email Address Map for the corresponding channel.

A test is then made 286 of whether more messages should be deleted. If yes, control passes to step 285. If not, control passes to step 283.

At step 287, input data is extracted for one message. The message channel number indicates the message involved.

An Input Acknowledge packet containing the Input Packet Number is then sent 288 by placing it in Packet to Unit Queue C.

A test is then made 289 of the Input Packet Number by comparing it with the Last Packet Received number (which, unlike the case of the packet numbers used for output data, is the same for all priorities). The comparison is made modulo 128, with a received number considered greater than a last packet received number if it is between 1 and 63 above, modulo 128, the last packet received. (Thus, if the last packet received was 125, and the new packet just received had a number of 3, the new packet would be considered greater than the last packet received and thus not a duplicate). If the number of the packet just received is less than or equal to that of the last packet received, it is considered a duplicate and is ignored, with control passing to step 294. A received packet number is considered less than a last packet received number if it is between 1 and 63 below modulo 128, the last packet received. If the number of the packet just received is greater than that of the last packet received, the input packet is processed.

A test is then made 290 of whether the input data is a request for more data from an email message only part of which was sent to the communications unit. If yes, another message and packet is formatted and placed 295 in the Message to Unit Queue and the appropriate Packet to Unit Queue. Control then passes to step 294. If the input data is not a request for more data, the email address for the input data is then determined 291. If the input data is a response (either a response selected from those provided with the message, a preprogrammed response, or an original message sent as a response), the channel number is used to look up the corresponding email address of the sender of the message in the Channel to Email Address Map. If the input data is an original message, it either contains a 7-bit code that is converted to an email address by looking it up in the Proprogrammed Email Address List, or it contains the actual email address.

If the message or response is in compressed form, it is expanded 292. FIG. 13 describes the format of different forms of compressed and uncompressed messages and responses. In the case of compressed responses the text is obtained by using a code to look up the expanded form of the response in an appropriate table, which replaces the codes before transmission of the message or response to its destination.

The resulting text after expansion and the addition of the electronic mail address of both the destination and originator is placed 293 in the Email Outgoing Message Queue. However, if the email address is another communications unit, the message is not placed in the Email Outgoing Message Queue but, instead, placed in the Email Incoming Message Archive and Email Incoming Message Queue.

A test is then made 294 of whether there is input data for more messages in the unit subpacket. If yes, control passes to point test 287. If no, control passes to point 6.

Figure 21:
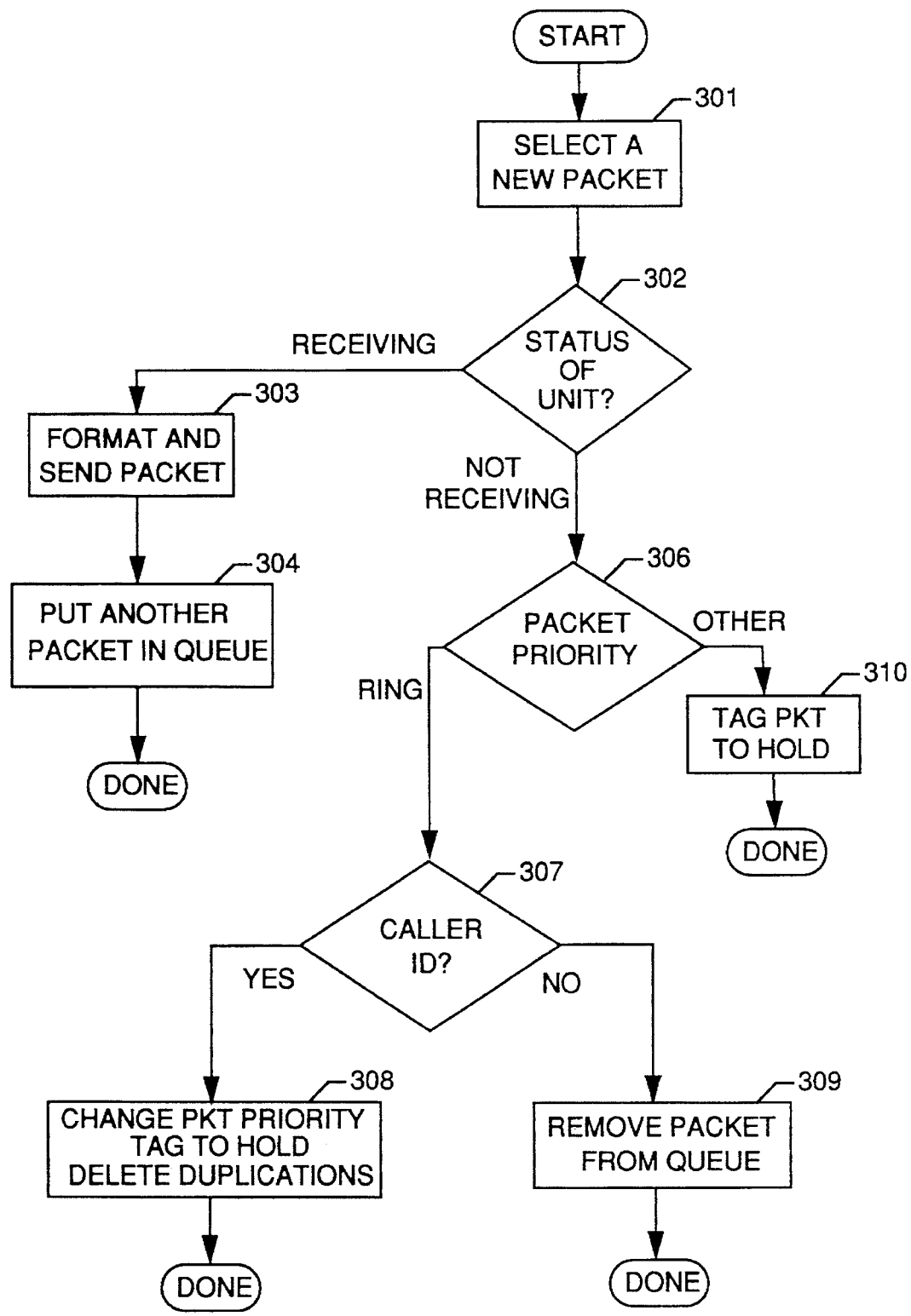
FIG. 21 shows a flowchart of the part of the communications software for the central station that selects and sends Data and other packets to communications units via radio.

FIG. 21 shows a flowchart of the part of the communications software for the central station that selects and sends Data and other packets to communications units via radio.

When stated, the module first selects 301 the next packet to be sent. This is done as follows: There are seven queues: (Packet to Unit Queues A, B, C, D, E, F, and G) that hold packets, with an incoming message, such as that from a workstation via electronic mail, an incoming telephone call from a PABX system, or a message indicating that a FAX has come in, broken down into packets, with each packet placed in one of the Packet to Unit Queues depending upon the priority of the message. Packets that acknowledge input data from communication units (Input Acknowledge packets), or that acknowledge acknowledgements of Data packets (AckAck packets) are also placed in one of the queues (Queue C). A Data Confirm packet for each communications unit is entered in either Packet to Unit Queue F or G, depending upon the circumstances. At any given time, a Data Confirm packet for each unit is contained in either Queue F or Queue G.

To select the next packet to be sent, the oldest packet in each queue is retrieved (but ignoring packets marked as "Hold" or "Wait for Ack") and a calculation is made of the "urgency" of sending that packet, with urgency a measure of the extent to which not sending the data packet would result in allowing performance to lag behind what is expected for a particular queue.

The urgency calculation is made as follows: urgency= $t_{actual}/t_{expected}$, where $t_{actual}$ is the actual time elapsed since the packet was entered into the queue, and $t_{expected}$ is a parameter selected for each queue so as to allocate priority between the queues and that generally reflects the amount of time a packet is normally expected to be in each queue. Typical values are 50 mS for Queue A (Ring), 500 mS for Queue B (Urgent), 1 second for Queue C (Input Ack, and AckAck) 5 seconds for Queue D (High), 10 seconds for Queue E (Normal), 60 seconds for Queue F (Data Confirm, expected acknowledgement), and 600 seconds for Queue G (Data Confirm, no expected acknowledgement). These values can vary depending upon the dam rate of the radio circuit chosen, the number of units in the system, and the average level of traffic per unit. In making the calculation, only Data packets that have the "Hold" and "Wait for Ack" bits set to 0 are considered. The packet to be sent is that packet from the queue that has the highest urgency measure, except that in making this decision, urgency values for packets in Queues F and G are set to a maximum value if they exceed that value (to avoid these latter queues from taking too much capacity in peak load periods).

After a packet has been selected, a test is made 302 of the status of the unit that the packet is to be sent to. There are live possible status states: Receiving and Responding, Not Receiving but Responding, Not Receiving or Responding (i.e., out of building), Receiving but not Responding (i.e., in a room with no infrared sensor) and Not Responding (not responding and unclear why). For purposes of this module, these are collapsed into two states, depending upon whether the unit is Receiving (Receiving and Responding, Receiving but Not Responding, or Not Responding) or Not Receiving (either Not Receiving but Responding or Not Receiving or Responding).

If the unit is Receiving, the packet is formatted and the first character is transmitted 303 to initiate the interrupt handler. If the packet is a Data packet, the Wait for Ack bit is set and the packet remains in the queue. Data Confirm packets also remain in the queue. If the packet is an Input Acknowledge or AckAck packet, the packet is removed immediately from the queue. If the packet just initiated is a Data packet and the next packet from the same message is available, it is placed 304 into the appropriate Packet to Unit Queue. The module is then done and control passes to test 211 in FIG. 17.

If the status of the unit is Not Receiving, a further test is made 306 of the priority of the packet. If it is Ring, a further test is made 307 of whether Caller ID information is included in the packet. If yes, Packet to Unit Queue D is searched 308 to see if there are any other packets that are exactly the same (i.e., with the same Caller ID information) as the selected packet, and in which the timing indicates they are simply additional rings of the same call. If so, the selected packet is removed from the queue. If there are no such duplicate packets, the packet priority is changed to High and the packet removed from packet to Unit Queue A and placed in Packet to Unit Queue D, and the Hold bit set so it will not be transmitted until a response is received from the unit (this provides a message to the user that a call was received, but not in real time). The module is then done.

If there is no Caller ID information, the Ring packet is removed 309 from the queue (resulting in the Ring being ignored) and the module is done.

If the packet priority resulting from test 306 is Other (Urgent, High or Normal), the packet is tagged 310 as Hold, and the module is done.

Figure 22:
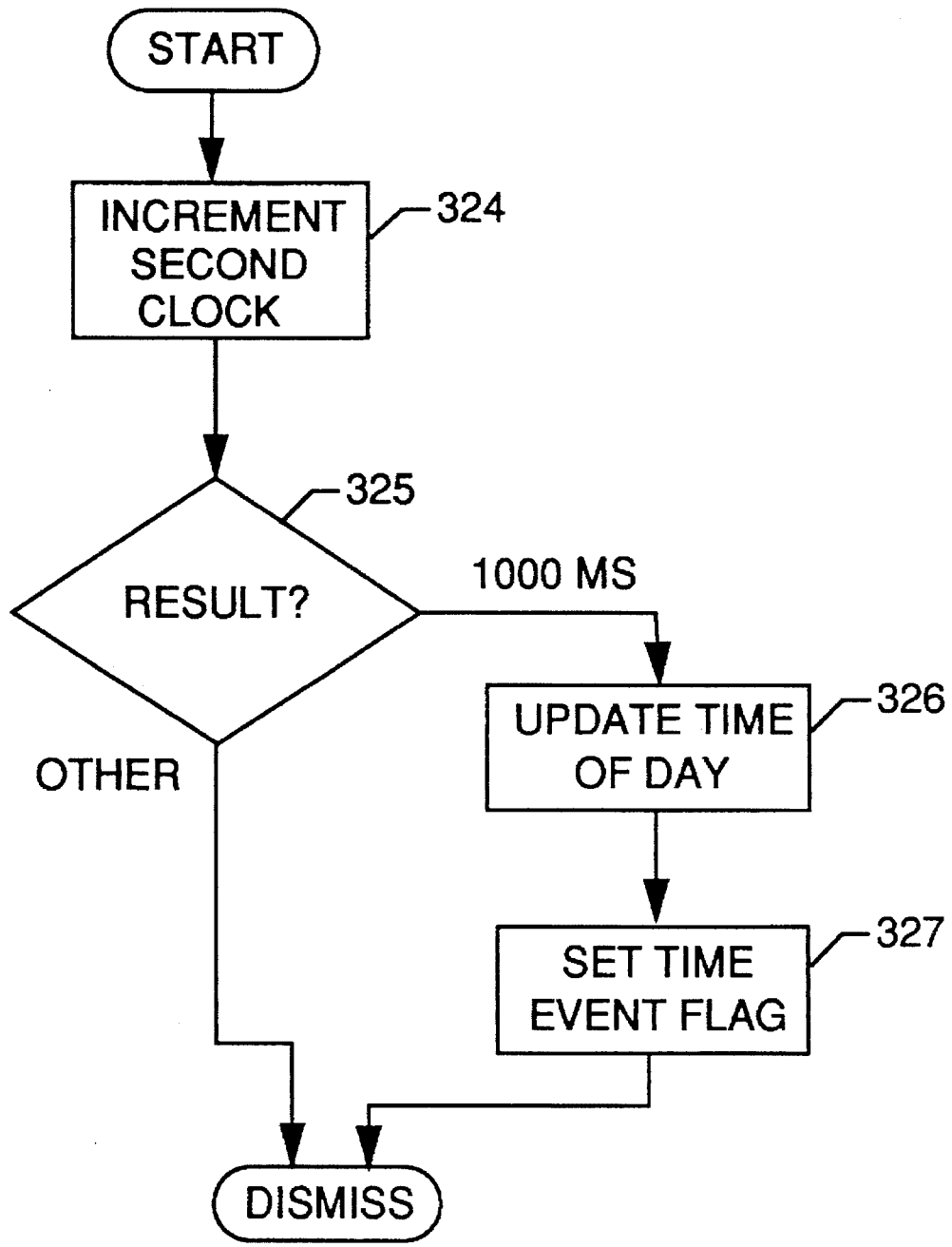
FIG. 22 shows a flowchart of the real-time clock interrupt module.

FIG. 22 shows a flowchart of the real-time clock interrupt module. The clock causes an interrupt every 1 mS, resulting in execution of the interrupt module. The Second clock, a memory location which provides a clock with one-second resolution, is first incremented 324. The result is then tested 325. If the result is 1000 mS, the Time of Day clock, a memory location which represents the absolute time and which has a resolution of 1 second, is then incremented 326, and the Time Event Flag is set 327, so that the main program will check the Time Event Queue. The Second clock is then cleared. The interrupt routine then dismisses.

FIGS. 23–31 show the data structures of the lists and queues used in the software for the microprocessor in the central communications station.

FIG. 23 shows the format of the Unit Status List. This list, for each unit, holds the unit ID code 330 (10 bits), the Unit Status 331 (3 bits), the last Packet Sequence Number (14 bits) for output data packets of 4 different priorities 332, 333, 334, and 335, the last Input Packet Number (7 bits) for input data packets 336, and information from up to 10 stations (with three shown, 337, 338, and 339) that have reported a response from the unit.

The Unit Status field 331 has five possible states: Receiving and Responding, Not Receiving but Responding. Receiving but Not Responding, Not Receiving or Responding, and Not Responding. Receiving and Responding means that the last response received from the unit reported a radio received signal reliability above a threshold value, and that the response was received within a timeout period (e.g., 120 seconds). Not Receiving but Responding means that the last response received from the unit reported a radio received signal reliability below the threshold value, and that the response was received within a timeout period. Not Receiving or Responding means that a response has not been received within the timeout period and that the last response was near an exit to the building (and the unit is presumed out of the building). Receiving but Not Responding means that a response has not been received within the timeout period and that the last response was near an area with no infrared sensors. Not Responding means that a response has not been received within the timeout period but there is no evidence the unit is in an unsensed area or out of the building.

The data structure for each station associated with a unit consists of the station ID 340, the time of last contact with that station 341 (14 bits), the reliability of the radio signal received by the unit 342 (7 bits), and the amplitude of the infrared signal from the unit received by that station 343 (7 bits).

The stations are ordered such that the most recent contact with the station is listed first, the next most recent contact second. etc. However, only time differences greater than a threshold tithe are considered in performing this ordering: stations reporting time differences less than this are considered to have received the signal at the same time. This threshold takes into account the maximum time between successive repetitions of a signal from a unit. In addition, for those stations receiving the last signal at the same time, according to this rule, the stations are listed in order of strength of the received signal from the unit, with the strongest signal listed first. etc. A single station is only listed once, with the most recent contract (or strongest, if there is no time difference according to the above rule) listed.

FIG. 24 shows the Message to Unit Queue, which holds messages to be sent to units. For each message in the queue the data structure consists of the unit ID 351 and the text 352 of the message (with the first character in the message an STX and the second character the channel number assigned to the message). Each message in this queue is eventually broken down into packets and copied to one of the Data Packet Queues.

FIG. 25 shows the data structure of the Packet to Unit Queues, including Queues A, B, C, D, E, F, and G. These queues hold Data. Input Acknowledge, AckAck, and Confirm Data packets that are waiting to be transmitted to a unit. Each queue hits the same structure (not all fields are necessarily used), which consists of a Unit ID code 361 (10 bits), a Hold bit 362, a Wait for Ack bit 363, a count of the number of transmissions attempted 364, a pointer to text 365 (to the Message to Unit Queue), and the Packet Sequence Number 366 (14 bits) entered when the packet is sent, and used to process the Acknowledgement when it is received.

The Hold bit is normally 0 but is set to 1 when the packet is to be held until a response has been received from the unit. The Wait for Ack bit is normally 0 but is set to 1 when the packet has been transmitted and the central station is waiting for it to be acknowledged.

Queue A is liar Ring Data packets, Queue B for Urgent Data packets, Queue C for Input Acknowledge and AckAck packets, Queue D for High priority Data packets. Queue E for Normal priority Data packets, Queue F for Confirm Data packets for which data has been sent and an acknowledgement not received after an expected time, and Queue G for Confirm Data packets for which all acknowledgements have been received.

Figure 26A:
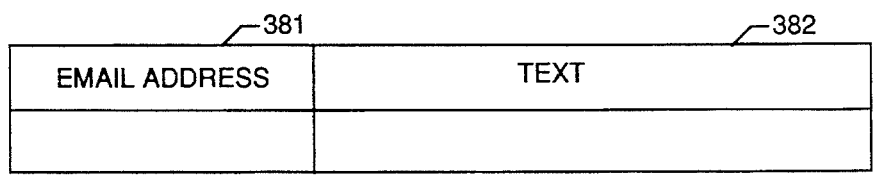
FIGS. 26A and 26B show the data structures for the Email Incoming Message Queue and the Email Incoming Message Archive.

FIG. 26A shows the data structure for the Email Incoming Message Queue. The Email Incoming Message Queue contains electronic mail messages received through the Email Server that are waiting to be processed. Each item in the queue includes an email address 381 and message text 382.

Figure 26B:
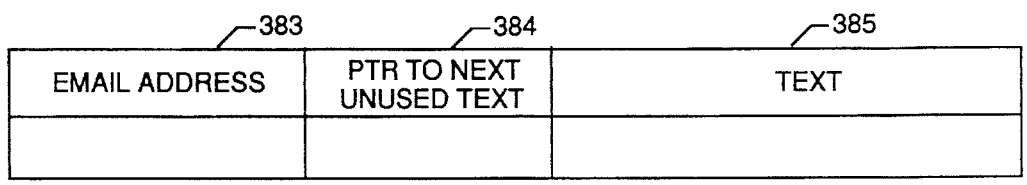

FIG. 26B shows the data structure for the Email Incoming Message Archive. The Email Incoming Message Archive contains the complete message and holds it until the user deletes it at the communications unit. Each item in the message includes an email address 383, a pointer 384 to the next text byte that has not yet been copied to the Message to Unit Queue, and message text 385.

Figure 27:
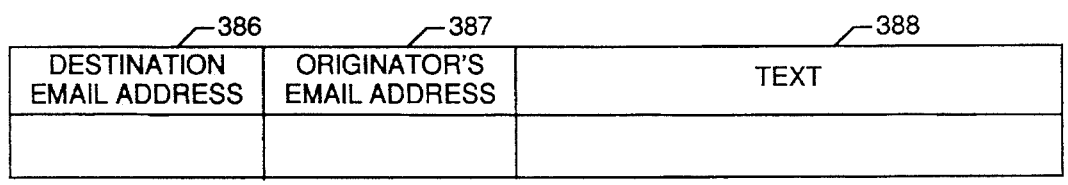
FIG. 27 shows the data structure for the Email Outgoing Message Queue.

FIG. 27 shows the data structures for the Email Outgoing Message Queue. The Email Outgoing Message Queue contains responses and messages waiting to be sent via the Email server to an email destination. Each item in the queue includes the destination email address 386, the originator's email address 387, and the text of the message 388.

FIG. 28 shows the data structures for the maps between email addresses and unit IDs and channels. The Email Address to Unit ID Map allows conversion of an Email Address 401 to the corresponding unit ID 402, while the Unit ID to Email Address Map allows conversion of the Unit ID 403 to the corresponding Email Address 404. The Channel to Email Address Map allows a channel number 405 sent by the communications unit to be translated to an email address 407 for a response to be sent, without the communications unit using an actual email address. An additional Assigned Bit field 406 indicates whether a particular channel is assigned or not, and another field 408 contains a pointer to the Email Incoming Message Archive, indicating the message involved. Note that channels 0 and 1 are not assigned in tiffs way, being permanently reserved for original message transmissions (0) or communication with the PABX (1). The channel number is also included in a Delete message sent by the unit when the user has deleted a message, causing the message in the Email Incoming Message Archive to be deleted and the channel deassigned. Space is also provided to hold all information from a Delete operation in case the user reverses it with an Undelete.

FIG. 29 shows the data structure for the Input Data from Unit Queue, which holds packets received from a communications unit. This structure consists of the 10-bit ID of the unit the packet is from 409, the 7-bit channel number 410, the 7-bit Input Packet Number 411, and the input text 412.

FIG. 30 shows the data structures that hold the proprogrammed responses, messages, and email addresses. These include the Preprogrammed Response List (consisting, for each entry, of a 7-bit code 421 and the text for the response 422), the Proprogrammed Message List (consisting, for each entry, of a 7-bit code 423 and the text of the message 424), the Preprogrammed Email Address List (consisting, for each entry, of a 7-bit code 425 and an email address 426).

FIG. 31 shows the data structures for the Time Event Queue. This includes, for each entry, the absolute time of the future event 427. The type of event 428 (1 for Unit Response Timeout), the Queue involved 429 (a particular Packet to Unit Queue), and an ID field 430 containing either the Unit ID or station ID, as appropriate.

Figure 32:
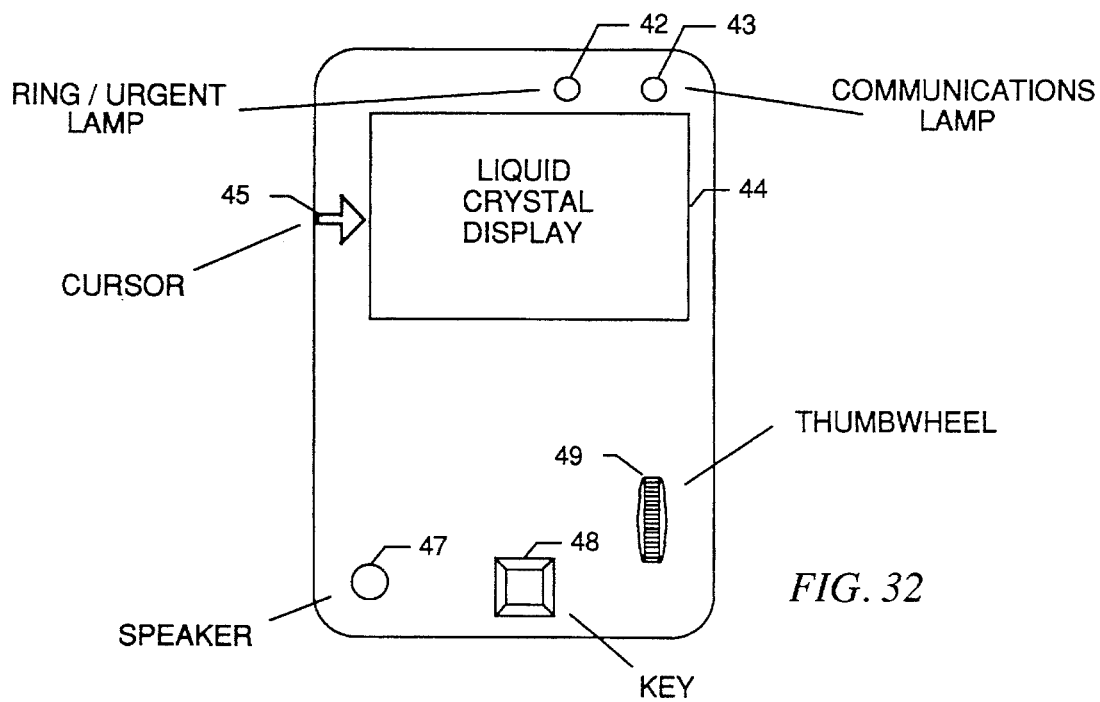
FIG. 32 shows the layout of the lamps, display and cursor, key, and thumbwheel on the front side of the remote unit.

FIG. 32 shows the layout of the lamps, display and cursor, key, and thumbwheel on the front side of the remote unit.

The Ring/Urgent lamp 42 begins flashing at a rate of two flashes per second when a Ring packet is received, but then turns off after 4 flashes. The lamp also begins flashing at a rate of one flash every two seconds when an Urgent message is received, with the lamp turning to solid after 20 seconds. If selected by the user, indicators will also be presented auditorily by means of the speaker 47. The Communications lamp 43 indicates the status of the communications circuits. If the lamp is turned on for any significant period of time, it indicates trouble. If a user has sent input data (i.e., responded to a message) but has not received an acknowledgement of it, the lamp turns solidly on. In addition, if Data (other than Ring) packets are found to be missing and the unit has not responded recently, the lamp will also be turned solidly on. In contrast, a momentary flicker of the lamp indicates that the circuit is working, with a single short flicker (150 mS) indicating a successful transmission of input data from the unit.

The action resulting from the key 48 depends on the location of the cursor 45 (represented as an arrow) relative to the text being displayed by the LCD 44. If the cursor is pointing to received message text, that message is deleted. (If the user deletes a message in error, selecting the "Undelete" command afterward will restore the message). If the cursor points to a response, that response is sent. If the cursor points to a command, that command is executed. If the cursor points to a preprogrammed message, that message is sent after prompting for an email address.

The thumbwheel 49 is rotated by the user's thumb to move the display window (i.e., that text actually displayed at any one time) up and down in the display memory. The "distance" covered by a particular degree of rotation depends upon the speed of rotation—rapid rotation results in more movement than does slower rotation.

Figure 33:
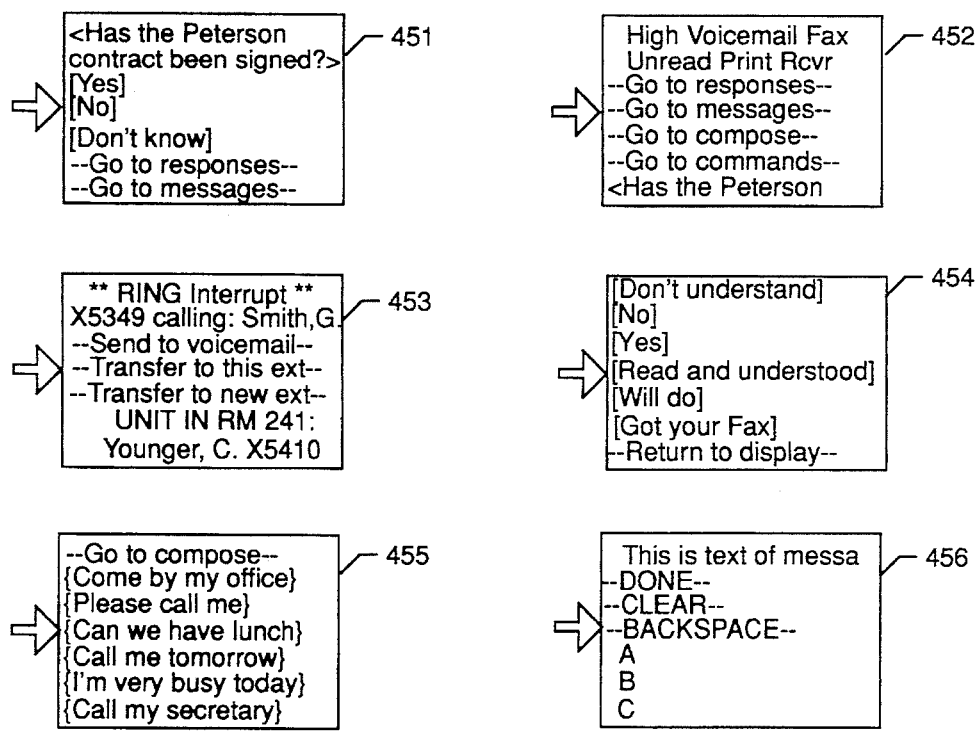
FIG. 33 shows a variety of displays illustrating different situations and the interface presented in each situation.

FIG. 33 shows a variety of displays illustrating different situations and the interface presented in each situation. Display 451 indicates a typical message, with the example shown having the message aligned by the user with the thumbwheel so that the top line of the message is displayed at the top of the display field. The beginning and end of the message are indicated by right and left single brackets, while responses that have been sent along with the message are displayed on each line surrounded by square brackets. The responses are chosen by the sender or software associated with origination of the message and are optional. If no responses are provided or none are appropriate, the user can choose from a set of preprogrammed responses or compose a response letter by letter. To respond to a message by choosing one of the responses received from a message, the user simply orients the display using the thumbwheel so that the desired response is to the right of the cursor, and presses the key. (Alternatively, instead or in addition to a cursor, the line the cursor is pointing to could display the characters in reverse, white on black, or with some similar distinctive form.) If one of the responses is "*MORE*", it indicates that additional data is available in the original message beyond that displayed. Selecting this response will cause transmission of this data to the communications unit. Just after the list of responses received with each message are two additional selections: "Go to responses" and "Go to messages". Pressing the key when the cursor points to either of these will cause the menu of preprogrammed responses or messages to be displayed, as appropriate.

Display 452 shows the top line that is displayed when a user moves the thumbwheel to the highest position in the Display Memory. (Another way to get there is by reversing the rotation of the thumbwheel twice in rapid succession.) The top two lines display status indicators, with one or more of the indicators shown displayed at a given time, as appropriate. If "High" is displayed it indicates that one or more of the unread messages has a priority of High. If "Voicemail" is displayed it indicates that the user has one or more unheard voicemail messages. The user can either call the central voicemail system from a local telephone to listen to them or send a message asking that the messages be transcribed and sent to the communications unit. If "Fax" is displayed it indicates that a Fax message is waiting for the user. A message will also be received indicating which machine the Fax is at if there is more than one machine, and, optionally, a set of responses. If "Unread" is displayed, one or more messages have been received but not displayed by the user. Similarly, if "Print" is displayed it indicates that a print job is waiting for the user. If "Rcvr" is displayed it means that the received signal reliability has been less than 100% over the last N minutes, where N is typically 2. If "Trans" is displayed it means that a transmission from the unit has not been received by a remote station for the last N minutes, where N is typically 2. (The user can tell this from receipt of a Confirm Data packet). "OK" means that the signal reliability has been 100% since receipt of the last packet successfully transmitted to the specific unit, or since receipt of a Confirm Data indicating that all packets sent have been received. Below the status indicators are menu selections that cause the display to move to a particular point appropriate to a specific goal. This is simply a shortcut to reach these menus; the same effect can also be achieved by moving the thumbwheel to move the display window through the display memory.

Display 453 shows an example of a display where a Ring message arrival has interrupted the normal display. This display is set by the user to display :for a fixed period of time (e.g., 30 seconds) and then disappear if no action by the user is taken within this period. The second line indicates the ID (extension number and name) of the calling party, if known. The two lines at the bottom indicate the current location of the communications unit (room number, extension, person or department associated with extension). Lines 3–5 have the following menu selections: The "Send to Voicemail" selection transfers the caller immediately to the voicemail system to take a message, while the "Transfer to Ext" selection will cause the incoming call to be routed to the indicated extension the communications unit is nearest to. The "Transfer to New Ext" selection will display a different menu, not shown, that allows a variety of other options for allowing the user to transfer to an extension other than the one the user is nearest, including arranging for the caller to be placed on hold until the transfer is made. These options, when chosen, will result in a new message from the Central Station displayed as a Ring interrupt on the LCD verifying the action, such as "Transfer to X5410 accepted."

Display 454 shows examples of preprogrammed responses that can be selected by the user and sent. The user orients the desired response so it is to the right of the cursor and presses the key. The last selection in this list ("Return to display") does not send a response but causes a redisplay of the last message to be displayed. The display will also redisplay the last message after any response is sent.

Display 455 shows examples of preprogrammed original messages that can be selected by the user, with each message enclosed in curly brackets. If this display is entered by selecting the "Go to messages" selection from a displayed message, the message will be sent as a response to that message. Otherwise, selection of the message (by pressing the key) will result in the display of a menu of electronic mail addresses. When that selection is made (again with the key) the message will be sent. One of the choices from the menu of electronic mail addresses allows the user to compose an email address letter by letter. If none of the canned messages is appropriate, the user selects the first item on the list ("Go to compose message") which allows messages to be composed letter by letter.

Display 456 shows the list of individual characters and associated commands that can be selected to compose a message or email address. The composed material is displayed at the top of this part of the display memory, as shown in the example "This is text of message". Each letter is selected by pressing the key; the message is sent when Done is selected. "Clear" will erase the composed message and allow the user to start over. "Backspace" erases one letter.

Another display, not shown in a figure, allows the user to choose one or more commands to be executed that control operation of the remote communications unit. Some parameters for operation are set by the user using the thumbwheel and key; other parameters are set at the central communications station by a user addressing an email message (from a workstation) appropriately to a utility program that sets such parameters, with the email message containing the appropriate information.

The following Me examples of commands that can be selected by the user at the unit:

"Beep if message rcvd" causes an auditory alarm if any message has been received.

"Beep if Urg msg" causes an auditory alarm if an Urgent message has been received.

"Flash if Ring" causes the Ring/Urg lamp to flash if a Ring message has been received.

"Beep if Ring" causes an auditory alarm if a Ring message has been received.

"Menu if Ring" causes a display of the user's location and the menu (shown as 453) to be displayed when a ring message has been received to allow the user to transfer the call to a nearby extension.

"Locate" prompts for an email address and returns the last known location of the unit associated with that address.

"Set Privacy Mode" turns off the "locate" command (which allows other users to determine the last known location of a user) for this user.

Other commands allow a user to define new responses to be added to the menu, new original messages, and new email addresses.

Figure 34:
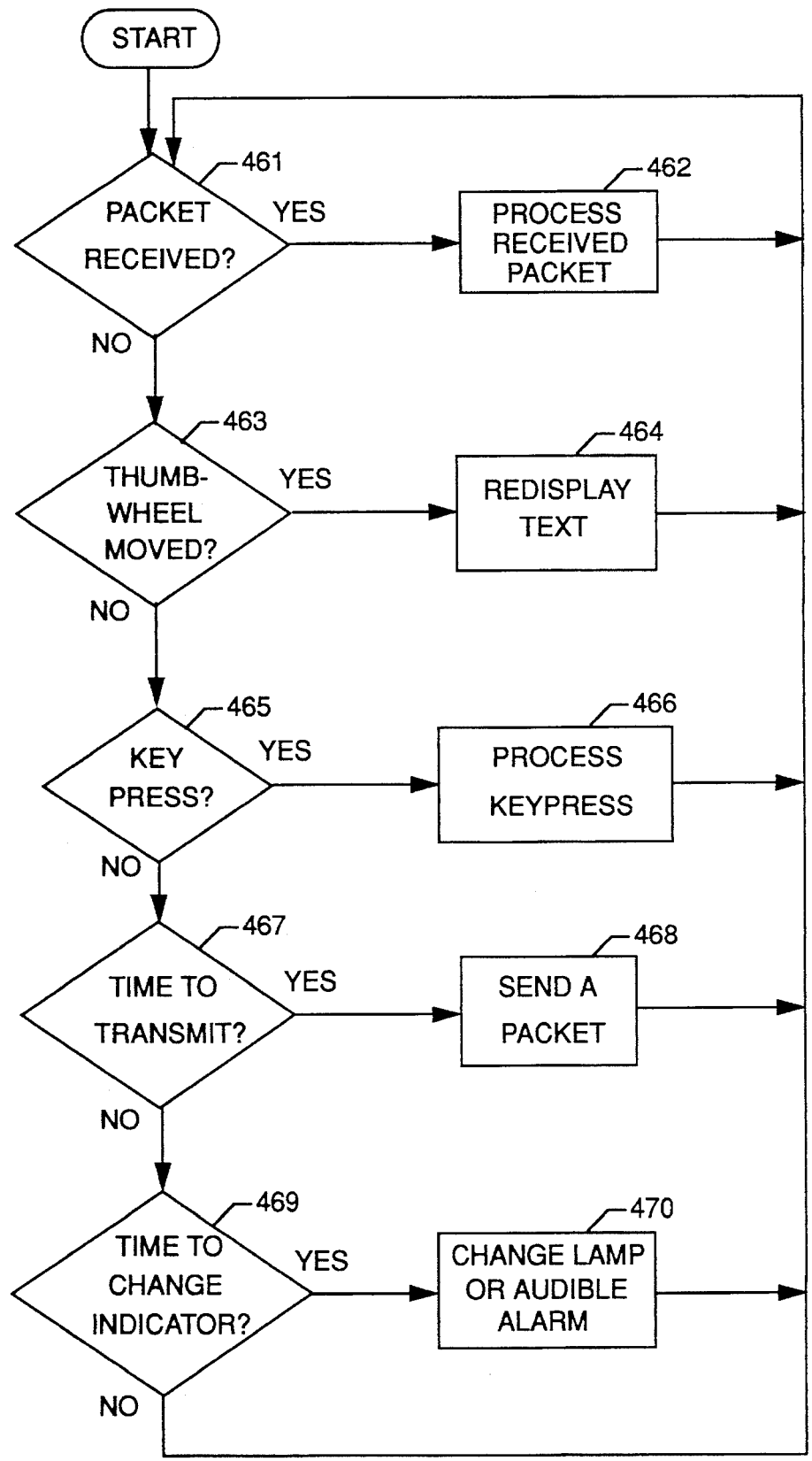
FIG. 34 shows a flowchart of the architecture of the software for the communications unit.

FIG. 34 shows a flowchart of the architecture of the software for the communications unit. Software is divided into five primary modules: (1) A module for processing packets that have been received from the central station: (2) A module for redisplaying message and menu text when the thumbwheel has been moved; (3) A module for processing presses of the key on the communications unit: (4) A module for transmitting a packet from the unit: and (5) A module that changes indicators such as the lamps and auditory alarm at specific times to provide appropriate flashing or beeping effects. In addition, clock and communications interrupt modules, not shown in the figure, provide support to the above software.

At the start of the module, a test is made 461 of whether a packet has been received by the unit from the central station via radio. Such a packet is detected by an interrupt service routine that processes incoming characters from the unit communications interface, which generates an interrupt for each received character. The interrupt handler looks for an SOH character, placing received characters into a buffer when an SOH has been detected. When an EOT character is received, the handler sets a flag indicating that a packet is ready to be processed.

If a packet has been received, the packet processing module 462 is called, resulting in different actions depending on whether the packet is a Data. Input Acknowledge, AckAck, or Confirm Data packet. Details arc described in FIGS. 35–36 and the associated text. In general, packets are first error checked and the Unit ID compared with the internal ID of the unit and ignored (except for use in computing signal reliability statistics) if an error is detected or if the packet is for another unit. A Data packet is entered into memory, displayed, and an indicator alarm triggered, depending upon the packet priority and other factors. An Input Acknowledge packet causes an Input Data packet that the unit hits been holding to be deleted, and an AckAck packet causes an Acknowledge packet that the unit has been holding to be deleted. Receipt of either causes the unit to transmit immediately if there is input data or acknowledgements remaining in the Input Data Queue or Packet Acknowledgement Queue after the above deletions. A Confirm Data packet, if there is missing received data, causes an indicator light to turn on to alert the user that the unit must be reoriented in direction or moved in position to allow data from the unit to be received.

If a packet has not been received, a test is made 463 of whether the thumbwheel has moved. An interrupt handler is used, with a clock tick every 0.83333 mS resulting (after a software divide-by-64 counter) in the thumbwheel position being checked every 53.33 mS and, if it has moved beyond a threshold allowable drift, a flag is set indicating that the window in the display memory should be moved, and a value for the amount of movement calculated.

If the thumbwheel has not moved, a test is made 465 of whether the key has been pressed. If yes, the appropriate action is taken 466, depending upon the location of the cursor in the displayed text and the context. This action may be to display different text, to execute a command that changes a local parameter (e.g., silencing the auditory alarm), or to execute a command or select a response that results in input data being transmitted to a remote station and then to the central station. If a response is selected a subpacket is formatted with an appropriate response sequence, including an Input Packet Number and a channel number indicating the destination address of the response. This sequence number is entered after incrementing the current Input Packet Number saved as a variable. The channel number is that found in the Display Memory associated with the message the response is to. If an original message is selected a subpacket is formatted in the same manner its described above. Either a channel number or the text of an email address is sent, depending upon whether the address is in the preprogrammed list or composed by the user. Any such input data is held in the Input Data Queue until the next transmission of an input packet. If input data has been generated, the Transmit Flag is set so that the packet will be transmitted immediately.

If a key has not been pressed, a test is made 467 of whether it is time for a transmission to be made from the unit. This is done by testing the state of the Transmit Flag. This flag is set (as indicated above) by a key press that results in input data that needs to be sent, the receipt of a non-Ring Data packet (resulting in an Ack that needs to be sent), by a timer that sets the flag at regular intervals, or by the receipt of an Input Ack or AckAck packet when data still remains to be sent. The average time between intervals varies depending upon the receipt of data packets, the generation of input data, and the passage of time. There are three different intervals: A "short interval" results in transmissions being made at an interval from 10–25 seconds, with the exact time determined by adding 10 to a 4-bit random number. A "medium" interval is from 26–57 seconds, determined by adding 26 to a 5-bit random number. A "long" interval is from 58–121 seconds, determined by adding 58 to a 6-bit random number. The entry of input data results in transmission at short intervals, after the initial transmission which is done immediately. The receipt of a Data. Input Ack, or AckAck packet results in transmission at medium intervals (if the unit is not already transmitting at short intervals), after the initial transmission done immediately. After a unit has transmitted at short intervals for 5 minutes, it proceeds to transmit at medium intervals (if there has been no additional activity). After a unit has transmitted at medium intervals for 10 minutes, it proceeds to transmit at long intervals (if there has been no additional activity). Increasing the time between transmissions reduces drain on the battery in the unit, and also, together with random determination of the time between transmissions, reduces the likelihood of collisions between transmissions of different units in the same room.

(In an alternative embodiment, the time interval between transmissions is determined by three factors: the type of information in the packet (whether acknowledge, input data, or neither), the amount of data in the packet, and the lime since an event such its receipt of a Data packet or entry of input data. An interval is calculated by first determining a range of possible values, with the maximum of this range determined by multiplying the length of the packet to be transmitted by a factor reflecting the relative priority of the information contained in the packet and then by a function that decreases with the time since the last event. The minimum of the range is 0. A number is then randomly determined within this range to serve as the delay interval.)

When a unit transmits, it selects the first sequence of input data from the Input Data Queue, and the first acknowledgement (or sequence, if continuous) from the Packet Acknowledgement Queue. This data is entered, along with the Unit ID, into the Unit Transmission Buffer, according to the format shown in FIG. 12, and the transmission of that buffer initiated 468. If Input Data is being transmitted the Communications Stale variable is set to 3 to indicate that the Input Data Timer is on, and the Input Data Timer is set to 20 seconds. The same clock interrupt handler that is used for periodically checking the position of the thumbwheel is also used, by means of software counters, to measure the time between transmission intervals its well as the time to change the visual and auditory indicator states, as described below.

Figure 37:
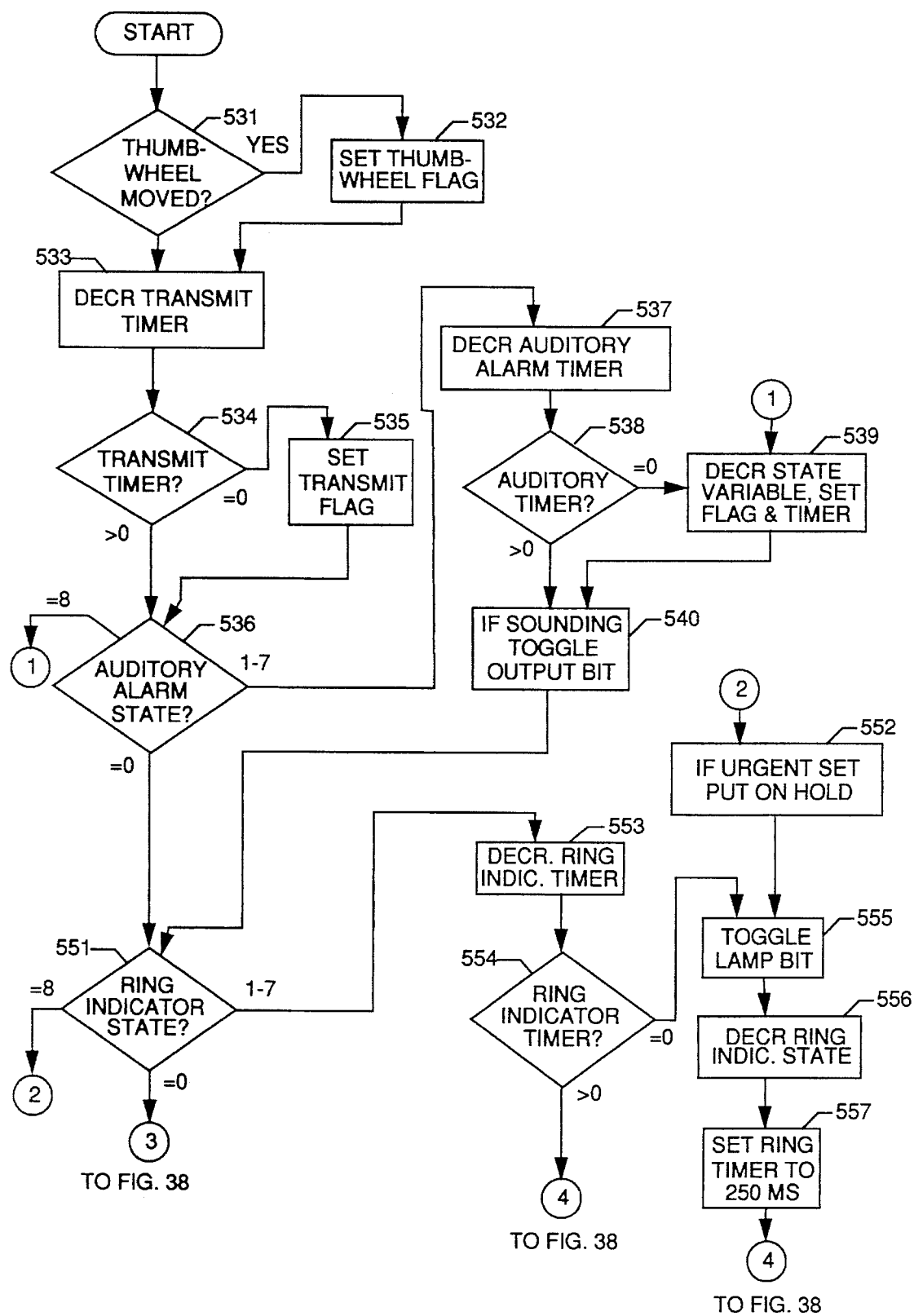
FIG. 37 shows a flowchart of the first part of the clock interrupt software for the microprocessor in the communications unit.
Figure 38:
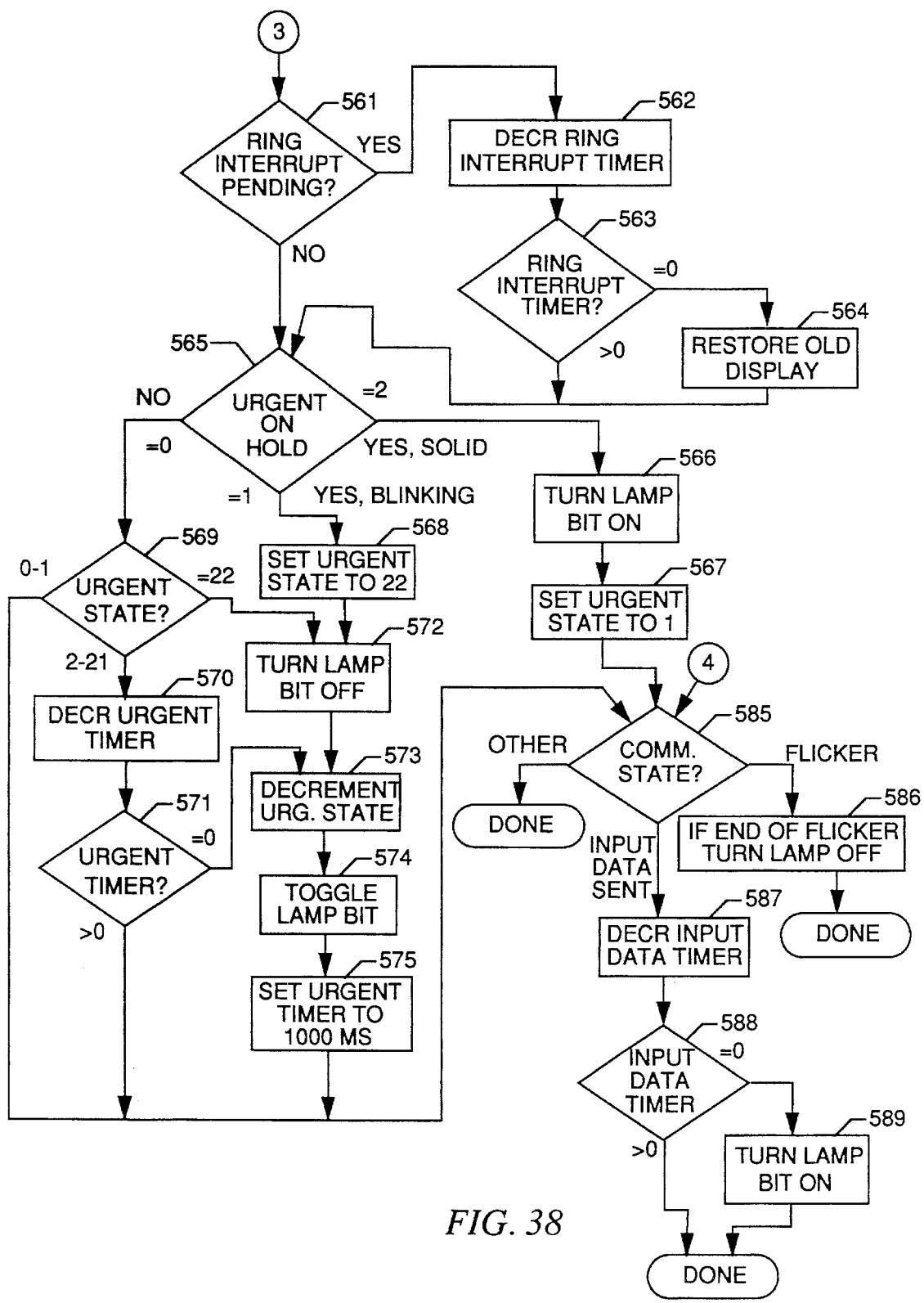
FIG. 38 shows a flowchart of the last part of the clock interrupt software for the microprocessor in the communications unit.

If it is not time to transmit, a test is made 469 of whether it is time to change the indicators, including toe Ring/Urgent lamp, the Communications lamp, or the auditory alarm. These operations 470 are performed by the clock interrupt handler, and details are shown in FIGS. 37 and 38.

After each event has been processed, control is passed to the start of the module, with the sequence of tests ensuring that the highest priority tasks we performed first.

Figure 35:
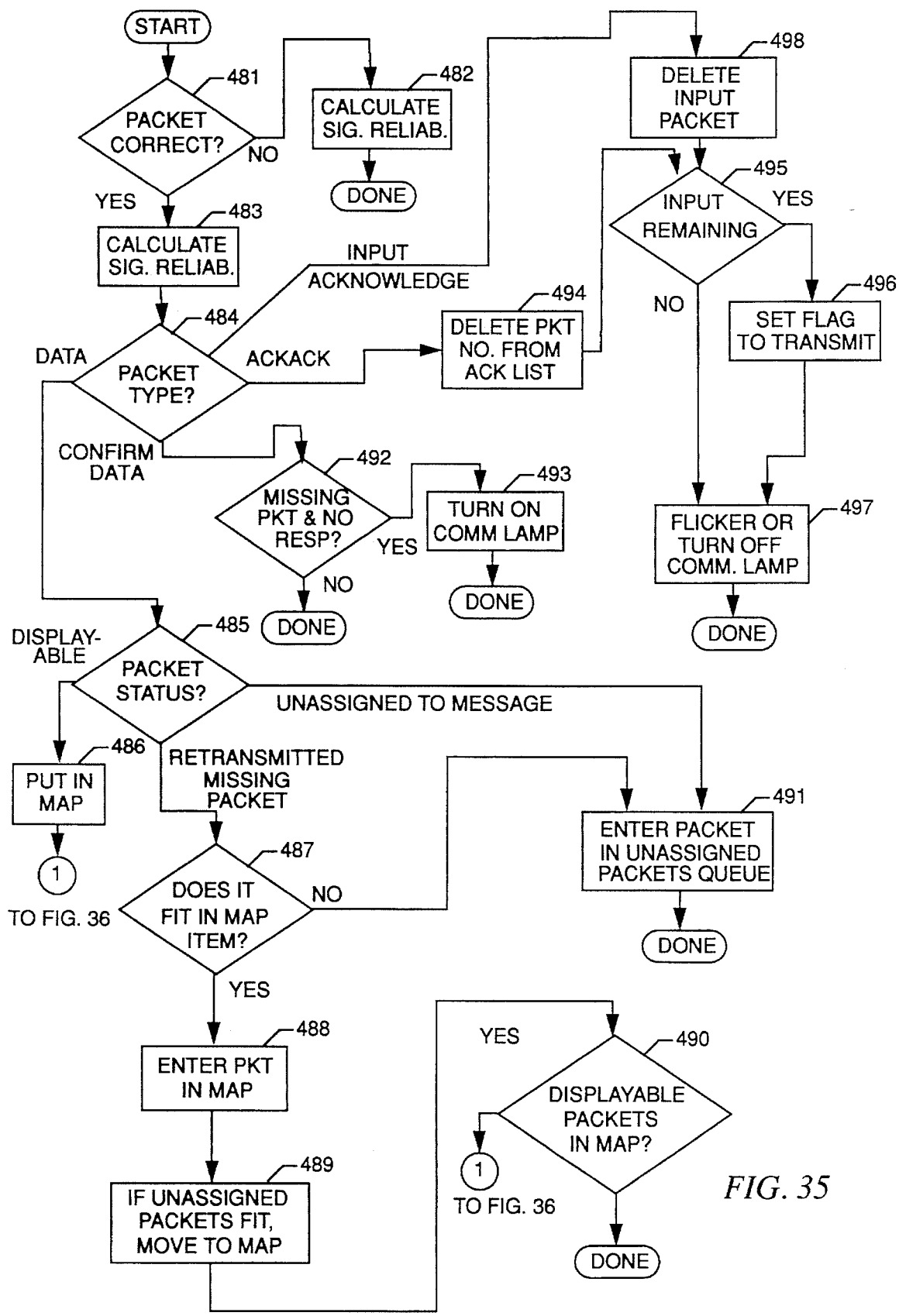
FIG. 35 shows a flowchart of the part of the software module in the communications unit devoted to processing incoming packets that have been received by the unit via radio.

FIG. 35 shows a flowchart of the part of the software module in the communications unit devoted to processing incoming packets that have been received by the unit via radio.

A test is first made 481 of whether the Unit ID in the packet matches the internal ID of of the unit and that the packet successfully passes an error check (by comparing the received cyclic redundancy check with one computed from the received data). If the unit ID does not match or if an error is found, the packet is not used. A calculation is then made 482 of the received signal reliability and the packet processing module is done. If the reliability drops below a certain threshold, the "Rcvr" indicator is turned on, and "OK" is turned off if it was previously on. (Signal reliability is based on the proportion of packets received with a correct error check, regardless of the unit ID, as a function of the total number of packets received over a window of the last 120 seconds.) If there are no errors and the Unit ID is correct, a calculation is made 483 of the received signal reliability, and a test is then made 484 of the packet type.

If the packet is a Data packet, a test is made 485 of the status of the received packet, in the sense of how it should be processed, with this status determined largely by the sequence number of the packet number and its relationship with the last packet received for the given priority (referred to as the LPRGP). A packet is "Displayable" if the received packet has a sequence number exactly one above the LPRGP, or if it has a sequence number more than one above the LPRGP (implying one or more missed packets) and the packet is the first packet in a message. A packet is "Unassigned to Message" (meaning that it cannot be identified its belonging to a particular message) if it has a sequence number more than one above the LPRGP and the packet is not the first packet in a message. A packet is a "Retransmitted Missing Packet" if the sequence number is less than the LPRGP. If the packet has a sequence number exactly matching the LPRGP, it is a duplicate copy of a previously received packet and is ignored.

If the received packet is Displayable, it is placed 486 in the appropriate item in the Incomplete Message Packet Map (determined by searching the map for an item in which the sequence number fits, or creating a new item if the packet is the first in a message). The received packet number is then stored in the LPRGP as its new value, and control passed to point 1 in FIG. 36 so that the packet can be displayed or otherwise acted upon.

If the received packet is a Retransmitted Missing Packet, the Incomplete Message Packet Map is searched 487 to see if the packet unambiguously lib in a map item. If yes, the packet is entered 488 into that item (or a new item created if the packet is the first in a message). The Packets Unassigned to Messages List is then searched to see if there are packets that can be fit into the Incomplete Message Packet Map as a result of the most recent entry. If so, those packets are moved 489 to the map.

A test is then made 490 of whether there are new displayable packets in the map item just modified. If yes, control passes to point 1 in FIG. 36 so that they can be displayed. If not, the module is done.

If the received Retransmitted Missing Packet does not lit in the map item (test 487), control passes to step 491.

If the received packet is Unassigned to Message (resulting from the packet not having a previous packet received and not being a first packet in a message, and thus unable to be stored in the Incomplete Message Packet Map), the packet is entered 491 in the Packets Unassigned to Messages List, and the module is done.

If the packet type is Confirm Data, a test is made 492 of whether a packet is missing (as indicated by either packet sequence numbers for one or more priorities contained in the Confirm Data packet, not matching the unit's LPRGP, or noncontinuous packet numbers of received packets). If yes, and, in addition, a response has not been received for a threshold time period (30 seconds for Urgent packets, 120 seconds for others), the unit must successfully respond before that packet will be retransmitted, and thus the Communications lamp is turned solidly on 493 (by setting the Communications State to 1 and the Communications Lamp Bit to 1) to indicate to the user that the unit should be moved in orientation or position so as to reestablish contact. The module is then done. If no packets are missing, the module is done immediately.

If the packet type is AckAck, the packet sequence number contained in the AckAck packet is removed 494 from the Packet Acknowledgement Queue. (If the packet sequence number is not in the list the packet is ignored as redundant.) Control then passes to step 495.

If the packet received is an Input Acknowledge, the relevant packet is deleted 496 from the Input Data Queue. In addition, the Input Data State is set to 0, turning off the associated timer.

A test is then made 495 of whether there is input remaining—either input data or acknowledgements— in either the Packet Acknowledgement Queue or Input Data Queue, after the above deletions have been made. If yes, the Transmit Flag is set 496 so that the unit will transmit immediately.

If the Communications lamp is on, it is turned off 497. If the lamp is not on, and only if an Input Ack was received, it is set to flicker for 150 mS (by setting the Communications State to 2 and the Communications Timer to 180), indicating in either case that the central station has received input data from the unit. The module is then done.

If the packet type is Input Acknowledge, the indicated input packet in the Input Data Queue is deleted 498. In addition, the "OK" indicator is turned on if the Rcvr indicator is also off, and the "Trans" indicator turned off, if previously on. The Transmit Received Timer is also set to 0. Control is then passed to step 495. If the indicated input packet is not in the Input Data Queue, the Input Acknowledge packet is ignored as redundant.

Figure 36:
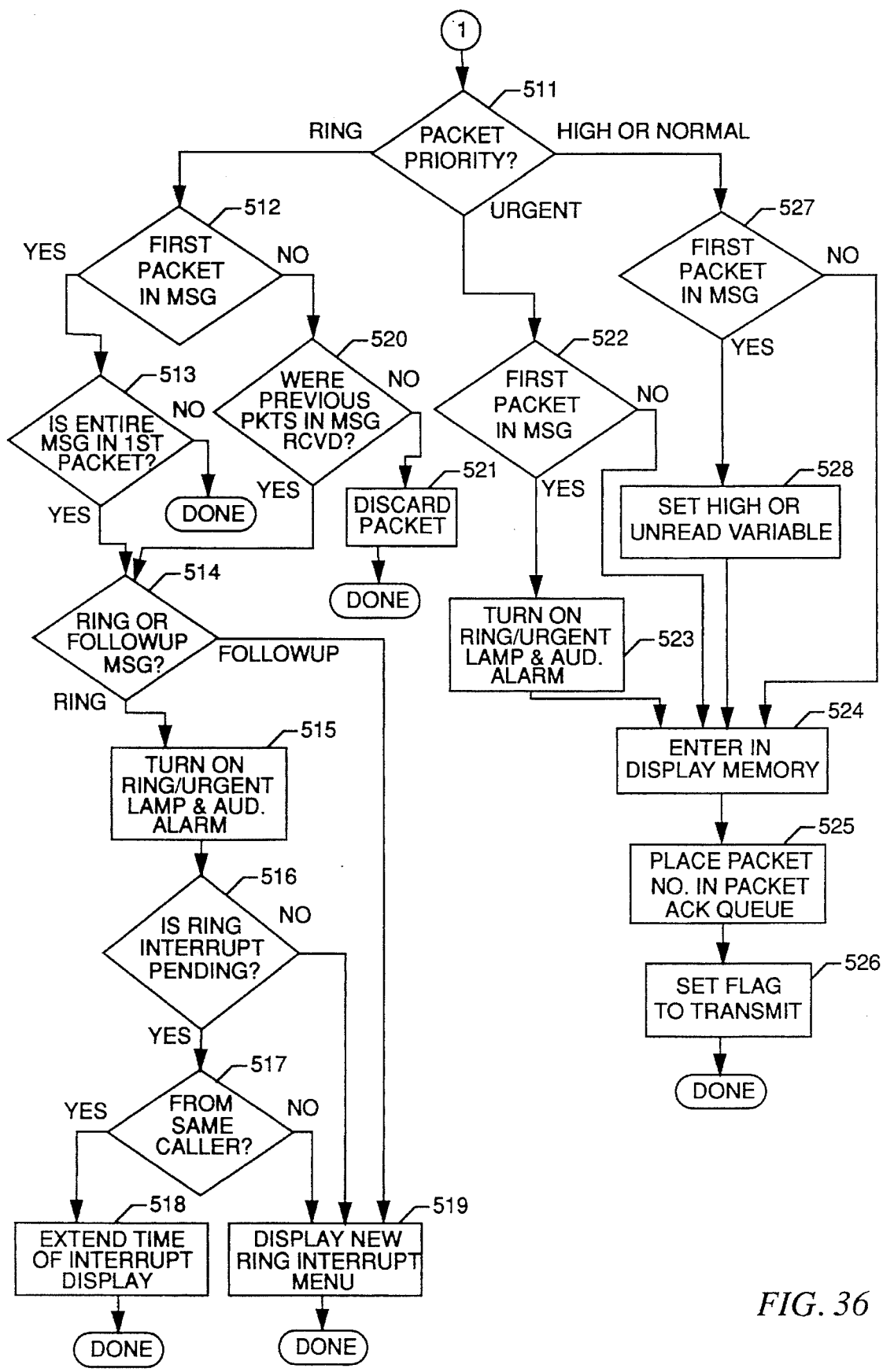
FIG. 36 shows a flowchart of the part of the software in the communications unit that processes displayable incoming Data packets that have been received.

FIG. 36 shows a flowchart of the part of the software in the communications unit that processes displayable incoming Data packets that have been received.

At point 1, a test is made 511 of the priority of the packet. If the priority is Ring (indicating an incoming telephone call), a further test is made 512 of whether this is the first packet in the message (indicated by an STX as the first character in the text field). If yes, a further test is made 513 of whether the entire message is contained in the first packet. If no, the message is not displayed at this time, and the module is done. If yes, a further test is made 514 of whether the message is a normal Ring message or a Ring Followup message, which is identified with an ASCII SUB character just after the channel number. If the message is a Ring Followup message, control is passed to step 519. If the message is a normal Ring, the Ring State is set 515 to 8 to start the Ring/Urgent lamp flashing. The Auditory (or vibratory) Alarm State variable is also set to 8 to initiate it, if appropriate. A test is then made 516 of whether a Ring Interrupt Display is being displayed at the present time. If no, control passes to step 519. If yes, a test is made 517 of whether the Ring message is from the same caller as the Ring Interrupt being displayed. If yes, the time that the present Ring Interrupt Display will be displayed is extended 518 (by setting the Ring Interrupt State to 1 and the Ring Interrupt Timer to be 30 seconds from the present time), and the module is done. If no, the Ring Interrupt is displayed 518 for the new call, and the module is done.

The Ring Interrupt Display will be maintained until either the user selects a response, 30 seconds have elapsed, a Ring Followup message has been received, or a new Ring packet has been received for a different incoming call than that just displayed.

If the received packet is not the first packet in the message (test 512), a further test is made 520 of whether previous packets in the same message have been received. If yes, control passes to step 514. If no, the just-received packet is discarded 521. (If a Ring packet is lost, other packets in the same message are discarded, with the unit then waiting until the next Ring). The module is then done.

If the packet priority is Urgent, a further test is made 522 of whether the received packet is the first packet in the message. If yes, the Urgent State is set 523 to 22 to initiate the lamp blinking, and the Auditory Alarm State set to 8 if appropriate. In addition, the "Unread" message variable is set. Control then passes to step 524. If this is not the first packet in the message, control passes immediately to step 524.

The packet is then entered 524 into the display memory. If the message has a special character indicating that this announces that a Fax, Voicemail message, or Print job is available, the appropriate text is entered into the Display Memory to allow the appropriate indicator to be turned on. If the character just before the EOM is an ETB, indicating that there is additional data, a "*MORE*" response is provided to the user as an option. The packet number of the received packet (note that its first 2 bits consist of the packet priority) is then placed 525 in the Packet Acknowledgement Queue. The Transmit Flag is then set 526 so as to initiate transmission of the Unit Transmission Buffer immediately. The module is then done.

If the packet priority is High or Normal, a further test is made 527 of whether the received packet is the first in the message. If yes, the "High" and/or "Unread" message variable is set 528, as appropriate, and control passed to step 524. If the received packet is not the first in the message, control is passed immediately to step 524.

FIG. 37 shows a flowchart of the first part of the clock interrupt software for the microprocessor in the communications unit.

An interrupt occurs every 0.83333 mS, resulting in execution of the clock interrupt software. Once initiated, a test is first made 531 of whether the thumbwheel has moved beyond a certain threshold level. This is done by first checking a Thumbwheel Timer, which ranges from 0–63. If it is 0, the thumbwheel movement is calculated and the timer reset to 63. If not, the Thumbwheel Timer is decremented. This results in checking the thumbwheel position every 53.333 mS. If the thumbwheel moved, the Thumbwheel Movement Flag is set 532 so that the main program can respond to the movement.

The Transmit Timer, which holds the time remaining until the next transmission from the unit, is then decremented by an appropriate amount 533, and the result tested 534. If the result is 0, the Transmit Flag is set 535, indicating to the main program that a transmission should be initiated.

A test is then made 536 of the Auditory Alarm State. This variable is 0 if the alarm has not been initiated, from 1 to 7 if it has, and 8 if the initiation has just been requested by the main program. Each of the states 1–7 represent time intervals in which the alarm is sounding or silent, with the intervals having the following lengths: Sounding for 50 mS, silent for 150 mS, sounding for 50 mS, silent for 750 mS, sounding for 50 mS, silent for 150 mS, and sounding for 50 mS (for states 7 through 1, respectively). If the Auditory Alarm State variable is 8, control is passed to point 1. If it is 0, control passes to step 551. If it is from 1 to 7, the Auditory Alarm Timer is decremented 537 and the result tested 538. If the result is 0 (end of alarm interval), control is passed to point 1.

At point 1, the Auditory Alarm State variable is decremented 539, the Auditory Alarm Timer is set to the maximum value for the new state (depending upon the time interval for that state), and the Sounding/Silent Flag is set to 1 or 0 depending upon whether the new state is sounding or silent, respectively. Control then passes to step 540. If the result of test 538 is greater than zero, indicating that time still remains in that alarm interval, and the Sounding/Silent Flag indicates Sounding, the state of the Auditory Output Bit is toggled 540 (so as to create an on-off square wave with a period of 1.667 mS, resulting in an audio frequency of 600 hz plus harmonics). (Alternative embodiments might use a different sound pattern for different events, e.g., Ring, second ring for same caller, Urgent, etc., with a clock interrupt routine based on that shown here). Control then passes to step 551.

A test is then made 551 of the Ring Indicator State. If the Ring Indicator State variable is 8, control passes to point 2 to initiate a Ring indicator cycle.

At point 2, a test is made of whether the Urgent State is nonzero (indicating that an Urgent message is pending). If yes, the display indicating it is put on hold 552. This is done as follows: If the Urgent State is 1, indicating that the lamp is solidly on, the Urgent Hold State is set to 2, indicating a solid hold. If the Urgent State is 2 to 22, indicating that the lamp is in its blinking stage, the Urgent Hold State is set to 1, indicating a blinking hold. The Ring/Urgent Lamp Bit is then set to 0. Control then passes to step 555.

If the Ring Indicator State is 1–7, the Ring Indicator Timer is decremented 553, and the value after decrementing tested 554. If the result is greater than 0, control passes to point 4 in FIG. 38. If the result is 0, the Ring/Urgent Lamp Bit is toggled 555, the Ring Indicator State is decremented 556, and the Ring Timer is set 557 to 300, representing a value of 250 mS. Control then passes to point 4 in FIG. 38.

If the Ring Indicator State (test 551) is 0, ringing is not occurring, and control passes to point 3 in FIG. 38.

FIG. 38 shows a flowchart of the last part of the clock interrupt software for the microprocessor in the communications unit.

At point 3, a test is made 561 of whether a Ring Interrupt is pending, by testing the Ring Interrupt State. If it is 1 (yes, pending), the Ring Interrupt Timer is decremented 562. A test is then made 563 of the value of the Ring Interrupt Timer. If the result is 0, the old display is restored 564 (from the appropriate location in the Display Memory), and the Ring Interrupt State set to 0. Control then passes to step 565. If the Ring Interrupt Timer is greater than 0, control passes immediately to step 565. If the result of the test 561 of the Ring Interrupt State is 0, control also passes immediately to step 565.

A test is then made 565 of whether the Urgent indicator has been put on hold. (This is done by testing the Urgent Hold State, which is 2 if on hold from a solidly on lamp, 1 if on hold from a blinking lamp state, and 0 if not on hold.) If it is on hold, being solidly on, the Ring/Urgent Lamp Bit is turned on 566, the Urgent State is set 567 to 1, and control passes to point 4. If the Urgent indicator has been put on hold from a blinking state, the Urgent State is set 568 to 22, to reinitiate the blinking cycle from the beginning, and control passed to step 572.

If the Urgent indicator has not been put on hold, a test is made 569 of the Urgent State. If the Urgent State is 0 (no Urgent message pending) or 1 (lamp solidly on), control is passed to point 4. If the Urgent State is from 2 to 21 (representing intervals of on-off toggling every 1 second, resulting in a 1 sec on—1 sec of duty cycle every 2 seconds), the Urgent Timer is decremented 570 by 1, and a further test made 571 of the value of the Urgent Timer after such decrementing. If it is greater than 0, then the interval is not over, and control is passed to point 4. If the Urgent Timer is 0, then the interval has expired, the Urgent State variable is decremented 573, the Ring/Urgent Lamp Bit is toggled 574 (to turn the lamp on if previously off and vice-versa), and the Urgent Timer is set 575 to a value of 1200. (This represents 1000 mS, with each tick of the 0.83333 mS clock causing the timer to be decremented by 1). Control is then passed to point 4.

If the Urgent State is 22 (Urgent just initiated), the Ring/Urgent Lamp Bit is set 572 to off (to make sure), and control passed to step 573.

At point 4, a test is made 585 of file Communications State. If it is set to 2 (flicker), indicating that a single flicker is being displayed, the Flicker Timer is decremented and, if the result is 0, the flicker has ended and the the Communications State and Communications Lamp Bit are set 586 to 0. If the Communications State is set to 1 (input data sent), indicating that the Input Data Timer is on, the Timer is decremented 587 and the result tested 588. It it is 0, the Communications Lamp Bit is set 589 to be solidly on. The module is then done and the interrupt is dismissed. If the Input Data Timer is greater than 0, the module is also done. If the Communications State (test 585) is 0, the interrupt is dismissed immediately. Also included in the interrupt module (but not shown in the figure) is code for determining whether an Input Acknowledge packet (either an InputAck or UnitAck) has been received within a timeout period. Each clock interrupt causes a Transmit Received Timer to be incremented, and a test is made to see if the timer is greater than a timeout period, e.g., 180 seconds. If yes, the "Trims" indicator is displayed, and the "OK" indicator is turned off, if previously on. Similarly, a Signal Received Timer is incremented and used to determine whether a reliable signal has been received for at least the last 120 seconds. If not, the "Rcvr" indicator is turned on, and "OK" is turned off, if previously on.

FIGS. 39–43 show the data structures used in the software for the communications unit.

FIG. 39 shows the data structure for the Incomplete Message Packet Map. Each item in the Map contains information available about packets related to a specific message that is incomplete (i.e., all packets in the message—a first packet, a last packet, and all intervening packets—have not been received). An entry is made in the Map only if the first packet in the message has been received; otherwise, a packet is entered in the Packets Unassigned to Messages List. This implies that the first packet entered into the Map for each message is the first packet in that message. Each item in the Map consists of a priority for the message 601, a "packet slot" (e.g., 602) for each of the 8 packets that can potentially be in a message (0 through 7), and the sequence number for the first packet 603 (14 bits). Each packet slot, in turn, expanded as indicated by the arrow, consists of a Received Bit 604, which is set to either 1 or 0 depending on whether the corresponding packet has been received or not, and an indirect pointer 605 to the Packet Text List, which contains the actual text received for each message. (The pointer references the address of a pointer in the Pointer List that contains the actual address in the Packet Text List). During error-free transmission the first packet and any number of succeeding packets may be received (Received Bit set to 1) while following packets have not been received (bit set to 0). If a packet has been received, however, and any packet slot preceding it (i.e., to the left in the diagram) has its Received Bit set to 0, the associated packet is missing. Note that the channel number tier each message is stored in the Packet Text List in the first packet received for that message, just after the STX character.

Also associated with the Map (but not shown in a figure) are four 14-bit counters, one for each packet priority, known as the LPRGP (Last Packet Received for Given Priority). This contains the packet sequence number for the last packet received for each priority.

FIG. 40 shows the data structure for the Packets Unassigned to Messages List, used in the software in the communications unit. This list holds those packets that have been received but have not been assigned to a message in the Incomplete Message Packet Map because there is no information, or the information is ambiguous, about their relationship to a particular message. The list consists of the following fields for each received packet: The priority 606, the packet sequence number 607 (14 bits), and a pointer 608 to the Packet Text List.

FIG. 41 shows the data structures for the Packet Text List. This contains the text of packets being tracked by the Incomplete Message Packet Map and Packets Unassigned to Messages List. The upper part of the figure contains the text itself (612, 614, and 616), with packets placed in the Packet Text List in the order in which they are received, with each text packet beginning with an SOH (611, 613, and 615), and terminated 617 by either an SOH (indicating the start of a following packet) or an ETB (if no packet follows). The lower part of the figure contains a 16-bit pointer for each packet that indicates the address of the beginning of the packet. When a packet with N bytes is removed from the list the remaining text in the list is moved up by N bytes to take the place of the deleted packet and the pointers recalculated appropriately.

FIG. 42 shows the data structure for the Display Memory and the associated Display Window. The Display Memory 621 contains all of the information that can be displayed by the unit, in the order that a user might view it by rotating the thumbwheel. At any given time, only a narrow window (equal to the size of the display) is visible, with data transferred from the Display Memory to the Display Window 622 (a small buffer memory that is part of the LCD and which drives the display) whenever the thumbwheel is moved. The information contained in the Display Memory includes status indicators and the top-level menu (see the description of the unit interface), all text of the received messages, text of preprogrammed responses, text of preprogrammed messages, text and data liar the Compose operation, text of electronic mail addresses, and text of commands.

Also shown is a Pointer List 623, which contains 10-bit addresses pointing to the beginning of each of the significant areas of memory, in bytes. A pointer is included for each of 3 priorities of received messages (Urgent, High, and Normal) and for each of the areas shown in the display memory diagram 621. (The Status Indicator area begins at address 0). Within a message priority, messages are stored in the Display Memory in the order of receipt of the first packet. Each message has been formatted at the central station to fit into specific lines (with a maximum of 20 character per line). Each message begins with (just after the STX character) a nondisplayed character that contains the channel number. Each physical line of text is terminated by a newline character. The message itself is terminated by an ASCII ETX (or a BEL if the full message has not been received). Each response included with the message is then terminated by an ETX. (If the response extends across more than one physical line each line is terminated by a newline character). The last response is terminated by an EOM, with the EOM appearing at the end of the message even if there are no responses.

Preprogrammed Responses, Messages, Addresses, Commands, and the Compose Menu are coded similarly, with each physical line terminated by a newline character if the response extends across a single physical line, and each response terminated by an ETX. The Compose Menu also includes space for holding a response composed by the user.

FIG. 43 shows the data structures for the Input Data Queue, Packet Acknowledge Queue, and Unit Transmission Buffer.

Each entry in the Input Data Queue consists of the channel number for the message 631, a tag 632 indicating whether the input data is in the form of actual text or compressed text using a code, and a pointer (10 bits) to the actual input text or the actual code in the display memory.

Each entry in the Packet Acknowledgement Queue consists of the 14-bit Packet Sequence Number 634 for the packet being acknowledged.

The Unit Transmission Buffer consists of the current input packet being (repeatedly) transmitted, and consists of a packet header 635, unit ID 636, data 637 (either input data, an acknowledgement, or both), error check 638 and EOT 639. (An alternative embodiment would allow either input data or an acknowledgement, but not both, or, at the other extreme, multiple input packets and acknowledgement packets, with the transmission capacity and reliability in both directions and battery capacity determining the optimum design).

Figure 44:
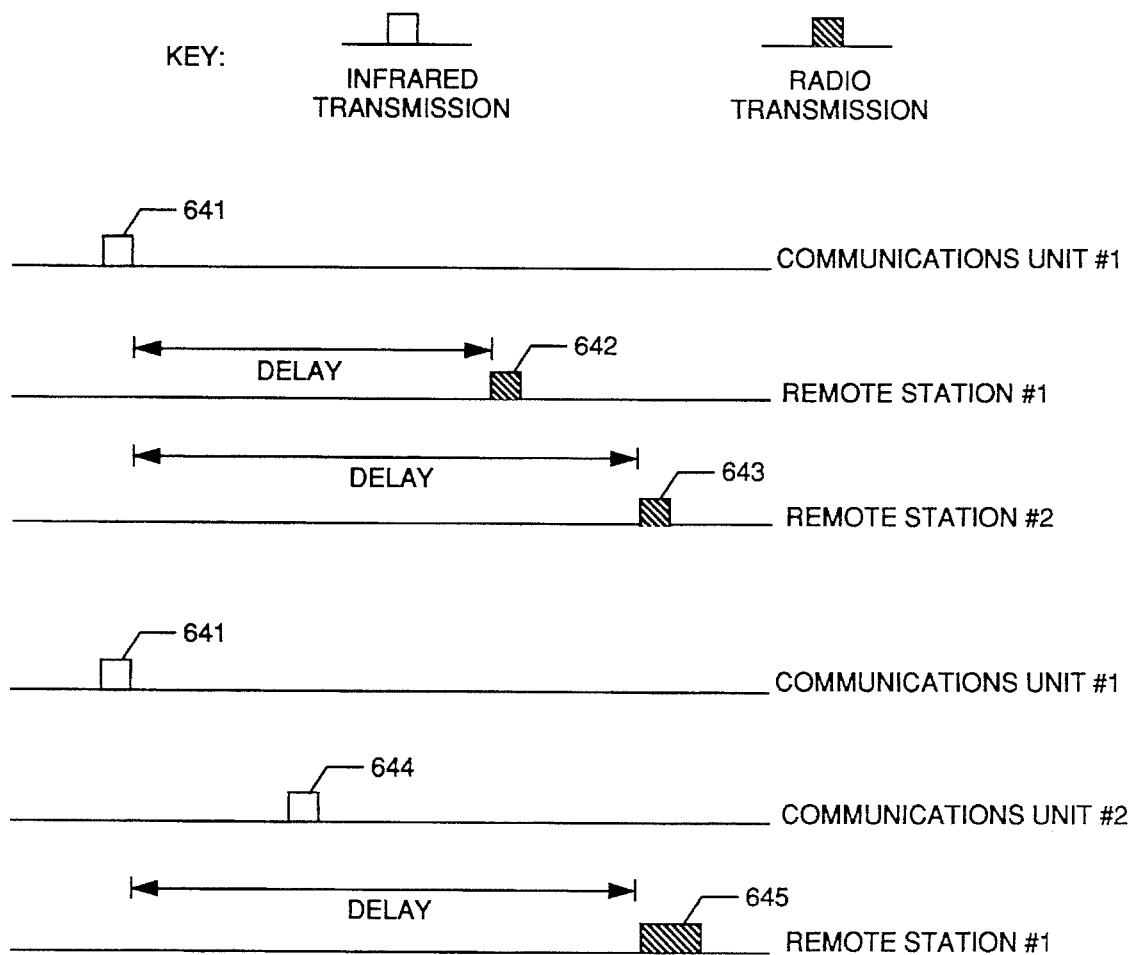
FIG. 44 shows the timing relationships between transmissions by communications units and remote stations receiving from the communications units.

FIG. 44 shows the timing of relationships between transmissions by communications units and remote stations receiving from the communications units. A unit transmits a packet 641 of 70 to 410 bits in length, which takes 1.82 to 10.66 mS at an infrared transmission rate of 38,400 bits per second. A remote station receives and stores this transmission and retransmits it via radio 642, also at 38,400 bits per second, after a randomly deterairier delay. A second remote station may also receive the transmission from the communications unit and retransmit it 643, but usually with a different delay so as to avoid conflict. (Occasional conflicts will occur that cause both retransmissions to be destroyed; this is rare and requires only that the system wait for another transmission from the unit).

In cases where a second communications unit transmits 644 during the delay period, the remote station will store that packet as well and retransmit 645 both packets at the end of the delay period. (Note that the length of the packet transmissions shown here and in the following figure are in terms of the number of bits rather than time.)

FIG. 45 shows the timing of relationships between transmissions by communications units, repeater stations, and remote stations. A unit transmits a packet 646, which is received at two different repeater stations. Repeater station #1 retransmits the packet 647 by infrared after a delay determined randomly within a given range (e.g., 0 to 600 mS, with the range determined by factors such as the type and amount of information in the packet). Repeater station #2 retransmits the packet 648 also by infrared but (as the result of chance) after a longer delay. Assuming that the first repeater transmission 647 is received at remote station #1, the station will initiate a delay and then retransmit the packet 649. If both transmissions from the two repeaters originating from the same communications unit are received at the remote station, only one will be retransmitted by the remote station.

In the case of transmissions by two different communications units 646 and 650 that are received by repeater station #1, the repeater will wait until the end of the delay period and then retransmit both packets independently in succession 651.

Figure 46:
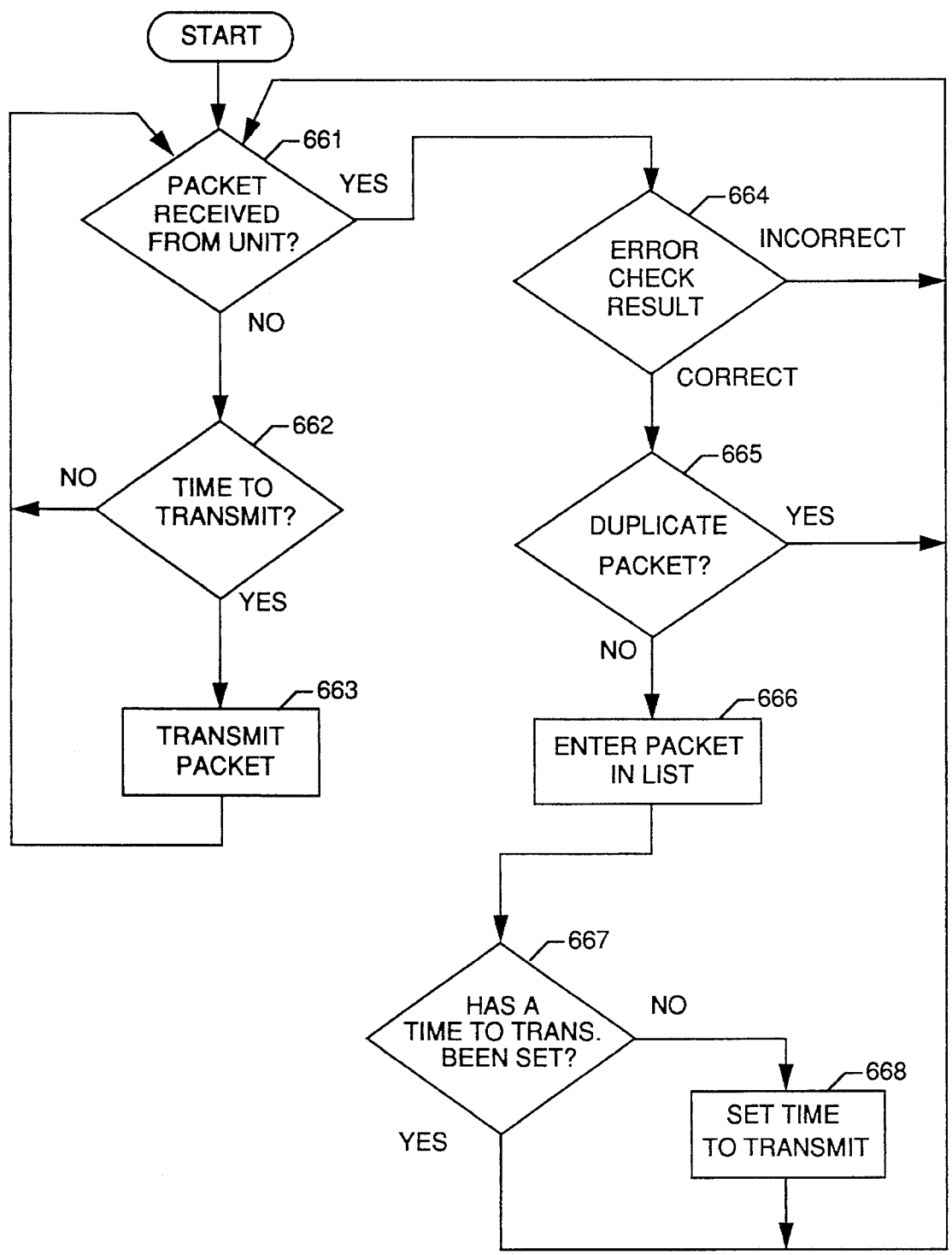
FIG. 46 shows a flowchart of the software for the microprocessor in a remote communications station.

FIG. 46 shows a flowchart of the software for a remote station. At the start of the module, a test is made 661 of whether a packet has been received from a unit (or repeater), which is temporarily stored in memory as characters are received. This is done by checking the Packet Ready flag, a flag that is set by an interrupt service routine when a complete packet has been received. The interrupt service routine does this by first looking :for an SOH and, when it is found, placing each received character in a buffer until an EOT is received, at which time the flag is set. The interrupt service routine, in addition to sampling the data, also measures the amplitude of the infrared signal received and, when an EOT is received, appends that measurement to the packet, in the form of an 7-bit character placed just before the ETX character, as indicated in FIG. 14. If a complete packet has not been received, a test is made 662 of whether it is time to transmit a packet—that is, at least one packet has been received and is in the Received Packets List for the remote station, a delay time has been set, and that delay period has passed. If no, control passes to step 661. If yes, a packet (including data from all packets in the Received Packets List) is formatted and transmitted 663. Control then passes to step 661.

If a packet has been received from a unit or repeater (test 661), as indicated by receipt of an EOT character, an error check is calculated and a test made 664 of the result. If the packet was not received correctly, control passes to step 661. If the packet was received correctly, a test is made 665 of whether the packet is a duplicate. This is determined by comparing the packet just received with those packets in the Received Packets List. (The Repeater Tag Bit or repeater IDs are ignored in such comparisons.) If the packet is a duplicate, control passes to step 661. If the packet is not a duplicate, the received packet is then placed 666 in the Received Packets List. The signal amplitude measure is added to the packet if it was received directly from the remote station. If the packet was received through a repeater, the measure is set to 0 to indicate that the measure is not relevant. A test is then made 667 of whether a delay period (and corresponding time to transmit) has been set. If yes, control passes to step 661. If no, a time delay is calculated. This is done by generating a random number representing the delay time, with the range of the random number dependent on the type of packet received. If input data is included in the received packet, and the packet is less than 13 characters in length, the range is from 0 to 200 mS. If input data is included and the packet is from 14 to 25 characters in length, the range is 0 to 400 mS. If input data is included and the packet is 26 characters or more in length, file range is 0 to 600 mS. If input data is not included but an acknowledgement is, the range is from 0 to 1000 mS. If neither input data nor an acknowledgement is included in the packet, the range is from 0 to 2000 mS. An absolute time is then calculated 668 by adding the time delay to the current time. Control then passes to step 661. (In an alternative embodiment, the delay before transmission of a packet is determined by multiplying the amount of data in the packet by a factor that depends upon the type of data in the packet. This factor is, for example, 20 mS per character for packets with input data, 40 mS per character for packets with acknowledgements but no input data, and 100 mS per character for packets with neither input nor acknowledgement data.)

Figure 47:
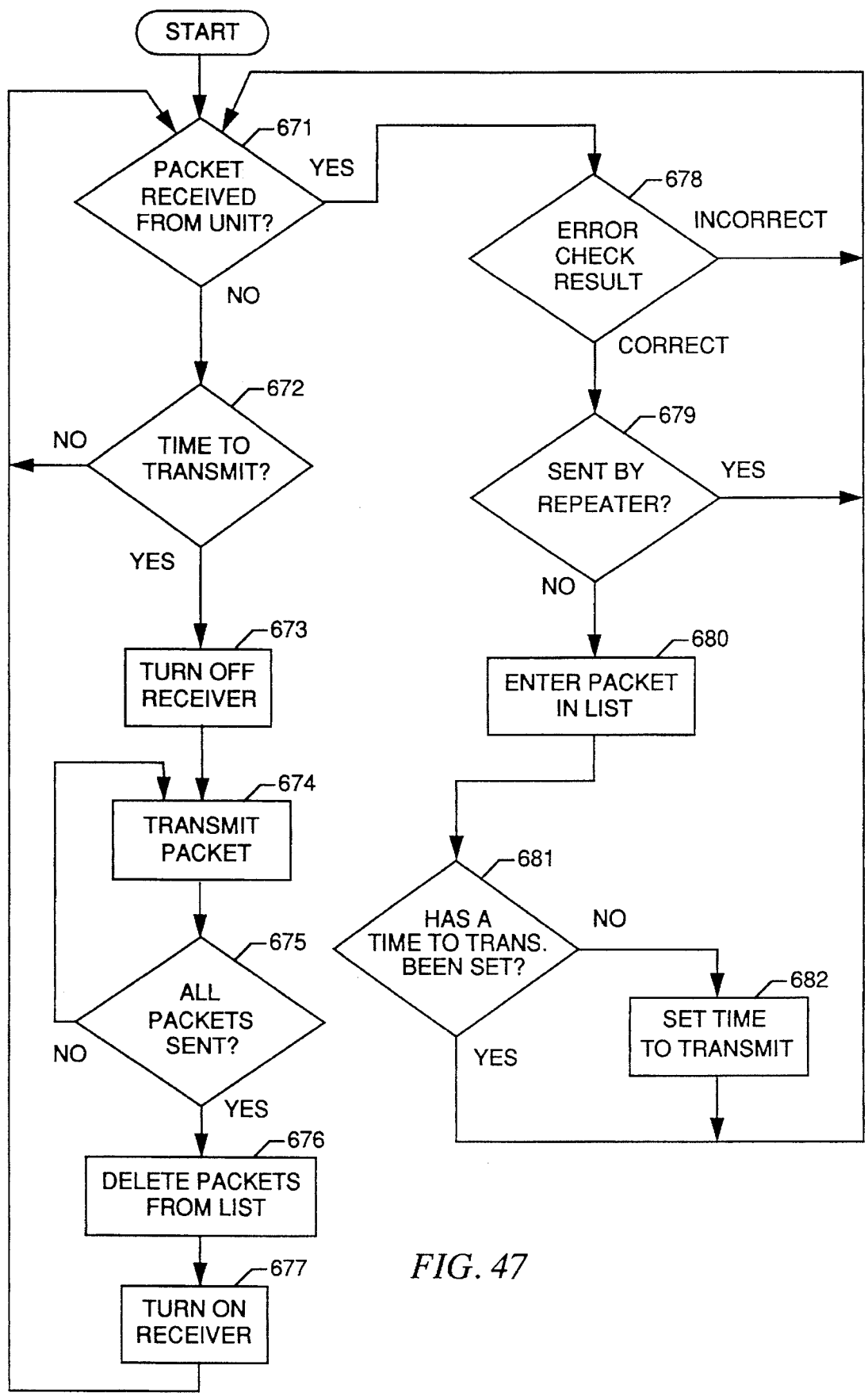
FIG. 47 shows a flowchart of the software for the microprocessor in a repeater station.

FIG. 47 shows a flowchart of the software for a repeater station. A test is first made 671 of whether a packet has been received from a unit, which is temporarily stored in memory as characters are received. This is done by checking the Packet Ready flag, a flag that is set by an interrupt service routine when a complete packet has been received. The interrupt service routine does this by first looking for an SOH and, when it is found, placing each received character in a buffer until an EOT is received, at which time the flag is set. The interrupt service routine, in addition to sampling the data, also measures the amplitude of the infrared signal received and, when an EOT is received, appends that measurement to the packet, in the form of an 7-bit character placed just before the ETX character, as indicated in FIG. 14. If a complete packet has not been received, a test is made 672 of whether it is time to transmit a packet—that is, at least one packet has been received and is in the Received Packets List for the repeater station, a delay time has been set, and that delay interval has passed. If no, control passes to step 671. If yes, the receiver is turned off 673 by simply ignoring input data from the infrared detector (or ultrasonic microphone). A single received packet is then transmitted 674 by infrared. Before transmitting the packet, the Repeater Tag Bit is set if it is not already. A test is then made 675 of whether all packets in the Received Packets List have been sent. If no, control passes to step 674 to transmit another packet. If yes, all packets are deleted 676 from the Received Packets List and the receiver is turned back on 677. Control then passes to step 671.

If a packet has been received from a unit or another repeater (test 671), indicated by receipt of an EOT character, an error check is calculated and a test is made 678 of the result. If the check showed that the packet was not received correctly, control passes to step 671. If the packet was received correctly, a test is made 679 of whether the packet has been sent by a unit or a repeater (by checking the Repeater Tag Bit). If it has been sent by a repeater, the packet is discarded and control passed to step 671. If the packet was not sent by a repeater, the packet (including signal amplitude measure) is then entered 680 into the Received Packets List. A test is made 681 of whether a delay period (and corresponding time to transmit) has been set. If yes, control passes to step 671. If no, a time delay is calculated. This is done by generating a random number representing the delay time, with the range of the random number dependent on the type of packet received. If input data is included in the received packet, and the packet is less than 13 characters in length, the range is from 0 to 200 mS. If input data is included and the packet is from 14 to 25 characters in length, the range is 0 to 400 mS. If input data is included and the packet is 26 characters or more in length, the range is 0 to 600 mS. If input data is not included but an acknowledgement is, the range is from 0 to 1000 mS. If neither input data nor an acknowledgement is included in the packet, the range is from 0 to 2000 mS. An absolute time is then calculated 682 by adding the time delay to the current time. Control then passes to step 681. (In an alternative embodiment, repeater stations are assigned identification codes that are added to received packets before they are retransmitted, with another ID code added to the packet whenever it passes through another repeater station. Each repeater would, however, discard without retransmitting those received packets containing the repeater's own ID. The result of this is that a given packet can only be retransmitted once by a given repeater, allowing multiple chains of repeaters to improve coverage. At the same time, it prevents a single packet from reverberating continuously by being passed back and forth between two or more repeaters.)

I claim:

1. A method for transmitting a message to an individual in a building, returning a response message to the originator of said message, and determining the current location of said, individual, comprising the steps of:

originating said message addressed to the individual;

transmitting the message to a central station;

receiving and storing the message at said central station;

creating a data packet containing data from the message;

transmitting said data packet from the central station to a communications unit carried by the individual by the steps of:
   (1) adding a code to said data packet identifying said communications unit;
   (2) adding a code to the data packet uniquely identifying the data packet;
   (3) computing an error checking code and adding said error checking code to the data packet;
   (4) transmitting the data packet by means of radio from the central station to the communications unit;
   (5) receiving the data packet at the communications unit;
   (6) determining whether the data packet has been correctly received at the communications unit by computing an error checking code using the received data and comparing said error checking code with the error checking code contained in the data packet;

transmitting an acknowledgment packet from the communications unit to the central station, should the data packet be received correctly, by the steps of:
   (1) constructing an acknowledgment packet at the communications unit containing said code uniquely identifying the data packet just received, so as to serve as an acknowledgment of said received data packet;
   (2) transmitting said acknowledgment packet from the communications unit by means of a medium selected from the group consisting of infrared light and ultrasonic sound to one or more of a plurality of remote stations installed at fixed locations in said building;

(3) receiving the acknowledgment packet from the communications unit at a remote station and storing it in memory;

(4) transmitting the acknowledgment packet from said remote station, by means of radio, to said central station;

repeating the steps of creating a data packet containing data from the message, transmitting said data packet from the central station to a communications unit, and transmitting an acknowledgment packet from the communications unit to the central station, until all data in the message has been transmitted from the central station to the communications unit;

displaying the message to the individual;

accepting a response message from the individual at the communications unit in response to the received message;

creating a response packet containing data from said response message;

transmitting said response packet from the communications unit by means of a medium selected from the group consisting of infrared light and ultrasonic sound to one or more of a plurality of remote stations installed at fixed locations in the building;

receiving the response packet at a remote station and temporarily storing the response packet;

adding a code to the response message uniquely identifying said remote station;

transmitting the response packet from the remote station by means of radio to the central station;

receiving the response packet at the central station and storing it;

extracting the location of the remote station from the response packet and storing the location associated with the individual at the central station;

transmitting the response message from the central station to the originator of the message.

2. The method of claim 1, wherein the transmission of data from a communications unit to a remote station is carried out by means of infrared light.

3. The method of claim 1, wherein the transmission of data from a communications unit to a remote station is carried out by means of ultrasonic sound.

4. The method of claim 1, wherein a code uniquely identifying a data packet comprises a sequence number, with each data packet assigned a number one greater than the data packet preceding it, with said sequence number set to zero when the number reaches the maximum number that can be represented in the given number of bits provided.

5. The method of claim 1, wherein the step of receiving a data packet from the central station at a communications unit comprises the steps of:

receiving said data packet at said communications unit;

discarding the data packet as a duplicate, should the unique identifying code that is contained in the data packet indicate that the data packet has been previously received.

6. The method of claim 1, wherein a plurality of data packets are transmitted from the central station to the communications unit before an acknowledgment is received for any of the data packets.

7. The method of claim 1, wherein the step of transmitting a data packet from the central station to a communications unit comprises the steps of:

transmitting said data packet containing the code uniquely identifying the data packet from the central station by means of radio to said communications unit;

waiting for a predetermined length of time for an acknowledgment packet from the communications unit containing said identifying code for the data original packet;

removing the data packet from a queue of data packets to be transmitted, should said acknowledgment packet be received;

retransmitting the data packet to the communications unit, should the acknowledgment packet with the identifying code not be received within said predetermined length of time;

discarding without action any acknowledgment packets that are received for data packets not contained in said queue of data packets to be transmitted.

8. The method of claim 7, wherein retransmitting an unacknowledged data packet to the communications unit comprises the steps of:

determining the identity of a remote station or stations last receiving a packet from the communications unit;

determining the time of receipt of said received packet from the communications unit at said remote station or stations;

computing the probability that the unit is likely to receive said unacknowledged data packet if it is retransmitted;

retransmitting the unacknowledged data packet, should said probability of receipt be above a certain threshold value.

9. The method of claim 1, wherein the step of transmitting all acknowledgment packet from a communications unit to a remote station comprises the steps of:

(a) transmitting said acknowledgment packet from said communications unit;

(b) waiting for time interval until the next transmission of the acknowledgment packet from the communications unit;

in which steps a and b above are carried out repeatedly and continuously until an acknowledgment acknowledgment packet has been received for the acknowledgment packet.

10. The method of claim 9, wherein a value of said time interval until the next transmission of the acknowledgment packet from the communications unit to said remote station is calculated by the steps of:

determining the amount of time that has elapsed since the last receipt of a data packet from the central station at the communications unit;

computing said value for the time interval until the next transmission of the acknowledgement packet such that the value of the time interval increases as the time that has elapsed since the last receipt of said data packet increases.

11. The method of claim 10, wherein the step of computing the value for the time interval until the next transmission of the acknowledgment packet includes the further steps of:

generating a random number;

adding said random number to the value of the time interval until the next transmission of the acknowledgment packet that has been computed such that the value increases as the time that has elapsed since the last receipt of said data packet increases.

12. The method of claim 1, wherein the step of transmitting an acknowledgment packet from a communications unit to the central station comprises the steps of:

transmitting an acknowledgment packet from said communications unit;

transmitting an acknowledgment acknowledgment packet from the central station to the communications unit acknowledging the acknowledgment of the data packet;

receiving said acknowledgment acknowledgment packet at the communications unit;

removing a code identifying the acknowledged data packet from a list of data packets in the communications unit for which acknowledgments will be sent;

discarding any acknowledgment acknowledgment packet, should said code identifying the corresponding data packet not be found in said list.

13. The method of claim 1, wherein the step of transmitting a data packet from the central station to a communications unit comprises the steps of:

determining a priority for each incoming message;

assigning said priority to each data packet the message is broken up into, with each data packet containing a code indicating the priority;

allocating capacity of the radio communications channel such that data packets with higher priority are given preference;

providing a humanly perceptible signal to the user at said communications unit when data packet of appropriately high priority have been received at the communications unit.

14. The method of claim 1, further comprising the steps of:

transmitting a data packet from the central station to a communications unit containing an identifying code for the last data packet transmitted to said communications unit;

determining whether one or more data packets have been transmitted to said communications unit but not received by the communications unit;

providing a humanly perceptible signal to the user when it has been determined that a data packet has not been received.

15. The method of claim 1, wherein the step of transmitting a packet from a remote station to the central station comprises the steps of:

determining a period of time to delay before transmitting said packet;

waiting for said period of time;

transmitting the packet from said remote station to the central station.

16. The method of claim 1, wherein the transmission of a packet from a communications unit to a remote station comprises the steps of:

transmitting said packet from said communications unit by means of a medium selected from the group consisting of infrared light and ultrasonic sound;

receiving the packet at a repeater station and temporarily storing it in memory;

transmitting the packet from said repeater station to a remote station by means of the same communications medium used for transmitting data from the communications unit.

17. The method of claim 16, wherein the step of transmitting a packet from a repeater station comprises the steps of:

determining a period of time to delay before transmitting said packet;

waiting for said period of time;

transmitting the packet from said repeater station.

18. The method of claim 16, wherein the step of transmitting a packet from a repeater station comprises the steps of:

determining whether said received packet has been previously transmitted by said repeater station by comparing the repeater identification or identifications contained in the packet with that of the repeater receiving the packet;

discarding without further action the received packet, should it be determined to have previously been transmitted;

adding said identification code for the repeater to the packet, should it be determined to have not previously been transmitted;

to transmitting the packet from the repeater station to a remote station.

19. The method of claim 1, wherein the step of transmitting a response packet from a communications unlit comprises the steps of:

(a) transmitting said response packet from said communications unit;

(b) waiting for a specified time interval until the next transmission of the response packet;

in which steps a and b above are carried out repeatedly until an acknowledgment of the response packet has been received.

20. The method of claim 19, wherein the step of waiting for a specified time interval until the next transmission of the response packet comprises the steps of:

determining the amount of data in the response packet being sent;

calculating a maximum time for the internal between transmissions, with said maximum time proportional to the amount of data in the response packet;

number representing the time interval between transmissions;

waiting for the specified time interval.

21. The method of claim 1, wherein the step of transmitting the response packet from the communications unit comprises the steps of:

transmitting said response packet from the communications unit, in which the response packet contains a code uniquely identifying the response packet;

receiving the response packet containing said identifying code at the remote station and transmitting the response packet to the central station;

receiving the response packet containing the identifying code at the central station;

discarding without action duplicate copies of the response packet that are subsequently received at the central station;

transmitting a response acknowledgment packet containing the corresponding identifying code acknowledging the response packet from the central station to said communications unit;

receiving said response acknowledgment packet at the communications unit, should there be sufficiently reliable transmission;

deleting the response packet from a list of response packets in the communications unit to be transmitted to the central station, should the response acknowledgment packet be correctly received.

22. The method of claim 21, wherein the step of transmitting the response packet includes the further steps of:
  waiting a specified period of time after said transmission;
  providing a humanly perceptible signal to the user of the communications unit, should an acknowledgment of the response packet fail to be received within said specified period of time.

23. The method of claim 1, wherein the transmission of it packet from a remote station to the central station comprises the steps of:
  determining a period of time to delay before transmitting said packet;
  waiting for said period of time;
  transmitting the packet from said remote station to the central station when the waiting period has ended.

24. The method of claim 23, wherein the step of determining a time to delay comprises the steps of:
  determining whether or not the packet contains a response packet;
  determining the amount of data in said response packet, should there be one;
  calculating said time to delay, such that the amount of delay increases as the amount of data increases.

25. The method of claim 24, wherein the step of calculating a time to delay comprises the steps of:
  determining the amount of data contained in the response packet;
  determining the priority of the response packet, with packets containing response message data having the highest priority, packets containing acknowledgment data but not response message data having the second highest priority, and packets containing neither response message nor acknowledgment data having the lowest priority;
  calculating a random number;
  computing a time to delay, such that said time depends on the amount of data contained in the response message, the priority of the response message, and said random number.

26. The method of claim 1, further comprising the steps of:
  assigning a channel number to the message received at the central station;
  adding said channel number to the data packet containing the text from the message received at the central station before the data packet is transmitted to the communications unit;
  extracting the channel number from the data packet after it is received at the communications unit and storing it in the memory of the communications unit;
  adding said channel number to the response packet transmitted from the communications unit to the central station before the response is transmitted;
  extracting the channel number from the response packet received at the central station, and convening the channel number to an electronic mail address identifying an originator of the message received at the central station;
  using said electronic mail address in transmitting the response message to said originator of the message.

27. The method of claim 1, further comprising the steps of:
  transmitting part of the message stored at the central station to the communications unit;
  displaying said part of the message received at the communications unit to the user, together with a response that, when chosen, requests additional text from the message;
  choosing said response that requests said additional text from the message by a user;
  transmitting a code representing the response together with a code identifying the corresponding message from the communications unit to a remote station and then to the central station;
  transmitting the additional text from the message from the central station to the communications unit;
  displaying the additional message text to the user.

28. The method of claim 1, further comprising the steps of:
  originating a message requesting that a physical location be provided for the communications unit assigned to a given individual;
  transmitting said message requesting the physical location to the central station;
  determining the last known location of the communications unit assigned to said individual;
  transmitting a reply message to the originator of the request containing the location of the communications unit assigned to the individual.

29. The method of claim 28, wherein the step of transmitting the reply message to the originator of the location request comprises the steps of:
  determining whether the communications unit for which the request has been received has had a privacy mode set by the user,
  transmitting a message to the originator of the location request indicating that said privacy mode has been selected, rather than indicating the location of the communications unit, should the privacy mode be set.

30. The method of claim 1, further comprising the steps of:
  initiating a message from a remote software agent containing a code indicating a query from said agent and an identification code for an individual for which information relevant to contacting said individual is requested;
  receiving said message from said remote so-are agent at the central station;
  determining the location of the individual in the building by determining the last known location of the communications unit assigned to that individual;
  returning a message to the originator indicating whether or not the individual is presently in the building and a telephone number that the individual can be contacted at, should the user be in the building and available to take calls.

31. The method of claim 1, wherein the message addressed to the individual includes one or more potential responses that are transmitted to the communications unit and that are displayed at the communications unit and can be selected by the individual as the response message.

32. The method of claim 31, wherein the message is originated at a computer workstation and transmitted to the central station over an electronic mail network.

33. An apparatus for transmitting a message to an individual and accepting and delivering a response message to the originator of said message, comprising:
  a central station, comprising:
    (1) a microprocessor for control of said central station;
    (2) a memory for storage of a computer program for controlling said microprocessor, message data, and other information;

(3) an interface connecting the microprocessor to an electronic mail network that accepts the message from said electronic mail network and provides it to the microprocessor for storage in said memory and for processing and that delivers a response message from the microprocessor to the electronic mail network;

(4) an interface connecting the microprocessor to a PABX control system that accepts the message from said PABX control system indicating the receipt of a telephone call for storage in said memory, and for processing by the microprocessor and delivers the response message from the microprocessor to the PABX control system;

(5) a radio transmitter that accepts the message from the microprocessor and provides a radio signal modulated by the data contained in the message and a transmitting antenna that receives said radio signal from the radio transmitter and radiates the radio signal into the air;

(6) a receiving antenna and radio receiver, with said radio receiver providing received data to the microprocessor; and (7) a clock providing timing pulses to the microprocessor;

a plurality of communication units carried by individuals, each comprising:

(1) a microprocessor for control of a communications unit;

(2) a memory for storage of a computer program controlling said microprocessor contained in said communications unit, the message, the response message, and other information;

(3) a radio receiver for receiving the message from the radio transmitter and antenna contained in the central station and providing the message to the microprocessor in the communications unit for storage in said memory and processing;

(4) a visual display for displaying text from the message and status indicators under control of the microprocessor which obtains said text from the memory;

(5) one or more keys for control of said communications unit that, when pressed and sensed by the microprocessor, control the display of text from the message and selection of a response message;

(6) a transducer selected from the group consisting of an infrared light emitter and an ultrasonic sound generator, for transmitting the response message from said communications unit obtained from the memory by the microprocessor;

(7) a clock providing timing pulses to the microprocessor; and (8) a power source providing electricity to operate the microprocessor, memory, radio receiver, visual display, transducer, and clock; and a plurality of remote stations, placed in fixed locations within a building, each comprising:

(1) a microprocessor for control of a remote station;

(2) a memory for storage of a computer program controlling said microprocessor contained in said remote station, the response message received from the communications units, and other information;

(3) a sensory detector selected from the group consisting of an infrared light detector and an ultrasonic microphone for receiving the response message from the communication unit and providing the response message to the microprocessor for storage in memory and for processing in said remote station, with said detector for the same communication medium as that used by the communications unit; and (4) a radio transmitter and antenna for transmitting the response message from the microprocessor in the remote station to the antenna and radio receiver in the central station.

34. The apparatus of claim 33, further comprising:

a plurality of repeater stations, placed in fixed locations within a building, each comprising:

a microprocessor for control of a repeater station;

a memory for storage of a program controlling said microprocessor, the response message received from the communications unit, and other information;

a sensory detector selected from the group consisting of an infrared light detector and an ultrasonic microphone for receiving the response message from the communications unit and providing the response message to the microprocessor contained in said repeater station for storage in said memory and for processing, with said detector for the same communications medium as that used by the communications unit;

a transducer selected from the group consisting of an infrared light emitter and an ultrasonic sound generator, for transmitting the response, message from the microprocessor contained in a repeater station to a sensory detector contained in a remote station, with said transducer or the same communication medium as that used by said sensory detector.

35. A method for indicating an incoming telephone call to an individual in a building and routing said call under the control of said individual, comprising the steps of:

originating a message containing information about the call from a PABX control system;

transmitting said message to a central station;

receiving and storing the message at said central station;

creating a data packet containing data from the message;

transmitting said data packet from the central station to a communications unit carried by the individual by the steps of:

(1) adding a code to said data packet identifying said communications unit;

(2) adding a code to the data packet uniquely identifying the data packet;

(3) computing an error checking code and adding said error checking code to the data packet;

(4) transmitting the data packet by means of radio from the central station to the communications unit;

(5) receiving the data packet at the communications unit;

(6) determining whether the data packet has been correctly received at the communications unit by computing an error checking code using the received data and comparing said error checking code with the error checking code contained in the data packet;

repeating the steps of creating a data packet containing data from the message, transmitting said data packet from the central station to a communications unit, and transmitting an acknowledgment packet from the communications unit to the central station, until all data in the message has been transmitted from the central station to the communications unit;

displaying the message to the individual together with a set of responses that represent alternative choices for routing the call;

selecting a response from said set of responses representing the desired choice of the individual for routing the call;

creating a response packet containing data from said response message;

transmitting said response packet from the communications unit by means of a medium selected from the group consisting of infrared light and ultrasonic sound to one or more of a plurality of remote stations installed at fixed locations in the building;

receiving the response packet at a remote station and temporarily storing the response packet;

adding a code to the response message uniquely identifying said remote station;

transmitting the response packet from the remote station by means of radio to the central station;

receiving the response packet at the central station and storing it;

extracting the location of the remote station from the response packet and storing the location associated with the individual at the central station;

determining a telephone instrument the call is to be routed to, based on the response packet and the location of the response station;

transmitting a response message containing an identification code for said telephone instrument to said PABX control system;

routing the call to the telephone instrument.

* * * * *